US010589943B1

(12) United States Patent
Yohe et al.

(10) Patent No.: US 10,589,943 B1
(45) Date of Patent: Mar. 17, 2020

(54) SYSTEM AND METHOD FOR FORMING AND MOVING AN ARTICLE ARRAY

(71) Applicant: DYCO, INC., Bloomsburg, PA (US)

(72) Inventors: Peter D Yohe, Bloomsburg, PA (US); Ronald H Cordingly, Berwick, PA (US)

(73) Assignee: DYCO, INC., Bloomsburg, PA (US)

( * ) Notice: Subject to any disclaimer, the term of this patent is extended or adjusted under 35 U.S.C. 154(b) by 0 days.

(21) Appl. No.: 16/449,892

(22) Filed: Jun. 24, 2019

(51) Int. Cl.
| | |
|---|---|
| *B65G 65/00* | (2006.01) |
| *B65B 21/06* | (2006.01) |
| *B65B 35/40* | (2006.01) |
| *B65G 47/08* | (2006.01) |

(52) U.S. Cl.
CPC ............... *B65G 65/00* (2013.01); *B65B 21/06* (2013.01); *B65B 35/40* (2013.01); *B65G 47/084* (2013.01); *B65G 47/086* (2013.01)

(58) Field of Classification Search
CPC ...... B65G 47/082; B65G 47/74; B65G 47/90; B65G 47/084; B65G 47/088; B65G 47/086; B65G 65/00; B65B 21/06; B65B 21/12; B65B 21/18; B65B 35/36; B65B 35/40; B65B 35/30; B65B 35/56; B65B 35/50
USPC ..................................... 198/418.5, 426, 429
See application file for complete search history.

(56) References Cited

U.S. PATENT DOCUMENTS

| | | | | |
|---|---|---|---|---|
| 4,231,697 A | * | 11/1980 | Franz ................... | B65G 47/086 414/788.8 |
| 5,372,472 A | * | 12/1994 | Winski ................. | B65G 47/086 414/789.6 |
| 6,152,681 A | * | 11/2000 | Vincent ................ | B65G 47/088 271/91 |
| 6,547,058 B2 | * | 4/2003 | Ouellette ............. | B65G 47/084 198/418.5 |
| 7,506,490 B1 | * | 3/2009 | Yohe ........................ | B65B 9/02 53/446 |
| 8,875,869 B1 | * | 11/2014 | Burchell .............. | B65G 47/088 198/418.5 |
| 9,586,769 B2 | * | 3/2017 | Yohe ...................... | B65G 47/74 |
| 10,144,596 B2 | | 12/2018 | Yohe et al. | |
| 2006/0016094 A1 | * | 1/2006 | Covert ..................... | F26B 5/06 34/217 |
| 2007/0068121 A1 | * | 3/2007 | Mate ....................... | B65B 35/38 53/543 |
| 2010/0316479 A1 | * | 12/2010 | Perl ...................... | B65G 47/086 414/791.6 |

* cited by examiner

*Primary Examiner* — Mark A Deuble
(74) *Attorney, Agent, or Firm* — McNees Wallace & Nurick LLC

(57) ABSTRACT

A system for forming and moving an article array including a consolidation area having a support surface for receiving and arranging rows of articles to form an article array from an article row delivery device while the consolidation area continuously stabilizingly supports the periphery of the article rows positioned on the support surface as the article rows are arranged to form the article array that is moved onto a transfer support surface for moving the article array toward a collection area.

20 Claims, 66 Drawing Sheets

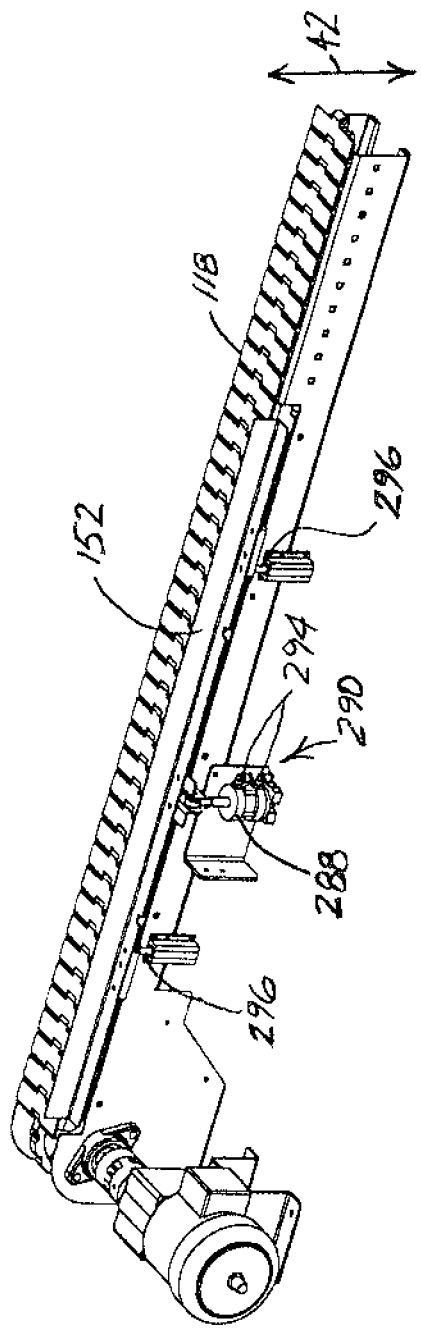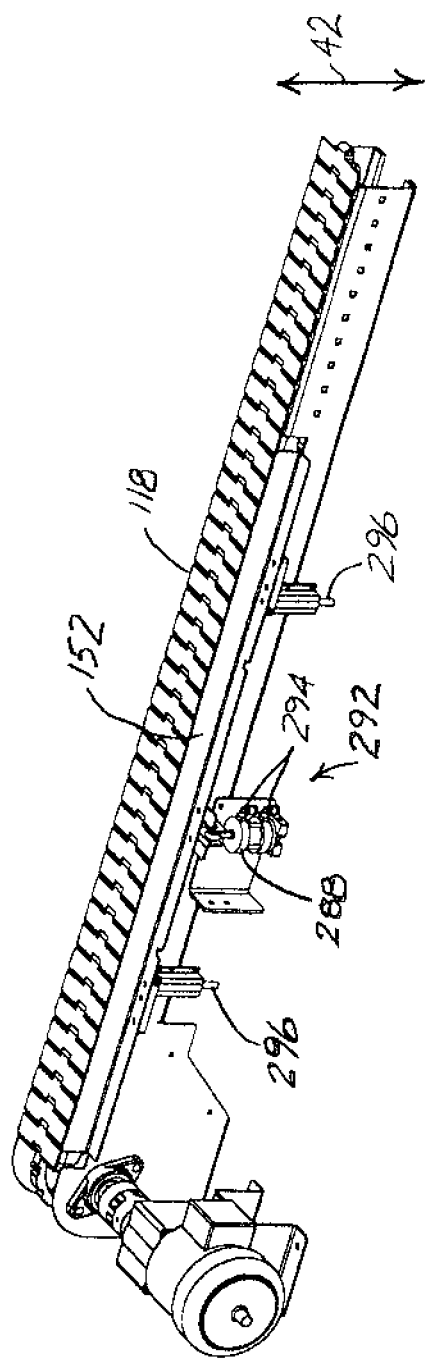

SYSTEM AND METHOD FOR FORMING AND MOVING AN ARTICLE ARRAY

FIELD OF THE INVENTION

The present invention is directed to a system for equipment associated with loading and unloading palletizing article arrays or portions thereof.

BACKGROUND OF THE INVENTION

When large numbers of stackable articles must be transported in large quantities to another location, especially when the article is small, the article may be packaged in a container to protect the article during shipping of the container. Alternately, to reduce the amount of handling required and/or to reduce the amount of shipping material consumed, the articles may be arranged in a tight grouping, or array, of articles. Each array of articles can form a layer of articles that can be stacked on a pallet having a footprint which can be accommodated by freight hauling compartments, e.g., for truck, rail, sea or air vessels.

Palletizing articles is becoming increasingly automated in manufacturing facilities, wherein articles are moved via a conveyor, which articles are manipulated by dedicated machinery onto pallets.

It would be beneficial to develop and use a system for loading/unloading article array heads.

BRIEF DESCRIPTION OF THE INVENTION

In an embodiment, a system for forming and moving an article array includes a first consolidation area having a first support surface for receiving and arranging rows of articles to form a first article array from an a first article row delivery device adapted to simultaneously deliver at least one article row to the first consolidation area while the first consolidation area continuously stabilizingly supports a periphery of the article rows positioned on the first support surface as the article rows are arranged to form the first article array. The system further includes the first consolidation area including a first backing plate, a first first consolidation area stabilizer, and opposed first support members, the article rows positioned between the first backing plate, the first first consolidation area stabilizer, and the first support members, the first backing plate and the first first consolidation area stabilizer providing stabilizing support to opposed portions of the periphery of the article rows, and the first support members providing stabilizing support to remaining portions of the periphery of the article rows. The system further includes the first first consolidation area stabilizer and the first backing plate moving and stabilizingly supporting the article rows in a first direction while forming the first article array, at least the first backing plate in contact with each article of a corresponding row of the article rows while moving the article rows in the first direction, a second first consolidation area stabilizer providing independent stabilizing support to the portion of the periphery of the article rows stabilizingly supported by the first backing plate prior to the first backing plate moving in a direction opposite the first direction, in preparation of receiving additional article rows in the first consolidation area immediately adjacent the article rows already positioned on the first support surface for forming the first article array. The system further includes upon at least partial formation of the first article array, the second first consolidation area stabilizer discontinues providing stabilizing support to the portion of the periphery of article rows formerly stabilizingly supported by the first backing plate, the portion of the periphery of the corresponding row of articles formerly stabilizingly supported by the first backing plate being stabilizingly supported by a corresponding portion of the periphery of the additional rows of articles, and a portion of the periphery of the additional row of articles being stabilizingly supported by the first backing plate. The system further includes the first backing plate moving the at least partially formed first article array from the first consolidation area and onto a first transfer support surface positioned between the first consolidation area and a collection area. The system further includes a first article array moving device for moving the first transfer support surface in at least a second direction from the first consolidation area toward the collection area, the periphery of the at least partially formed first article array being continuously stabilizingly supported while being moved onto the first transfer support surface, and while the first transfer support surface is being moved in the at least a second direction.

In another embodiment, a system for forming and moving an article array includes a first consolidation area having a first support surface, and a second consolidation area having a second support surface for receiving and arranging rows of articles to form a first article array from a first article array delivery device, and to form a second article array from a second article array delivery device, respectively, the first article array delivery device adapted to simultaneously deliver at least one article row to the first consolidation area while the first consolidation area continuously stabilizingly supports a periphery of the article rows positioned on the first support surface as the article rows are arranged to form the second article array, the second article array delivery device adapted to simultaneously deliver at least one article row to the second consolidation area while the second consolidation area continuously stabilizingly supports a periphery of the article rows positioned on the second support surface as the article rows are arranged to form the second article array. The system further includes the first consolidation area including a first backing plate, a first first consolidation area stabilizer, and opposed first support members, the article rows positioned between the first backing plate, the first first consolidation area stabilizer, and the first support members, the first backing plate and the first first consolidation area stabilizer providing stabilizing support to opposed portions of the periphery of the article rows, and the first support members providing stabilizing support to remaining portions of the periphery of the article rows. The system further includes upon the first first consolidation area stabilizer and the first backing plate moving and stabilizingly supporting the article rows in a first direction while forming the first article array, at least the first backing plate in contact with each article of a corresponding row of the article rows while moving the article rows in the first direction, a second first consolidation area stabilizer providing independent stabilizing support to the portion of the periphery of the article rows stabilizingly supported by the first backing plate prior to the first backing plate moving in a direction opposite the first direction, in preparation of receiving additional article rows in the first consolidation area immediately adjacent the article rows already positioned on the first support surface for forming the first article array. The system further includes upon at least partial formation of the first article array, the second first consolidation area stabilizer discontinues providing stabilizing support to the portion of the periphery of article rows formerly stabilizingly supported by the first backing plate, the portion of the periphery of the corresponding row of articles formerly stabilizingly supported by the first backing plate being stabilizingly supported by a corresponding portion of the periphery of the additional rows of articles, and a portion of the periphery of the additional row of articles being stabilizingly supported by the first backing plate. The system further includes the first backing plate moving the at least partially formed first article array from the first consolidation area and onto a first transfer support surface positioned between the first consolidation area and a collection area. The system further includes a first article array moving device for moving the first transfer support surface in at least a second direction from the first consolidation area toward the collection area, the periphery of the at least partially formed first article array being continuously stabilizingly supported while being moved onto the first transfer support surface, and while the first transfer support surface is being moved in the at least a second direction. The system further includes the second consolidation area including a second backing plate, a first second consolidation area stabilizer, and opposed second support members, the article rows positioned between the second backing plate, the first second consolidation area stabilizer, and the second support members, the second backing plate and the first second consolidation area stabilizer providing stabilizing support to opposed portions of the periphery of the article rows, and the second support members providing stabilizing support to remaining portions of the periphery of the article rows. The system further includes upon the first second consolidation area stabilizer and the second backing plate moving and stabilizingly supporting the article rows in a first direction while forming the second article array, at least the second backing plate in contact with each article of a corresponding row of the article rows while moving the article rows in the first direction, a second second consolidation area stabilizer providing independent stabilizing support to the portion of the periphery of the article rows stabilizingly supported by the second backing plate prior to the second backing plate moving in a direction opposite the first direction, in preparation of receiving additional article rows in the second consolidation area immediately adjacent the article rows already positioned on the second support surface for forming the second article array. The system further includes upon at least partial formation of the second article array, the second second consolidation area stabilizer discontinues providing stabilizing support to the portion of the periphery of article rows formerly stabilizingly supported by the second backing plate, the portion of the periphery of the corresponding row of articles formerly stabilizingly supported by the second backing plate being stabilizingly supported by a corresponding portion of the periphery of the additional rows of articles, and a portion of the periphery of the additional row of articles being stabilizingly supported by the second backing plate. The system further includes, the second backing plate moving the at least partial second article array from the second consolidation area and onto one of the first transfer support surface or a second transfer support surface positioned between the second consolidation area and a collection area. The system further includes one of the first article array moving device or a second article array moving device for moving the one of the first transfer support surface or the second transfer support surface in at least a second direction from the second consolidation area toward the collection area, the periphery of the at least partial second article array being continuously stabilizingly supported while being moved onto the one of the first transfer support surface or a second transfer surface, and while the one of the first transfer support surface or the second transfer surface is being moved in the at least a second direction.

In a further embodiment, a method for forming and moving an article array includes receiving at least a first row of articles onto a first support surface of a first consolidation area between a movable first stabilizer and a movable first backing plate, the first consolidation area providing continuous stabilizing support to the periphery of the at least first row of articles, the first stabilizer and the first backing plate providing stabilizing support to opposed portions of the periphery of the at least first row of articles. The method further includes the first backing plate and the first stabilizer moving and stabilizingly supporting the at least first row of articles in a first direction, at least the first backing plate in contact with each article of a corresponding row of the at least first row of articles while moving the at least first row of articles in the first direction. The method further includes additionally stabilizingly supporting the portion of the periphery of the at least first row of articles stabilizingly supported by the first backing plate, the additional stabilizing support being independent of the stabilizing support provided by the first backing plate. the method further includes moving the first backing plate in a direction opposite the first direction in preparation of receiving at least a second row of articles The method further includes receiving the at least second row of articles immediately adjacent the at least first row of articles onto the first support surface between the first backing plate and the at least first row of articles, the periphery of the at least first row of articles and the at least second row of articles being continuously stabilizingly supported, including stabilizing support provided by the first stabilizer and the first backing plate, the at least first row of articles and the at least second row of articles at least partially forming a first article array. The method further includes moving the at least partially formed first article array from the first consolidation area and onto a first transfer support surface positioned between the first consolidation area and a collection area, wherein moving the at least partially formed first article array includes the first stabilizer or a second stabilizer and the first backing plate moving and stabilizingly supporting the first article array in the first direction and onto the first transfer support surface. The method further includes moving the first transfer support surface in at least a second direction from the first consolidation area toward the collection area, the periphery of the at least partially formed first article array being continuously stabilizingly supported while being moved onto the first transfer support surface, and while the first transfer support surface is being moved in the at least a second direction.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 54 is an enlarged, isolated upper perspective view of an exemplary stabilizer in a raised position.

FIG. 55 is an enlarged, isolated upper perspective view of the stabilizer of FIG. 54 in a retracted position.

Wherever possible, the same reference numbers will be used throughout the drawings to represent the same parts.

DETAILED DESCRIPTION OF THE INVENTION

Figure 1:
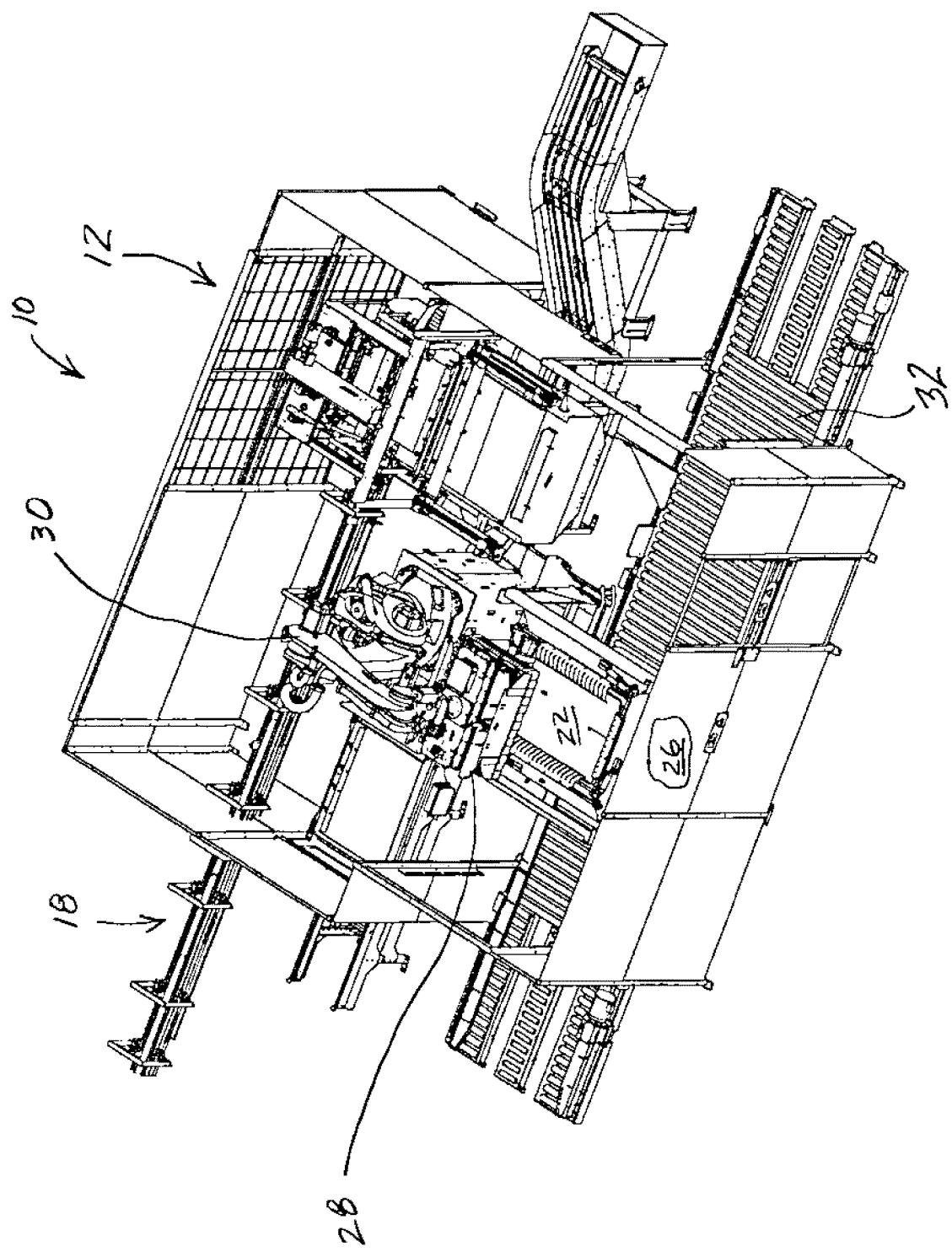
FIG. 1 is an upper perspective view of an exemplary palletizing system.

Referring to FIG. 1, an automated palletizer system or palletizer 10 utilizing an article array forming/moving system 12 is shown. Article array forming/moving system 12 receives articles 14 (FIG. 4), and more specifically, article rows 16 (FIG. 4) from an article row delivery device 18, such as a conveyor for forming article arrays 22 (FIG. 18) that are moved to a collection area 26 (FIG. 1) such as a container or a tray (e. g., having a bottom surface and short peripheral walls extending upwardly from the bottom surface), by a article array moving device 28 movable by an anthropomorphic robotic arm 30. As shown in FIG. 1, once container or collection area 26 is filled with article arrays 22 and closed, the container or collection area 26 is moved via a conveyor 32 for shipping. In other palletizing embodiments, the components may by arranged differently. Other exemplary embodiments of associated components of palletizer 10 will be discussed in further detail below.

For purposes herein, the term "article row" may be used irrespective the number of articles rows being gripped, moved or otherwise manipulated. In other words, the term "article row" may be used irrespective a single row of articles or article row 16 (FIG. 22), a pair of rows of articles or article row pairs 17 (FIG. 18) or more than two pairs of article rows or an array of articles or article array 22 (FIG. 4) being gripped, moved or otherwise manipulated. Similarly, the term "article array" may refer to two or more article rows, although the term "partial article array" may be used to refer to an article array already having two or more article rows, but undergoing further loading or building of article rows, thereby further building, loading or enlarging the existing article array. The terms "gripped" and "manipulated" and "moved" and the like in the context of the interaction between the article row delivery device and the article row(s) may be used interchangeably.

Figure 2:
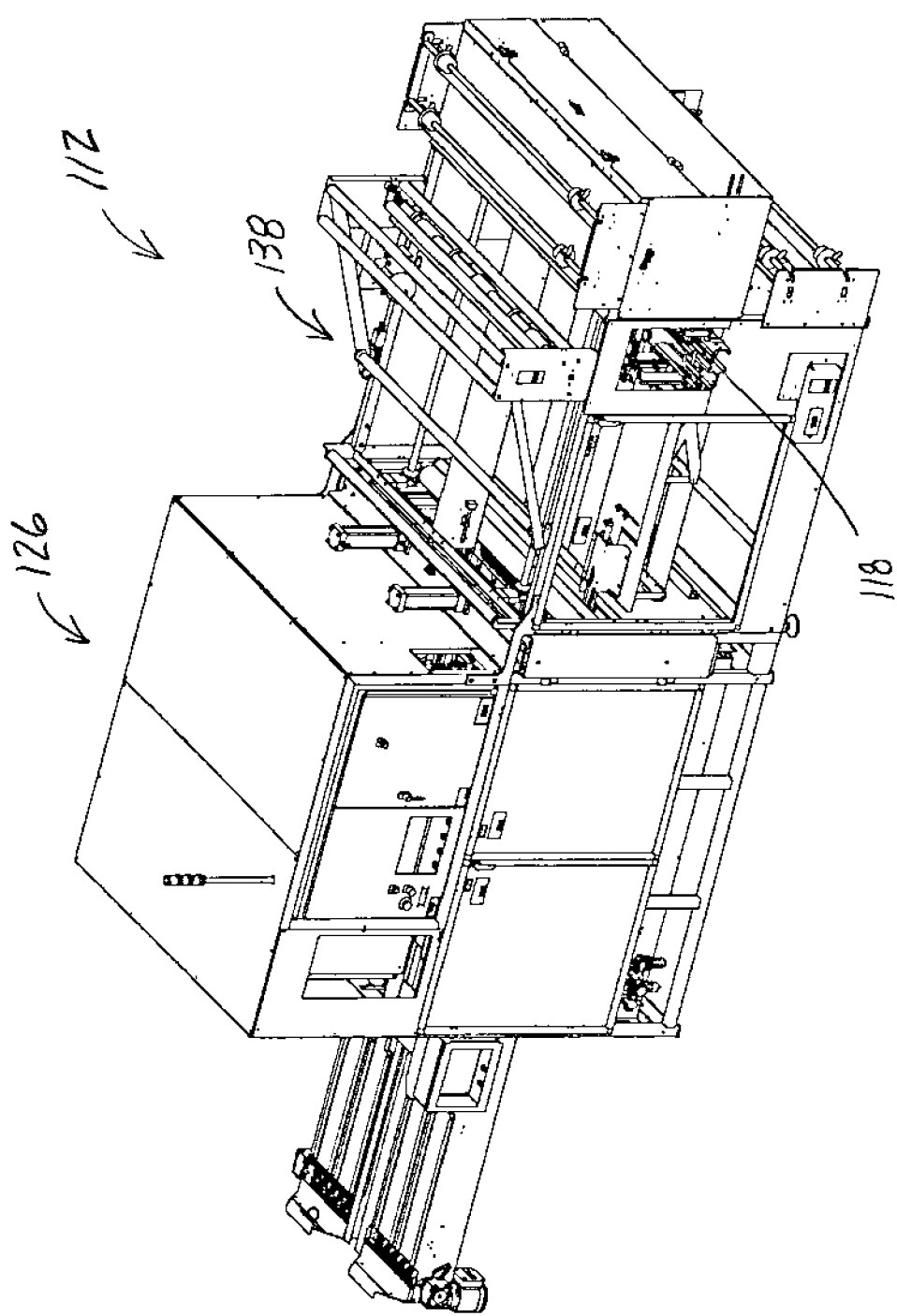
FIG. 2 is an upper perspective view of an exemplary article array forming/moving system.

FIG. 2 shows an article array forming/moving system 112 configured to receive successive article rows 16 (FIG. 22) from article row delivery device 118 for forming the article array 22 (FIG. 29) in consolidation area 138 prior to moving the article array 22 to collection area 126, such as a bagging area.

Figure 3:
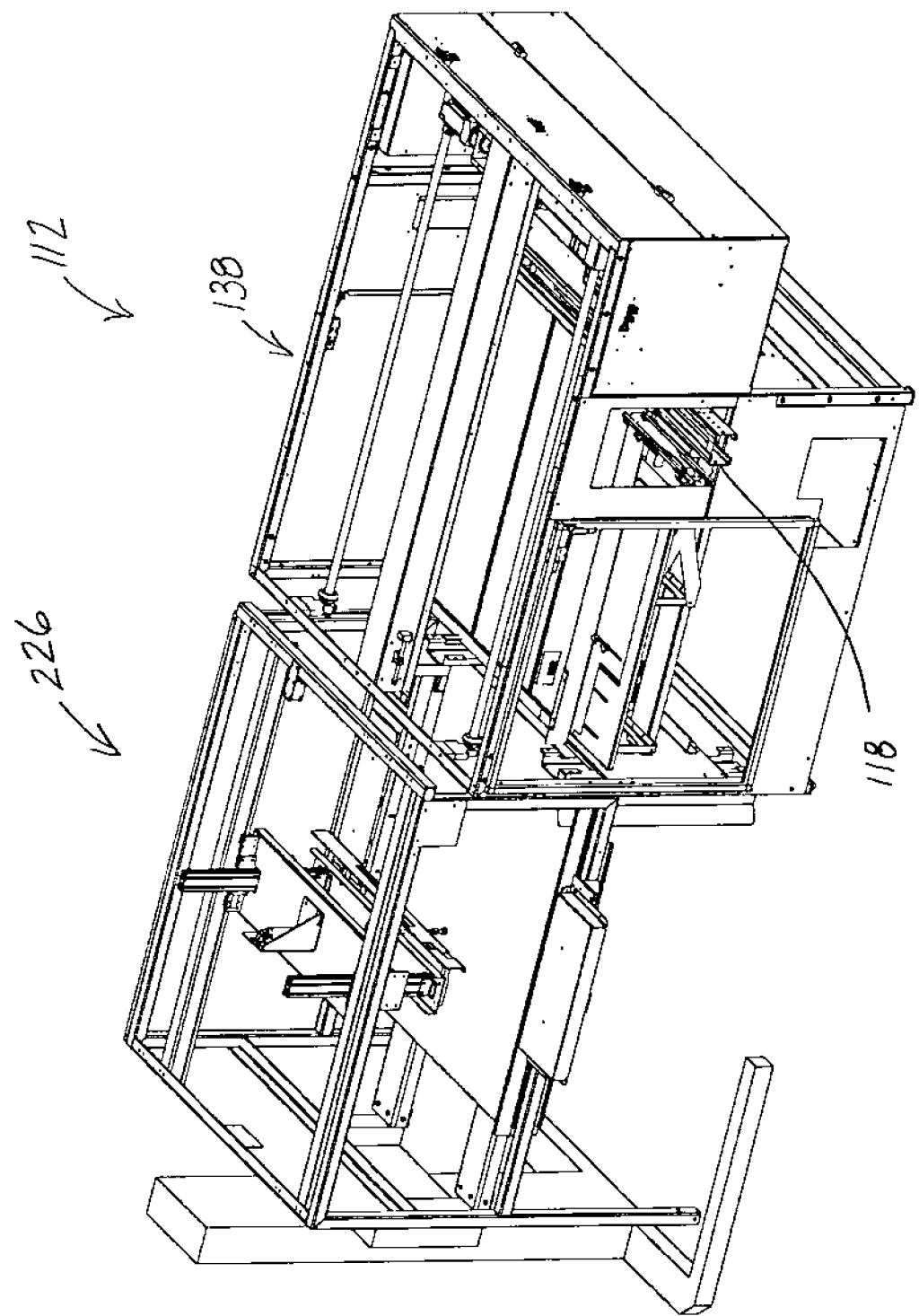
FIG. 3 is an upper perspective view of an exemplary article array forming/moving system.
Figure 34:
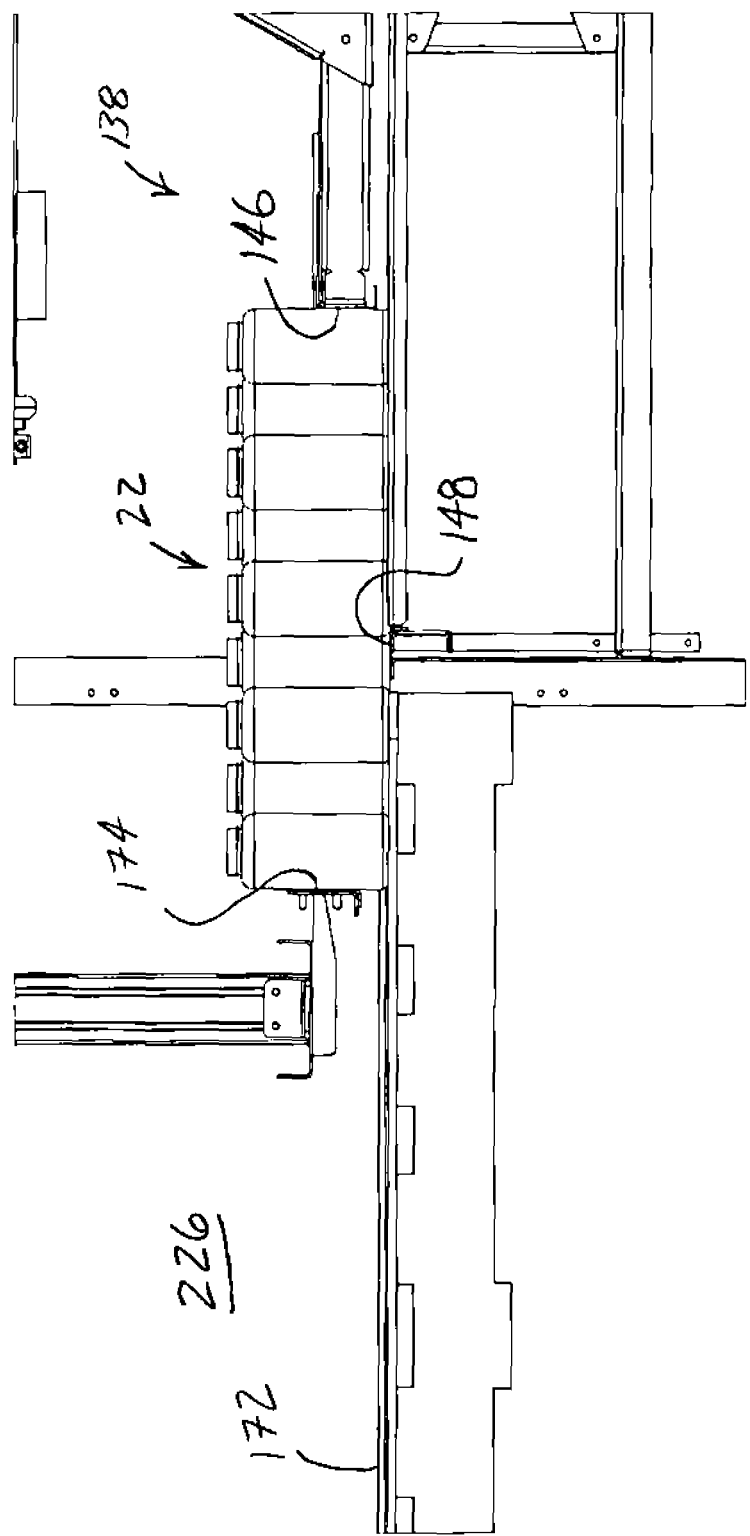
FIG. 34 is an operational movement of the forming/moving system of the article array forming/moving system of FIG. 3.

FIG. 3 shows an article array forming/moving system 112 configured to receive successive article rows 16 (FIG. 22) from article row delivery device 118 for forming the article array 22 (FIG. 29) in consolidation area 138 prior to moving the article array 22 to collection area 226, such as onto a slip sheet 172 (FIG. 34).

Figure 4:
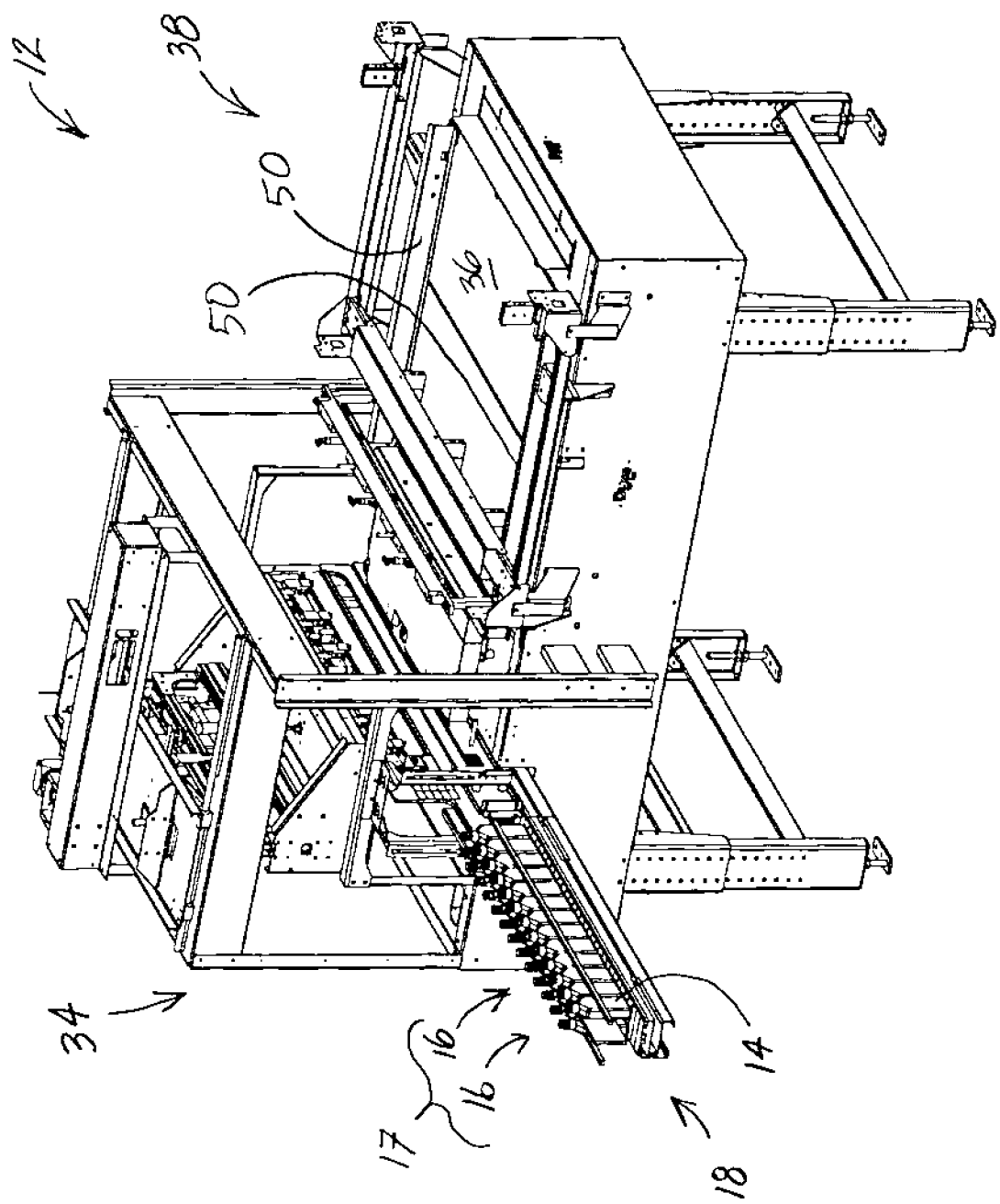
FIG. 4 is an upper perspective view of an exemplary article array forming/moving system.

FIG. 4 shows article array forming/moving system 12 that is configured to receive an article row pair 17 or pair of article rows 16 from article row delivery device 18. As shown in FIG. 4, article row delivery device 18 is a conveyor used in combination with an article row handling device 34. Article row handling device 34 receives article row pair 17 from article row delivery device 18, and then places the article row pair 17 onto a support surface 36 of a consolidation area 38. In another embodiment, the article row delivery device can include an article array head, such as article array moving device 28 (FIG. 1) used in combination with an article row delivery device 18 or other article row delivery source.

Figure 36:
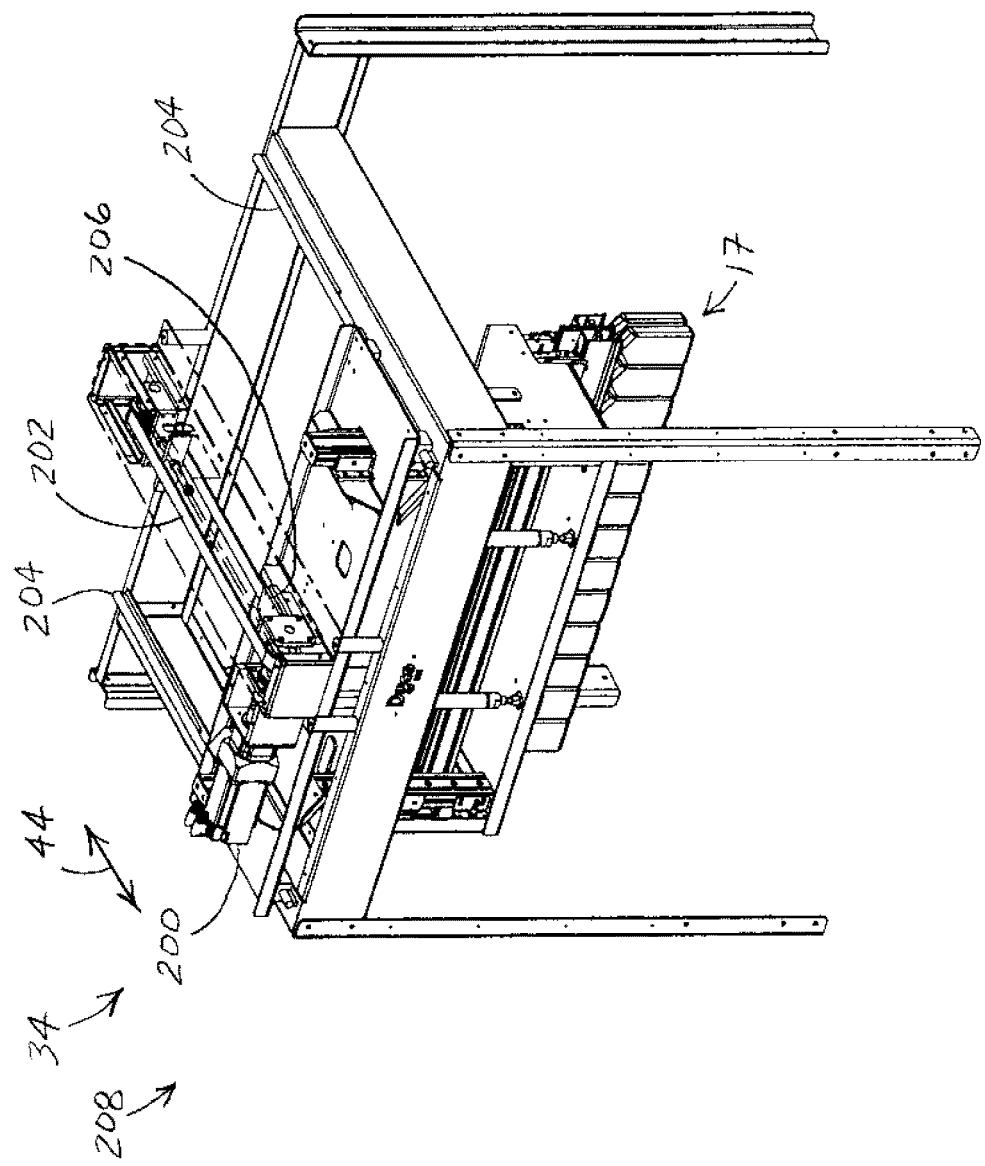
FIG. 36 is a partial cutaway view of the article array forming/moving system of FIG. 4 rotated 90 degrees counterclockwise about a vertical axis, the article array forming/moving system in a home position.
Figure 37:
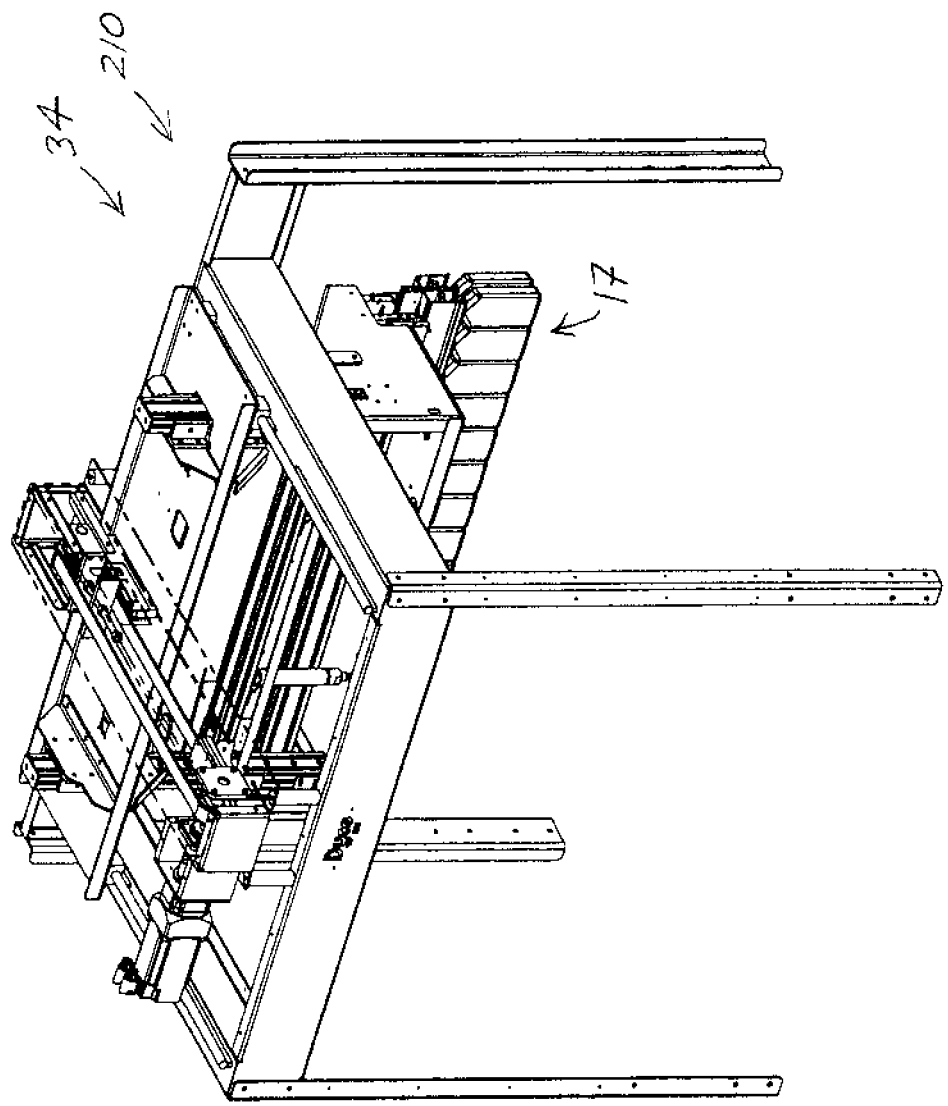
FIG. 37 is the partial cutaway view of the article array forming/moving system of FIG. 36 in an extended position.

As further shown in FIG. 36, which is a partial cutaway of FIG. 4 rotated 90 degrees counterclockwise about a vertical axis, article row handling device 34 is urged into movement in horizontal direction 44 along guides 204 by a motor 200 which rotationally drives a drive belt 202 that is connected to article row handling device 34 by a block 206. FIG. 36 shows article row handling device 34 in a home position 208 while FIG. 37 shows article row handling device 34 in an extended position 210.

Figure 5:
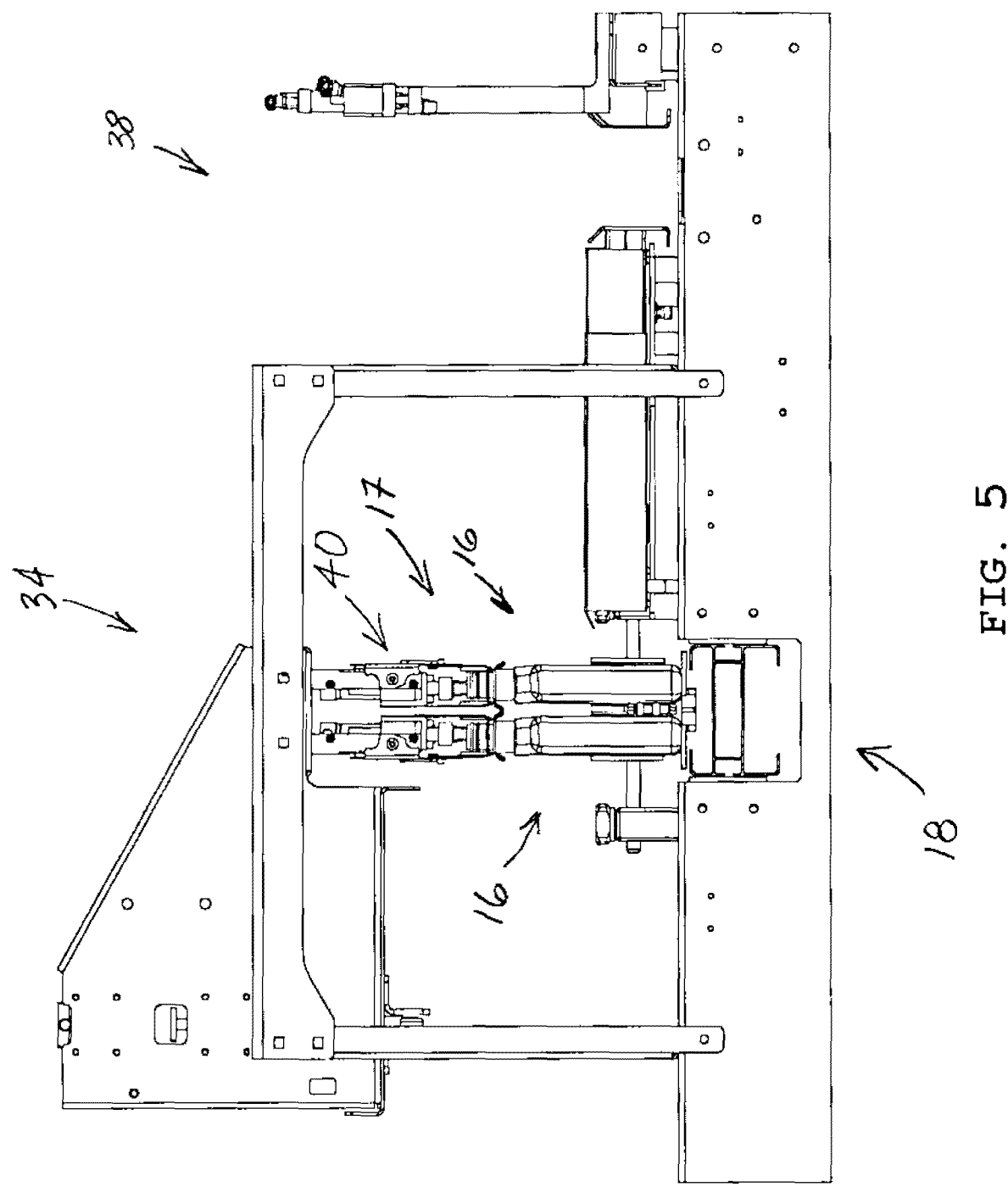
FIGS. 5-21 are sequential operational movements of the forming/moving system of the article array forming/moving system of FIG. 4.

FIGS. 5-17 sequentially show the operation of article array forming/moving system 12 (FIG. 4). It is to be understood that the exemplary sequential operation movements shown in FIGS. 5-17 (as well as other exemplary operational movements discussed in further detail below) may at least partially occur simultaneously or in an order different than that discussed. As shown in FIG. 5, the exemplary article row handling device 34 includes a clamping head 40 having a pair of gripping jaws for engaging each article row 16 of article row pair 17 received from article row delivery device 18. In one embodiment, the clamping head may be able to engage a different number of article rows, such as the number of article rows provided from the article row delivery device.

Figure 38:
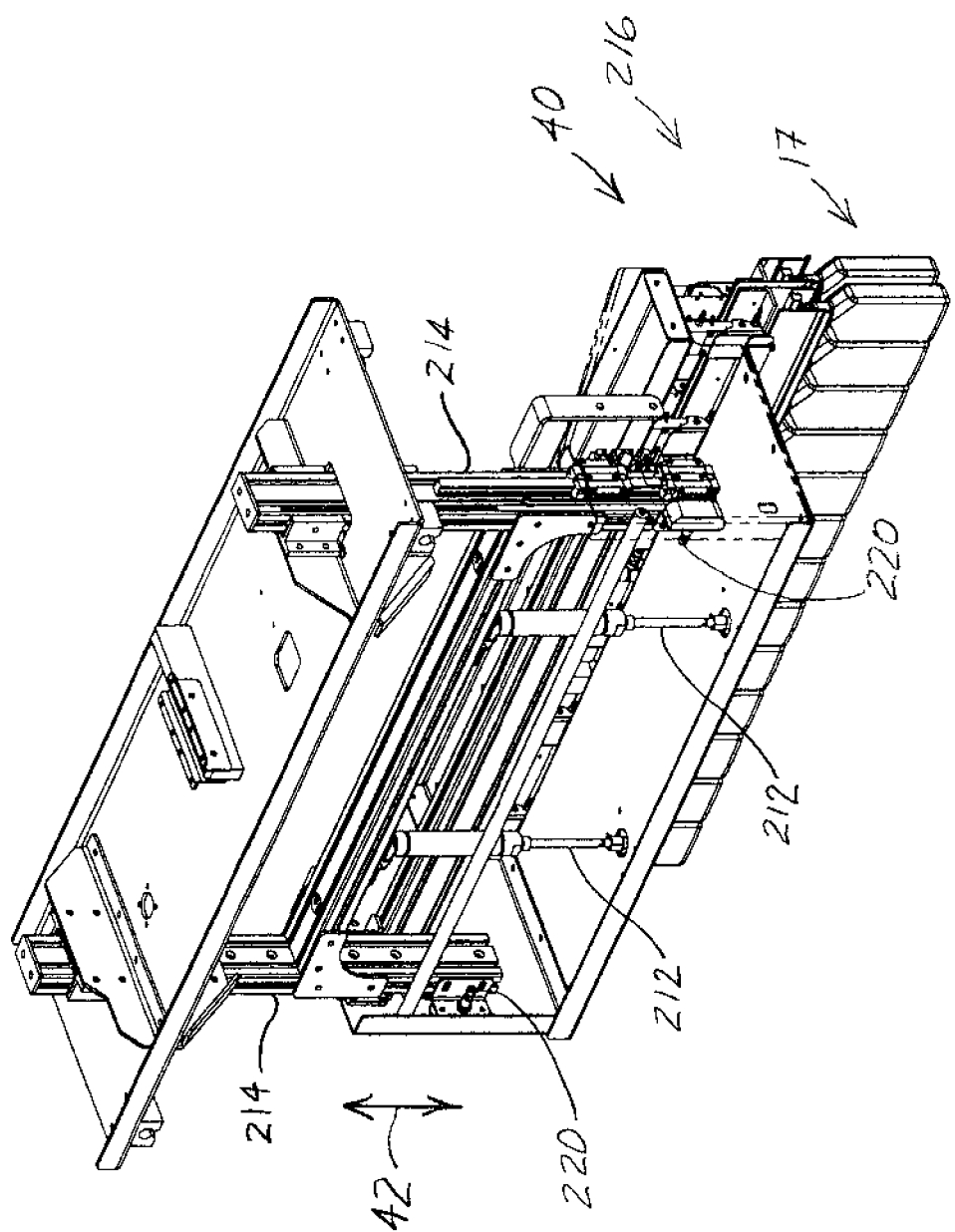
FIG. 38 is an exemplary upper perspective view of an exemplary clamping head in a lowered position.
Figure 39:
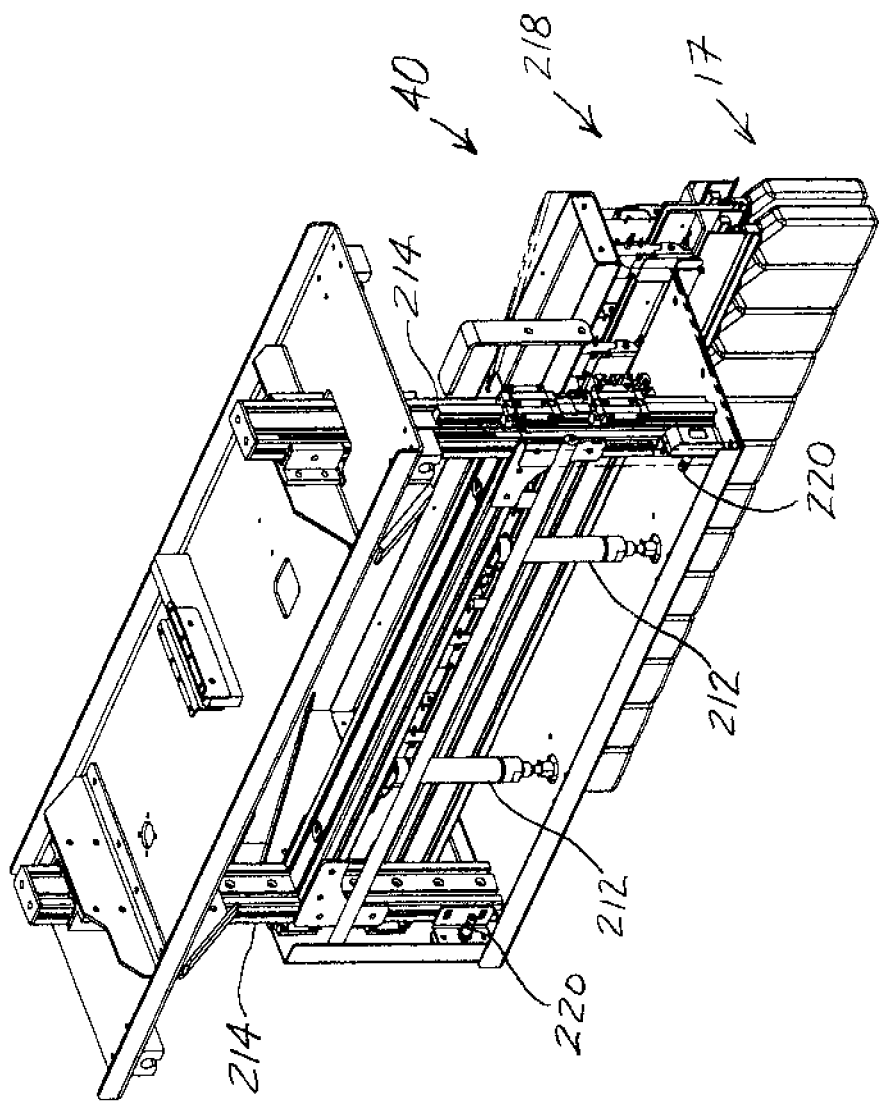
FIG. 39 is an exemplary upper perspective view of an exemplary clamping head in a raised position.

As shown in FIGS. 38-39, actuators 212 urge clamping head 40 into movement in vertical direction 42 along guides 214 between an extended or lowered position 216 (FIG. 38) and a raised position 218 (FIG. 39) as controlled by sensors 220 in a conventional manner.

Figure 6:
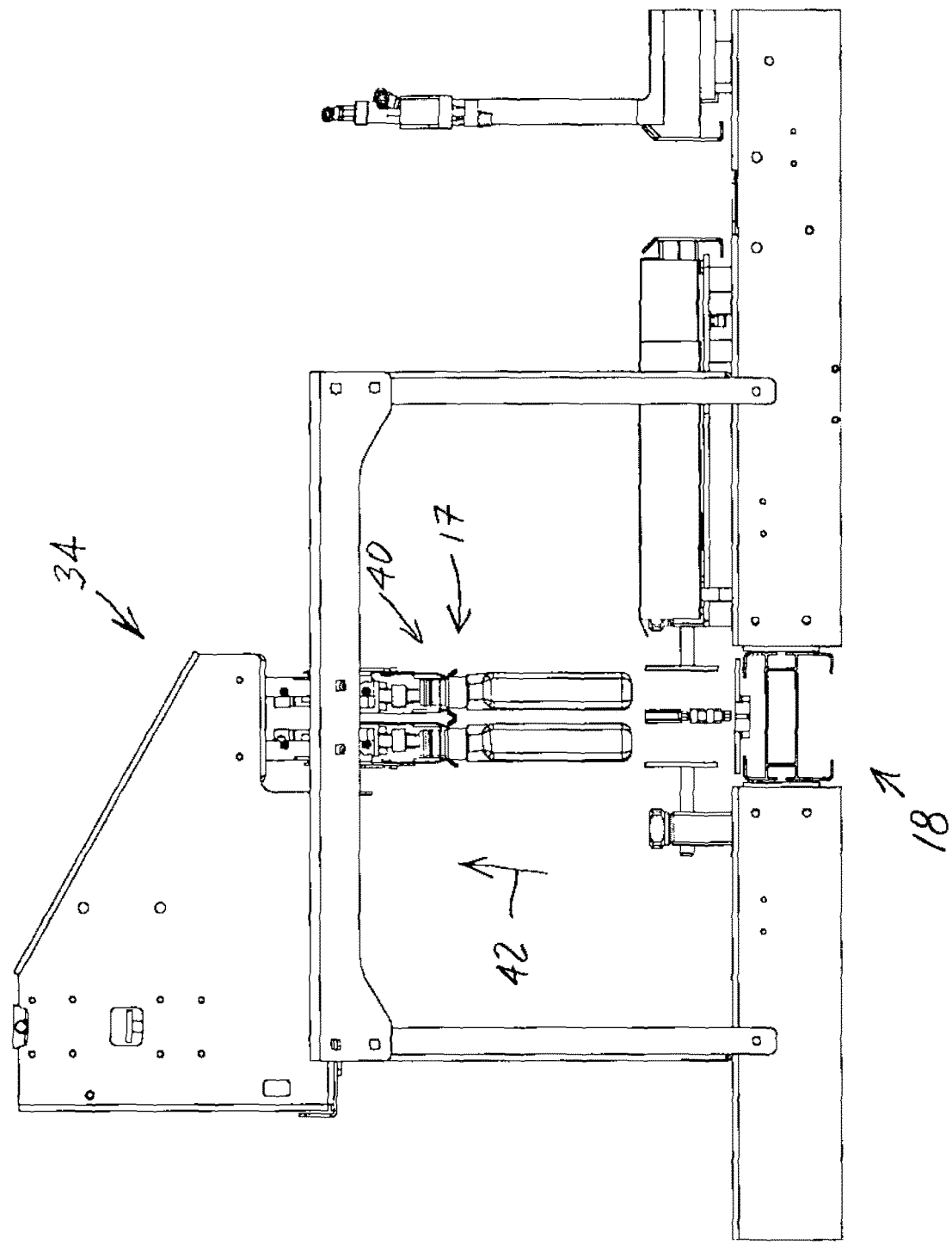

Once clamping head 40 engages article row pair 17 received from article row delivery device 18 in lowered position 216 (FIG. 38), then as shown in FIG. 6, article row handling device 34 raises article row pair 17 in a vertical direction 42 away from article row delivery device 18 toward raised position 218 (FIG. 39).

Figure 7:
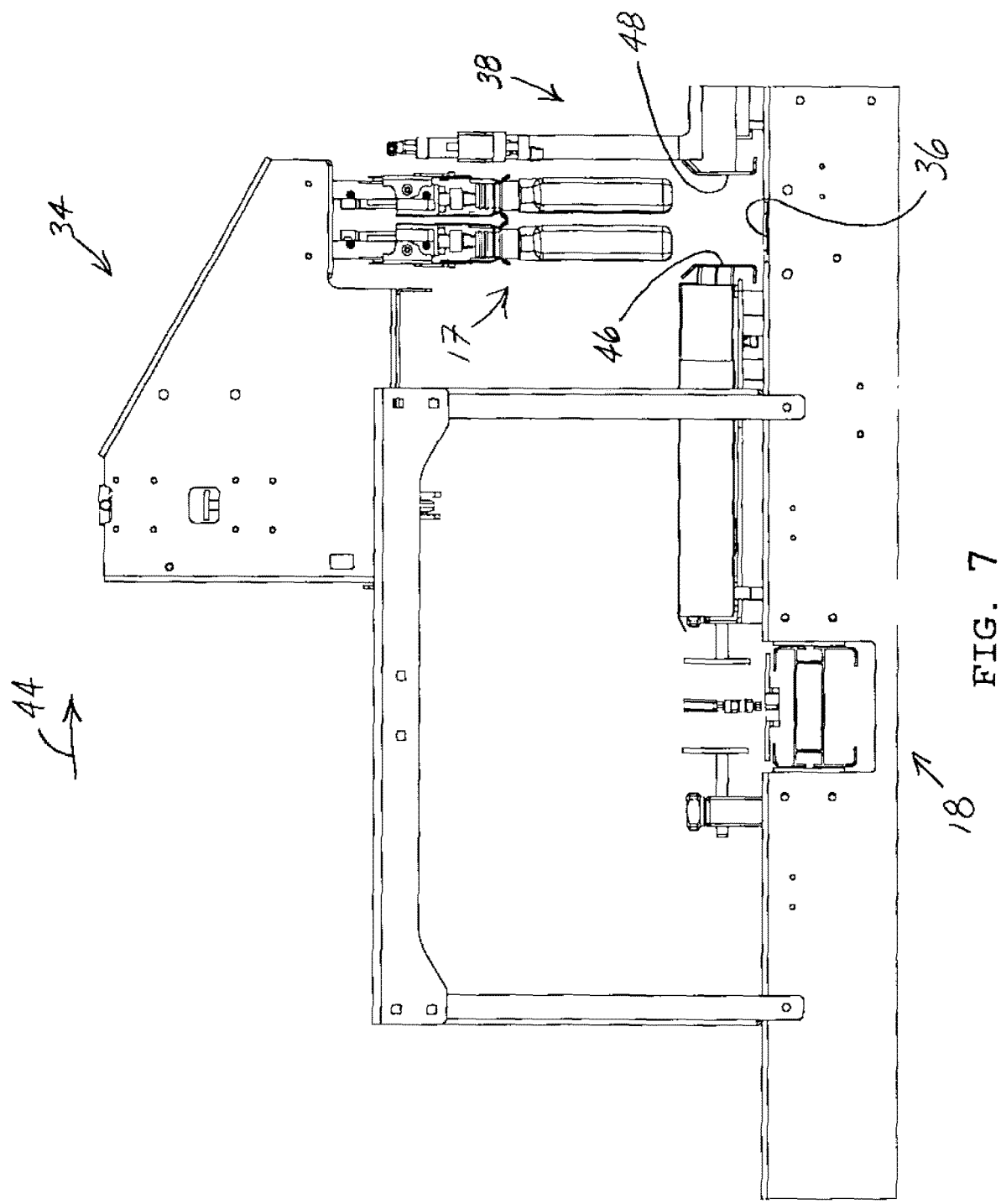

Once article row handling device 34 raises article row pair 17 away from article row delivery device 18, then as shown in FIG. 7, article row handling device 34 moves article row pair 17 in a horizontal direction 44 away from article row delivery device 18 toward extended position 210 (FIG. 37) until article row pair 17 is vertically positioned over a support surface 36 of consolidation area 38 and between a backing plate 46 and a stabilizer 48. Consolidation area 38 includes support surface 36, backing plate 46 and stabilizer 48 and other components as will be discussed in further detail below.

Figure 8:
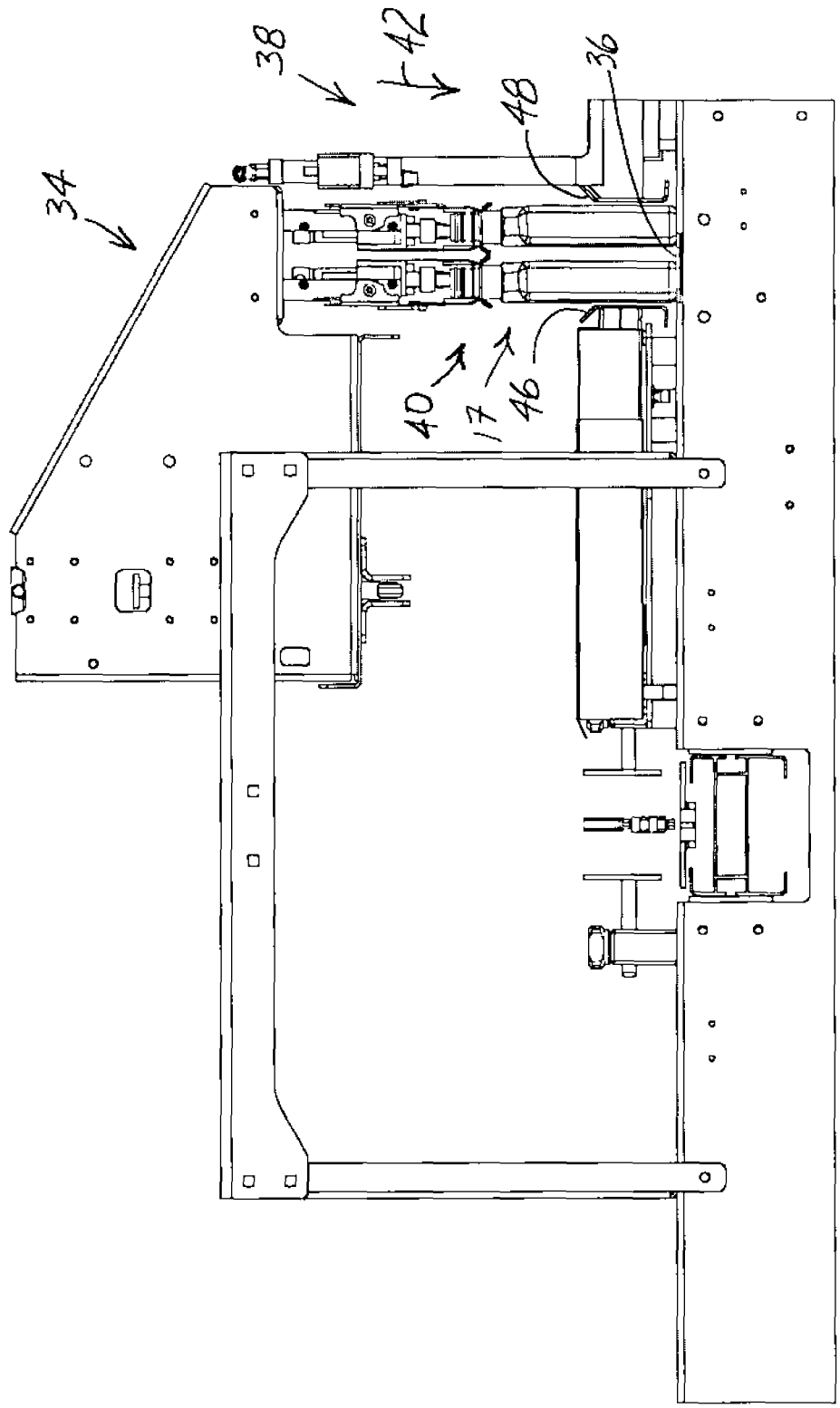

Once article row pair 17 is vertically positioned over support surface 36 of consolidation area 38 and between backing plate 46 and stabilizer 48, then as shown in FIG. 8, clamping head 40 of article row handling device 34 moves article row pair 17 in a vertical direction 42 toward lowered position 216 (FIG. 38) between backing plate 46 and stabilizer 48 until article row pair 17 contacts and is vertically supported by support surface 36 of consolidation area 38.

Figure 9:
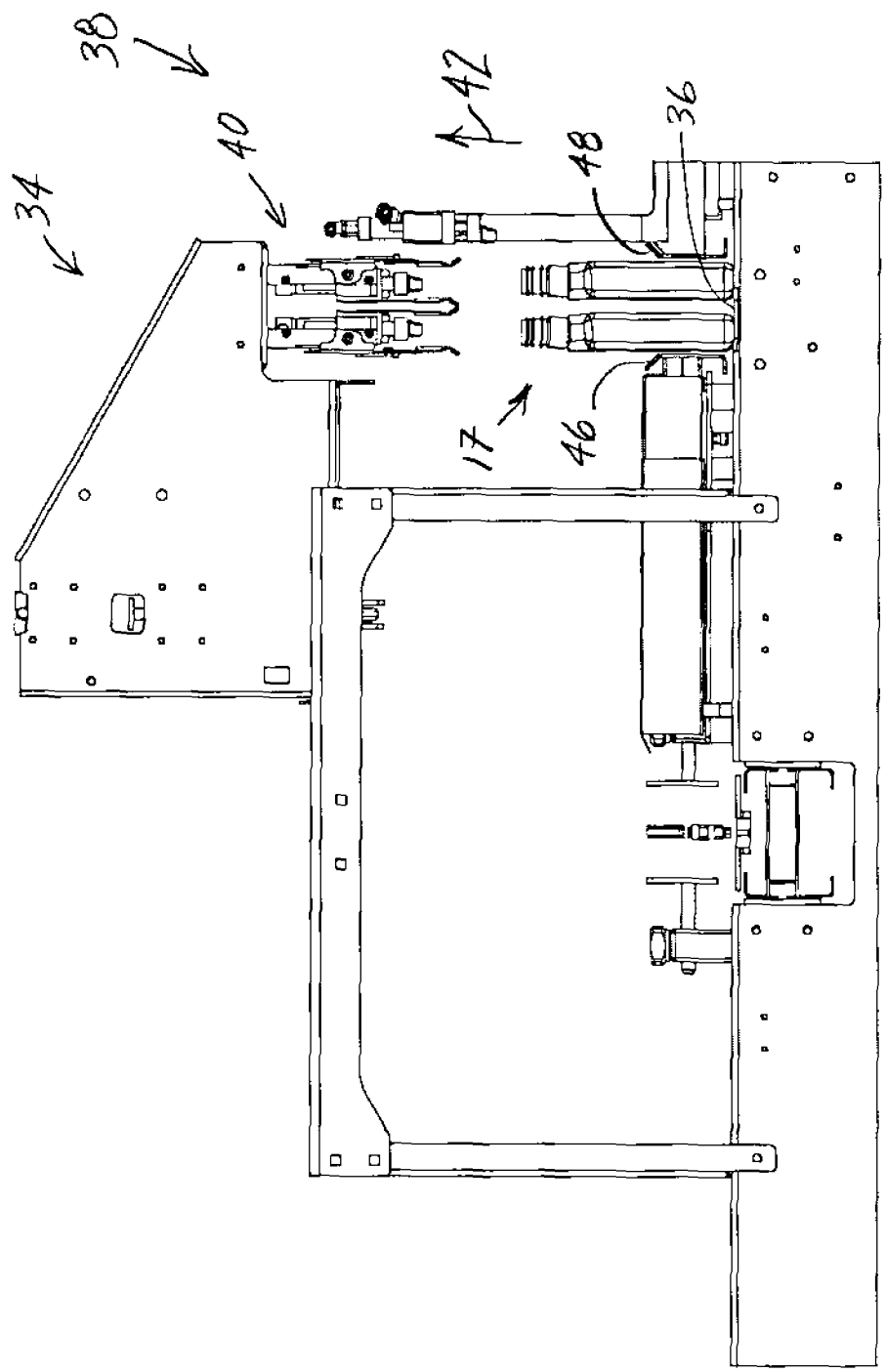

Once article row pair 17 contacts and is vertically supported by support service 36 of consolidation area 38, then as shown in FIG. 9, clamping head 40 of article row handling device 34 is disengaged from article row pair 17 and moves in vertical direction 42 away from the article row pair toward raised position 218 (FIG. 39). As a result, article row pair 17 is vertically supported by support surface 36 and the periphery of article row pair 17 is stabilizingly supported by consolidation area 38, which includes backing plate 46, stabilizer 48, and opposed support members 50 (FIG. 4).

For purposes herein, "stabilizingly supported" and variations thereof refer to support provided to at least the periphery of the article row(s) such as to prevent tipping of the articles. For example, such stabilizing support may include, but is not limited to lateral support, including support forces directed substantially perpendicular to the support surface of the consolidation area, and vertical compressive support forces applied to opposed ends of the article row(s), such as applied by clamping head 40 to corresponding ends of article row pair 17 opposite support surface 36, such as shown in FIG. 8.

Figure 10:
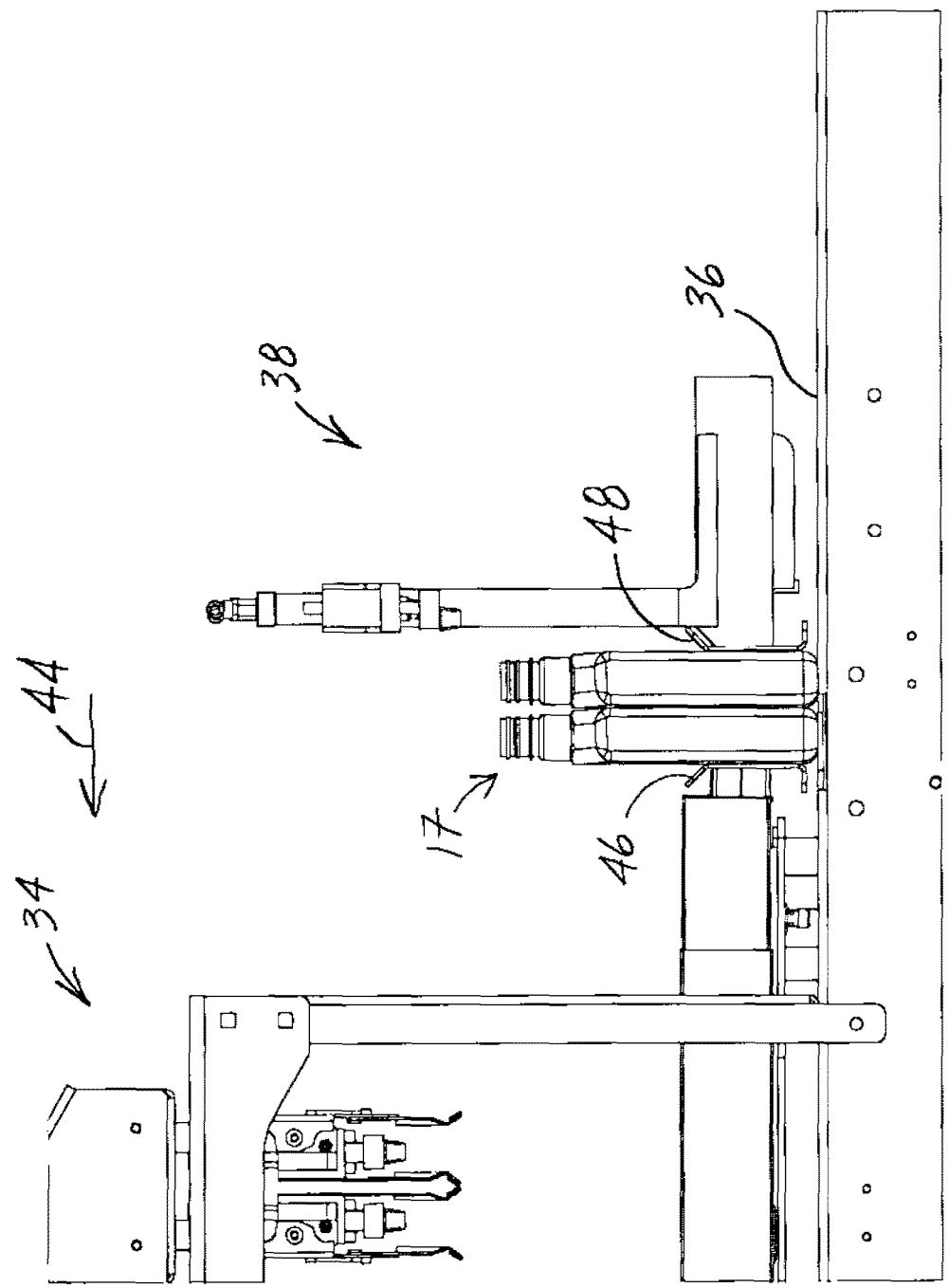

Once clamping head 40 of article row handling device 34 is disengaged from article row pair 17, and vertically moved away from article row pair 17, then as shown in FIG. 10, article row handling device 34 moves in horizontal direction 44 away from article row pair 17 toward home position 208 (FIG. 36) in preparation of engaging another article row pair 17 received from article row delivery device 18 (FIG. 5) as previously discussed.

Figure 11:
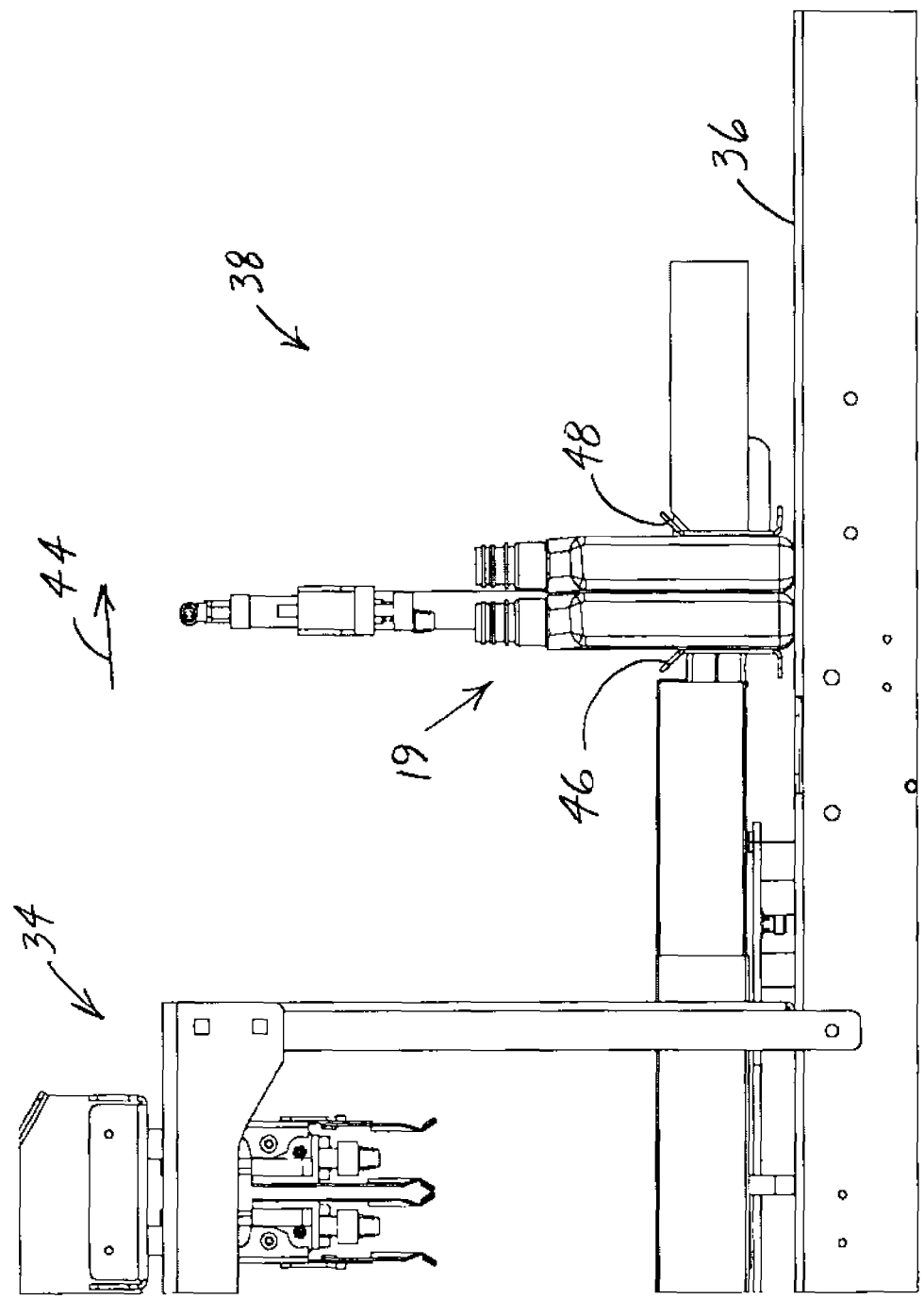

Once article row handling device 34 moves away from article row pair 17, then as shown in FIG. 11, backing plate 46 and stabilizer 48 move and stabilizingly support opposed portions of the periphery of article row pair 17 (FIG. 10) in a horizontal direction 44 away from article row handling device 34, becoming already positioned article rows 19, with support members 50 (FIG. 4) of consolidation area 38 providing stabilizing support of the remaining portions of the periphery of already positioned article rows 19. In other words, article row pair 17 and already positioned article rows 19 are each continuously stabilizingly supported by the backing plate 46, stabilizer 48 and consolidation area 38, such as shown in FIG. 40.

Figure 40:
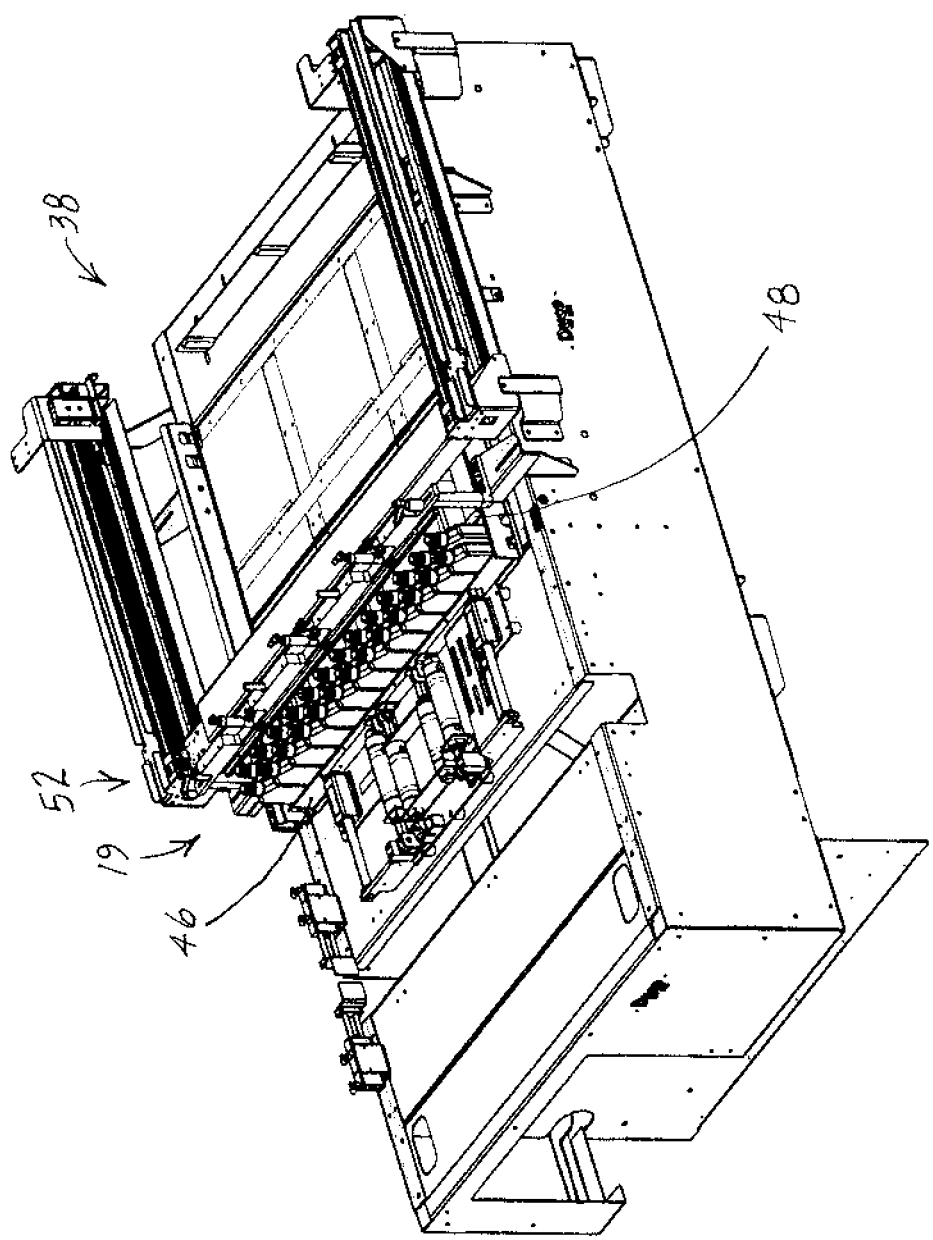
FIG. 40 is an upper perspective view of an exemplary stabilizer in a consolidation area.
Figure 41:
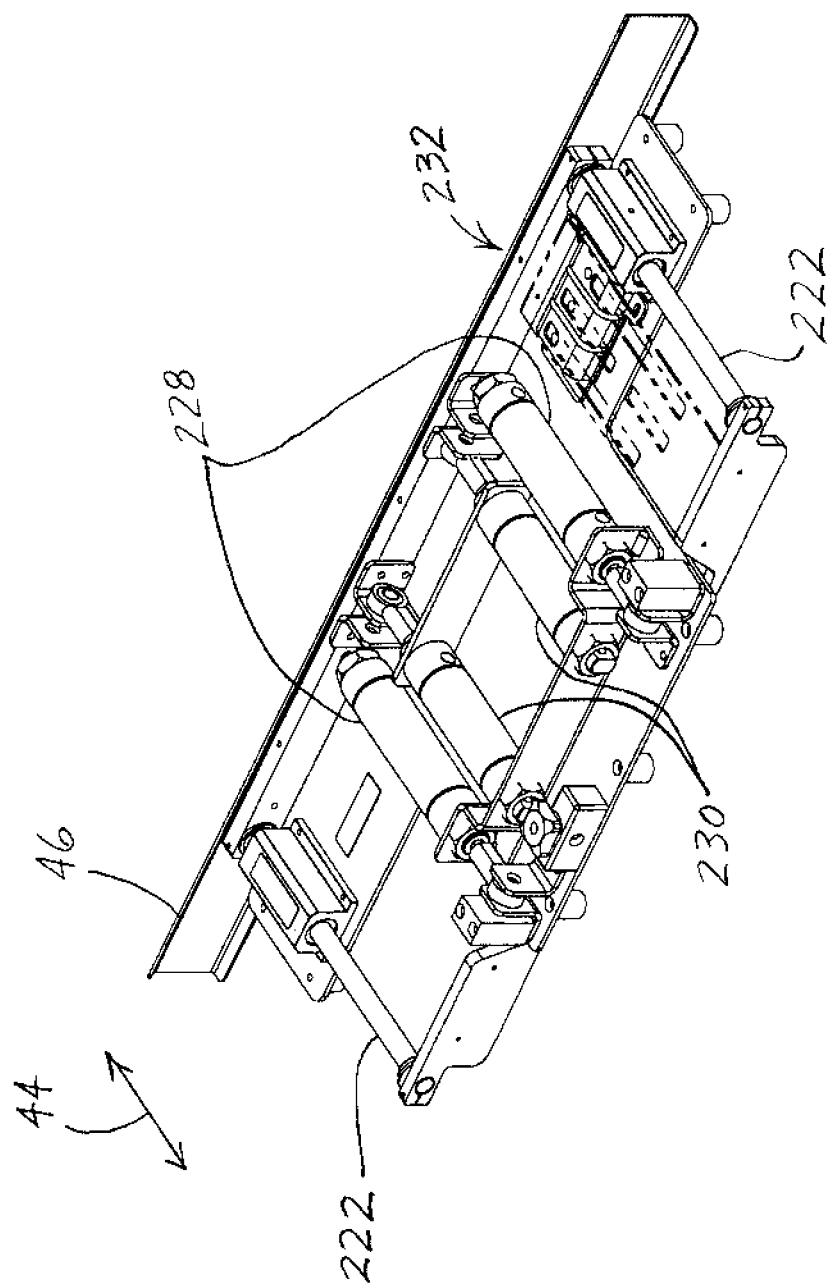
FIG. 41 is an enlarged, isolated upper perspective view of an exemplary backing plate of FIG. 40.

As shown in FIG. 41, which is an enlarged, isolated upper perspective view of backing plate 46 of FIG. 40, backing plate 46 is urged into movement in horizontal direction 44 along guides 222 by opposed actuators 228, 230 as controlled by sensors 232 in a conventional manner.

Figure 42:
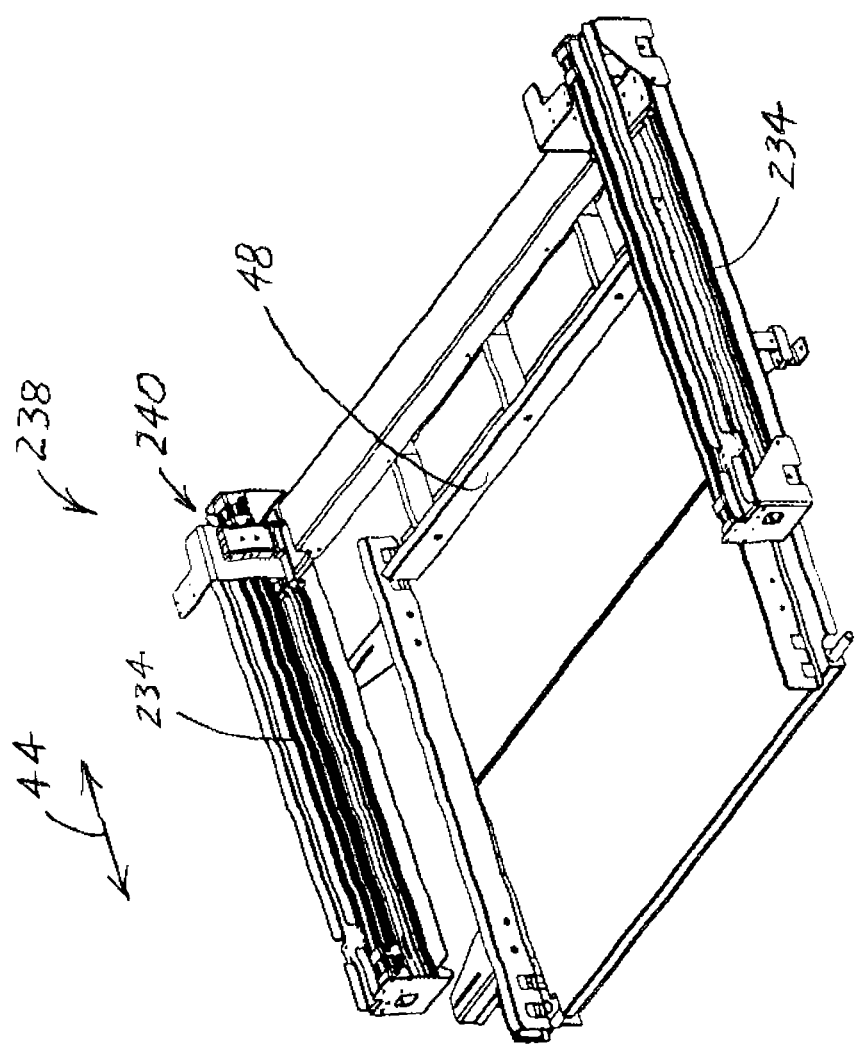
FIG. 42 is an enlarged, isolated upper perspective view of the stabilizer of FIG. 40 in an extended position.
Figure 43:
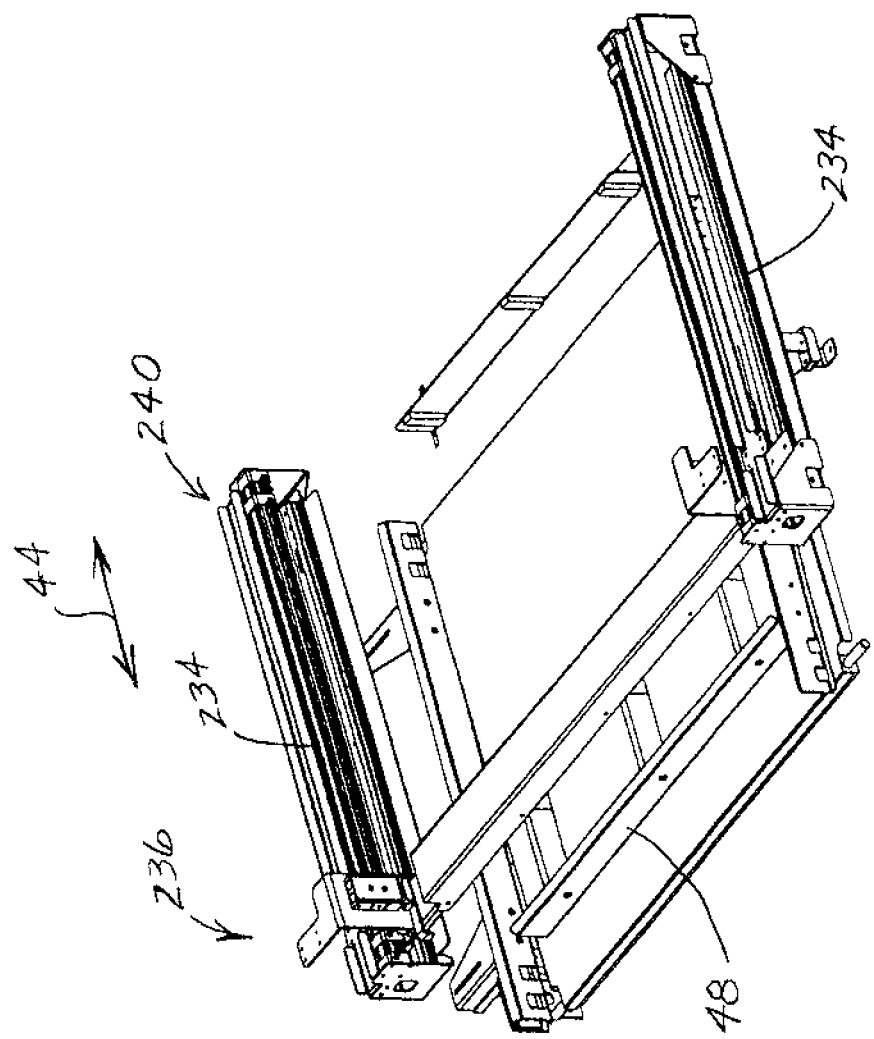
FIG. 43 is an enlarged, isolated upper perspective view of the stabilizer of FIG. 40 in a home position.

As shown in FIGS. 42-43, which are enlarged, isolated upper perspective views of stabilizer 48 of FIG. 40, stabilizer 48 slidably moves in horizontal direction 44 along guides 234 between a home position 236 (FIG. 43) and an extended position 238 (FIG. 42). Once an article array 22 (FIG. 18) is formed and subsequently removed by article array moving device 28 (FIG. 18), a linear actuator 240 (FIG. 42) selectively contacts and urges stabilizer 48 into movement in horizontal direction 44 from extended position 238 toward home position 236 in preparation of receiving article rows for forming another article array. Otherwise, stabilizer 48 "floats," or is urged into movement in horizontal direction 44 as a result of backing plate 46, which is moving in horizontal direction 44, applying a horizontal force to already positioned article 19, which already positioned article 19 then applying a horizontal force to stabilizer 48. However, between horizontal movements and applications of horizontal forces by backing plate 46 and already positioned article 19, stabilizer 48 maintains a fixed horizontal position due to inertia and friction between stabilizer 48 and guides 234, and continues to stabilizingly support at least a portion of the periphery of already positioned article 19.

Figure 12A:
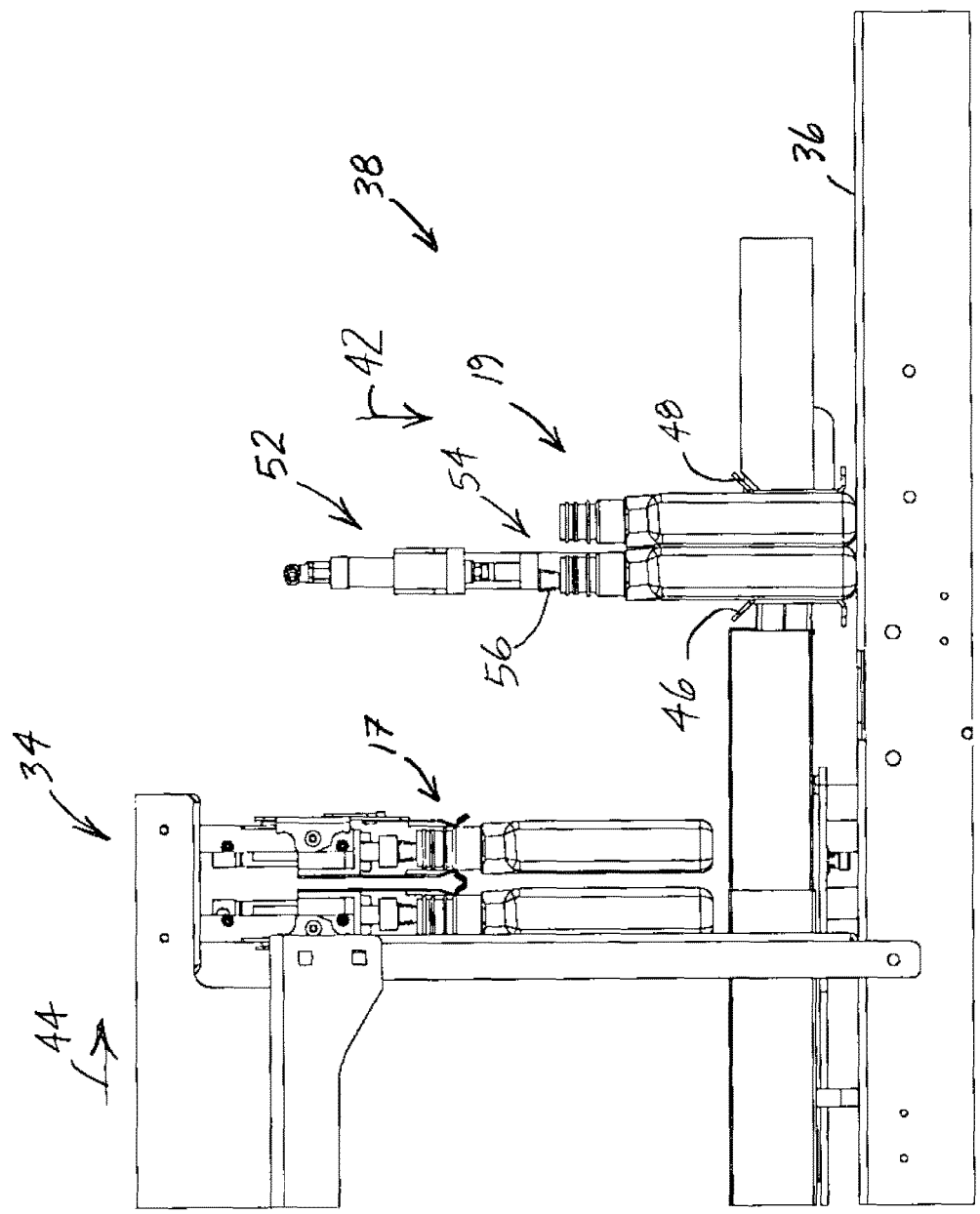

Once article row pair 17 has been moved and continuously stabilizingly supported to become continuously stabilizingly supported already positioned article rows 19, then as shown in FIG. 12A, stabilizer 52 moves a stabilizer bar 56 in vertical direction 42 until stabilizer bar 56 achieves a stabilizing position 54, applying a vertical compressive stabilizing force to at least a portion of the periphery of the already positioned article rows 19. Stabilizer 52 provides an additional, independent stabilizing support to at least the portion of the periphery of the already positioned article rows 19 simultaneously stabilizingly supported by backing plate 46. Article row handling device 34 moves another article row pair 17 in horizontal direction 44 toward already positioned article rows 19.

Figure 44:
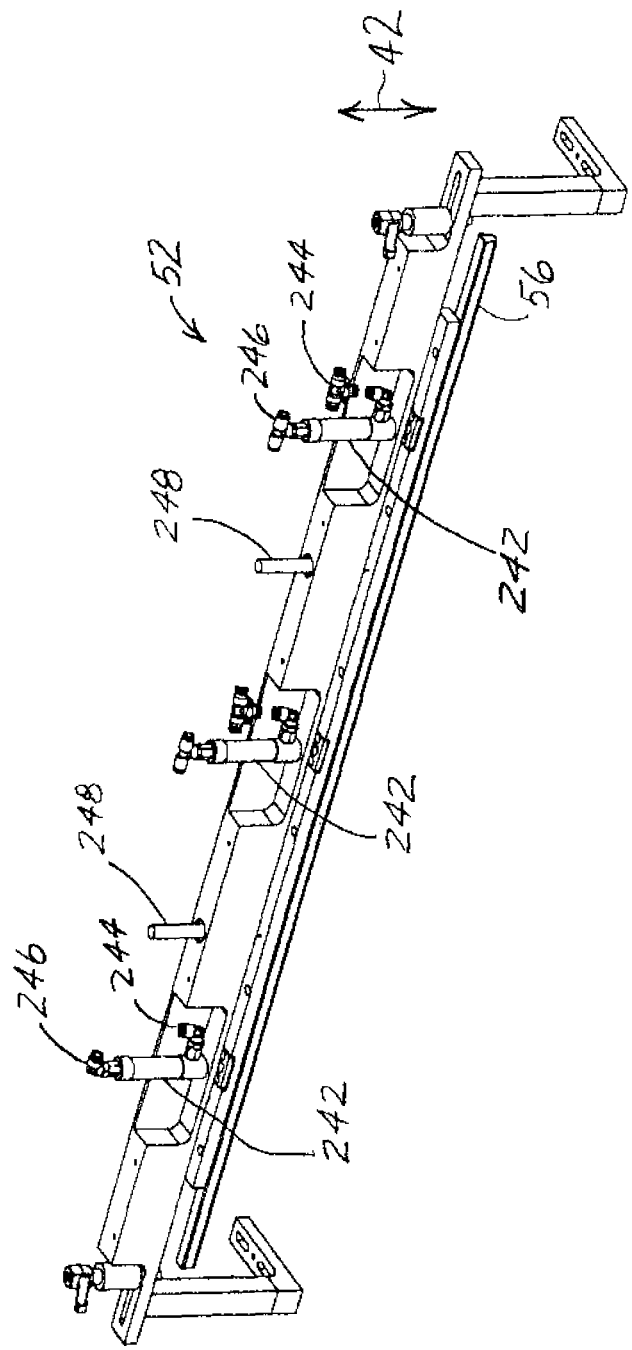
FIG. 44 is an enlarged, isolated upper perspective view of the stabilizer of FIG. 40.

FIG. 44 shows an enlarged, isolated upper perspective view of stabilizer 52 of FIG. 40. Stabilizer bar 56 is urged in vertical directions 42 along guides 248 by actuators 242. In response to an application of pressurized gas to fittings 244, actuators 242 urge stabilizer bar 56 to be raised, while in response of an application of pressurized gas to fittings 246, actuators 242 urge stabilizer bar 56 to be lowered.

Figure 12B:
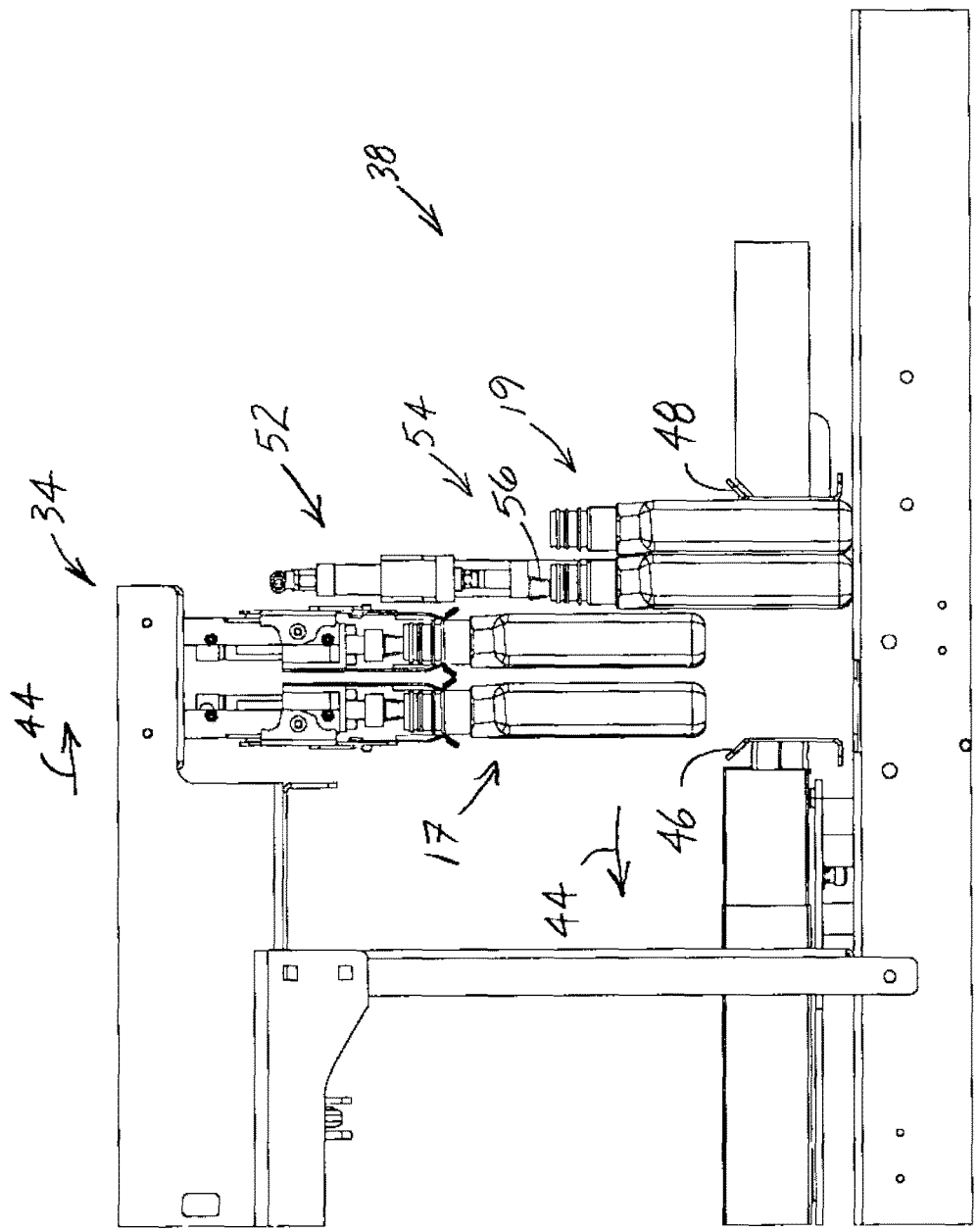

Once stabilizer bar 56 achieves stabilizing position 54, then as shown in FIG. 12B, backing plate 46 moves in horizontal direction 44 away from the already positioned article rows 19, and article row handling device 34 moves article row pair 17 in horizontal direction 44 until article row pair 17 is immediately adjacent to already positioned article rows 19 and vertically positioned between backing plate 46 and the already positioned article rows 19.

Figure 13:
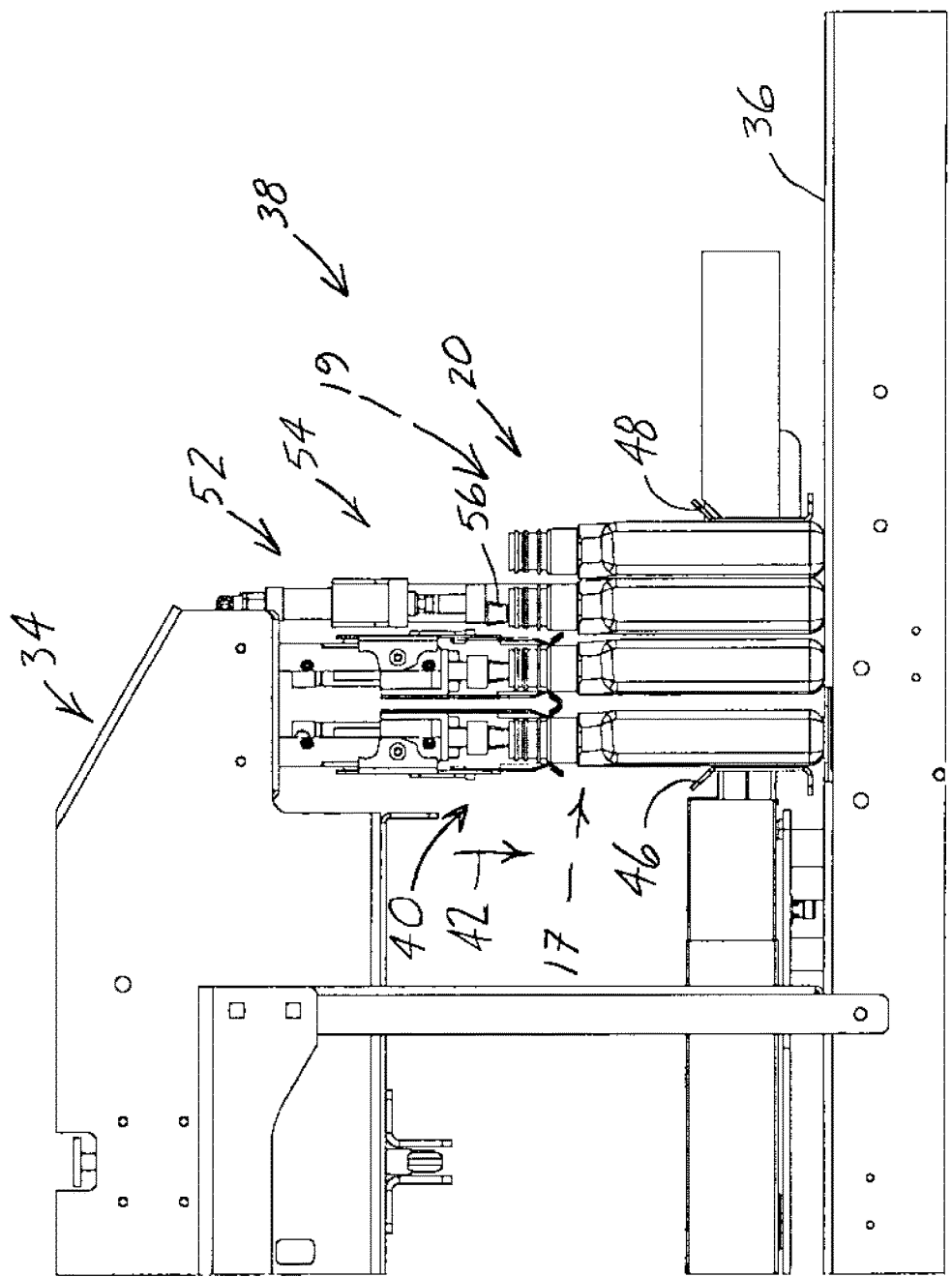

Once article row pair 17 is immediately adjacent to already positioned article rows 19, then as shown in FIG. 13, clamping head 40 of article row handling device 34 moves in vertical direction 42 between backing plate 46 and already positioned article rows 19 until article row pair 17 contacts and is vertically supported by support surface 36 of consolidation area 38. As a result of this arrangement, article row pair 17 being immediately adjacent to already positioned article rows 19, article row pair 17 stabilizingly supports already positioned article rows 19, becoming a partial article array 20. In one embodiment, article row pair 17 contacts and compressively secures already positioned article rows 19 while becoming partial article array 20. Opposed portions of the periphery of partial article array 20 are stabilizingly supported by backing plate 46 and stabilizer 48, as well as support members 50 (FIG. 4) stabilizingly supporting the remaining portions of the periphery of partial article array 20. As a result, partial article array 20 is continuously stabilizingly supported by backing plate 46, stabilizer 48 and consolidation area 38.

Figure 14:
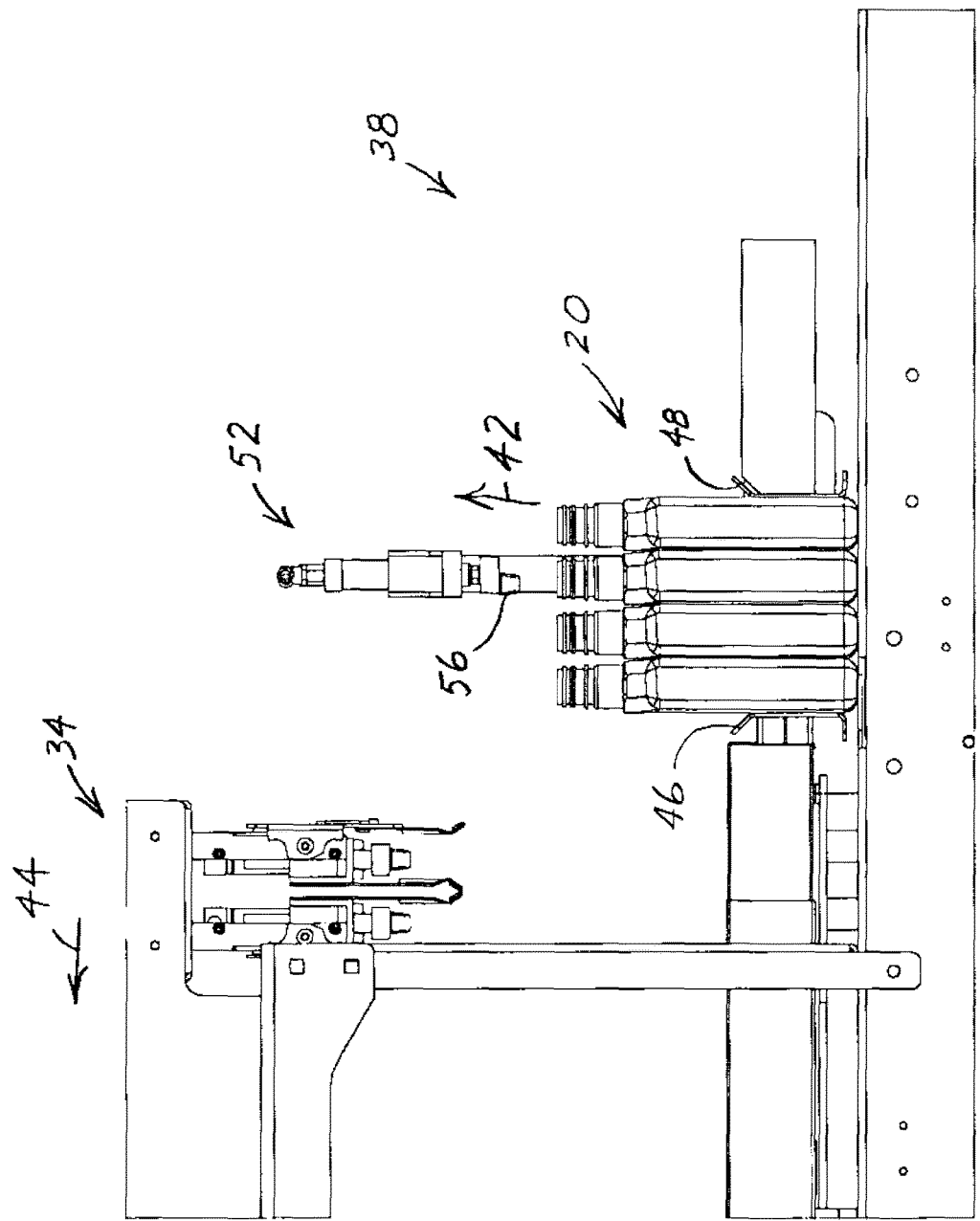

Once partial article array 20 has been formed, then as shown in FIG. 14, stabilizer bar 56 is moved in vertical direction 42 away from and disengaging partial article array 20. In one embodiment, stabilizer 52 is moved in one or more of vertical and horizontal directions such that the stabilizer is moved out of the path of an article array prior to the article array reaching a collection area, as will be discussed in further detail below. Despite disengagement from stabilizer bar 56, partial article array 20 is continuously stabilizingly supported by backing plate 46, stabilizer 48 and consolidation area 38.

Figure 15:
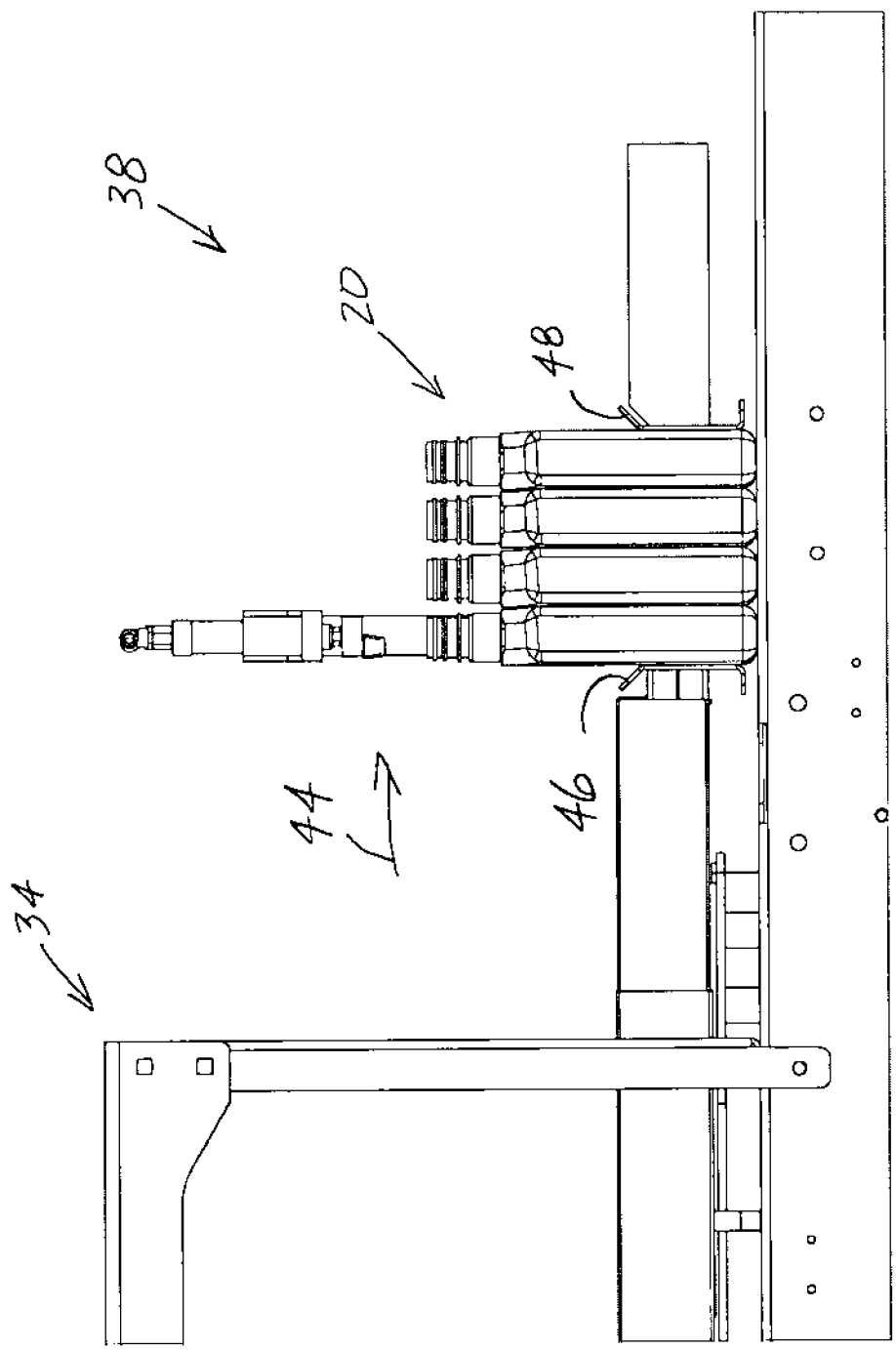

Once stabilizer bar 56 has been disengaged from partial article array 20, then as shown in FIG. 15, backing plate 46 and stabilizer 48 move and stabilizingly support opposed portions of the periphery of partial article array 20 in a horizontal direction 44 away from article row handling device 34 in preparation of adding additional article row pair(s) 17, such as previously discussed and shown in FIGS. 11-14. The periphery of partial article array 20 is continuously stabilizingly supported by the backing plate 46, stabilizer 48 and consolidation area 38, as previously discussed.

Figure 16:
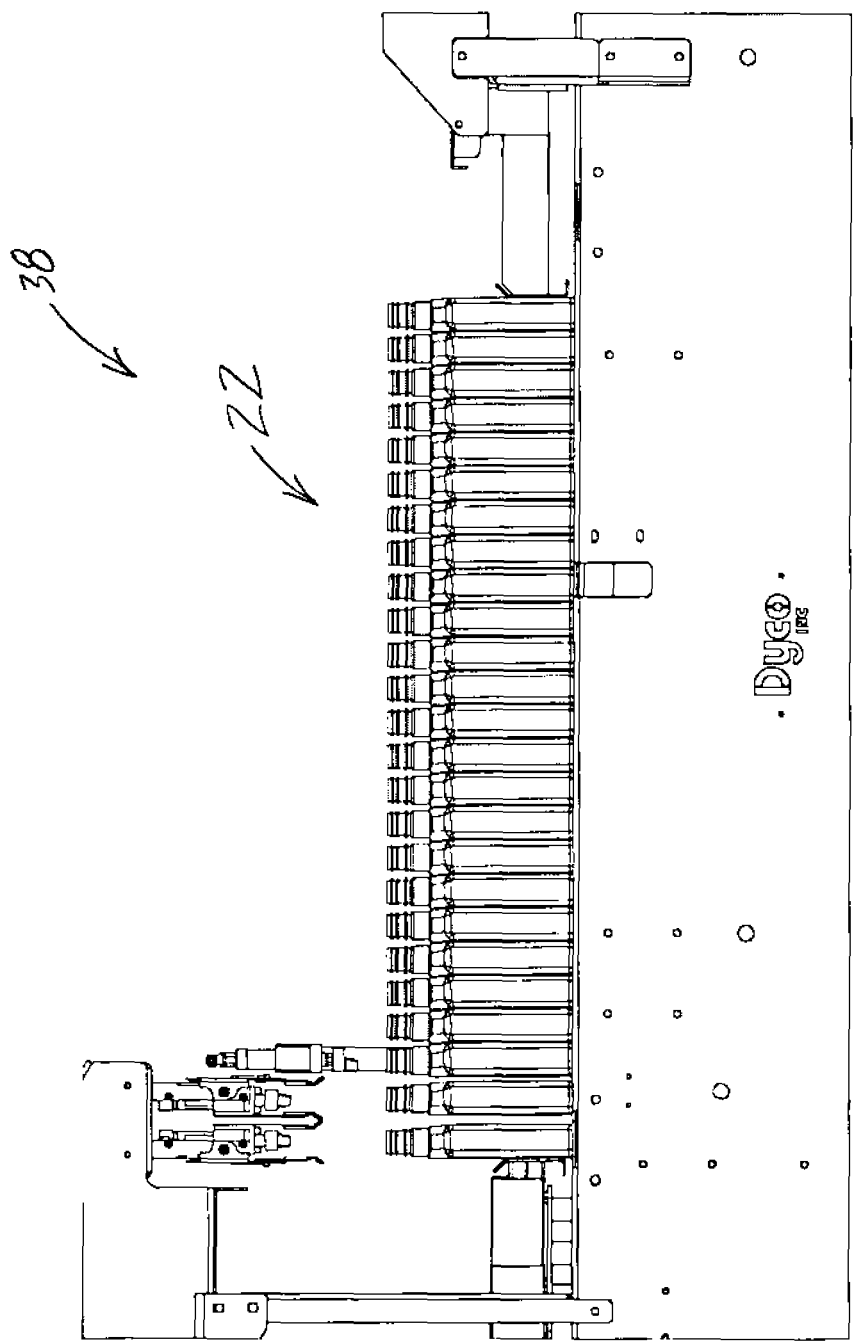

FIG. 16 shows a fully formed or completely built-up or loaded article array 22 that is continuously stabilizingly supported by consolidation area 38, having been continuously stabilizingly supported during the build-up or loading of article array 22.

Figure 17:
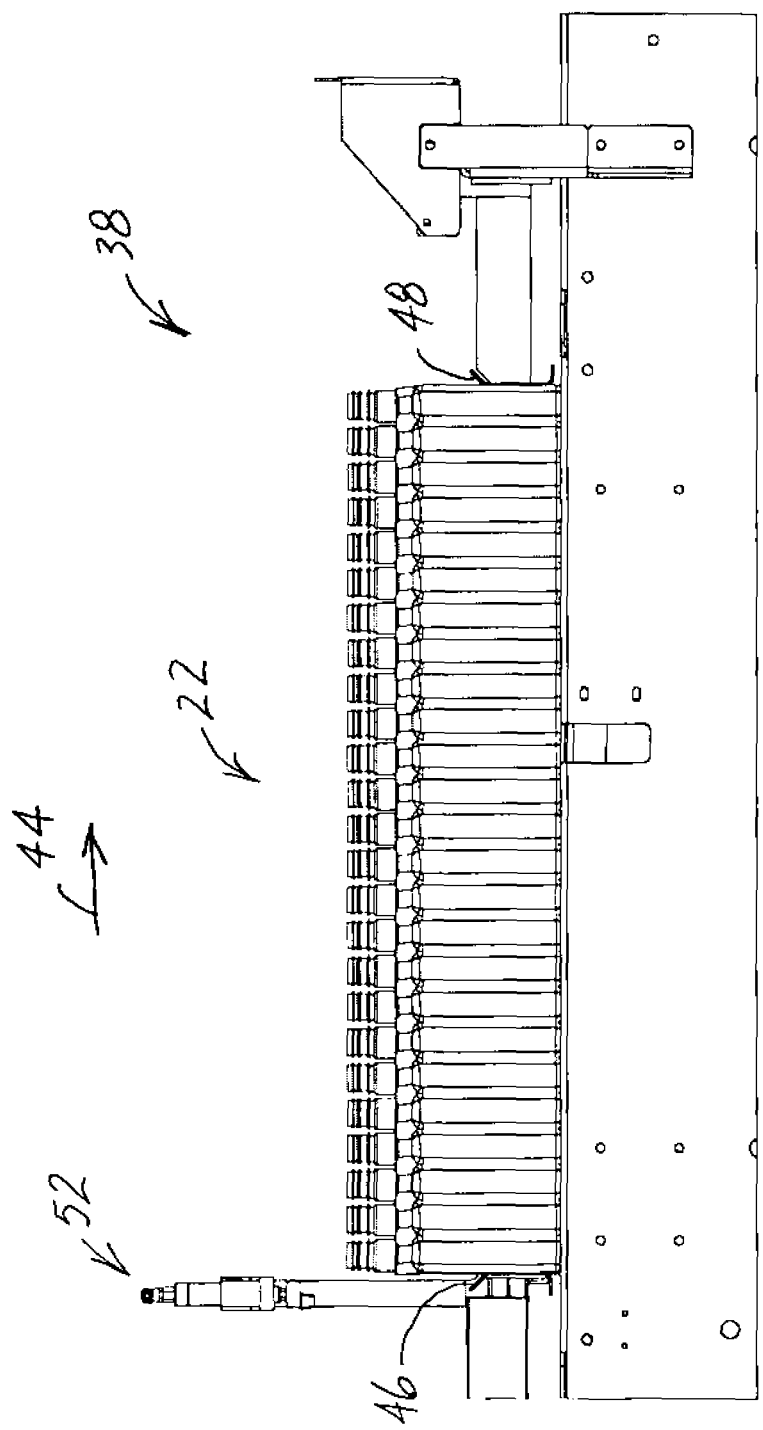
Figure 18:
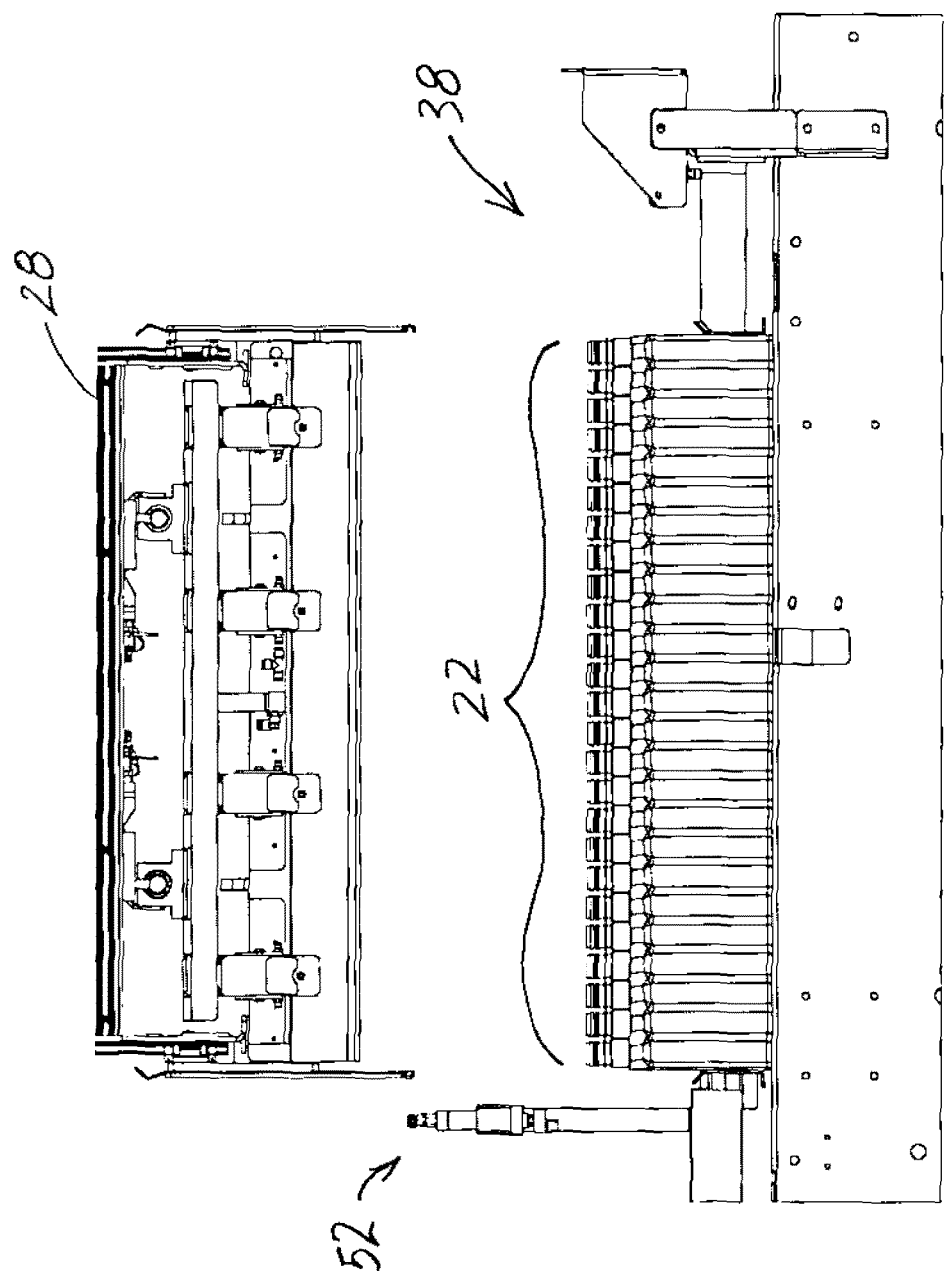
Figure 20A:
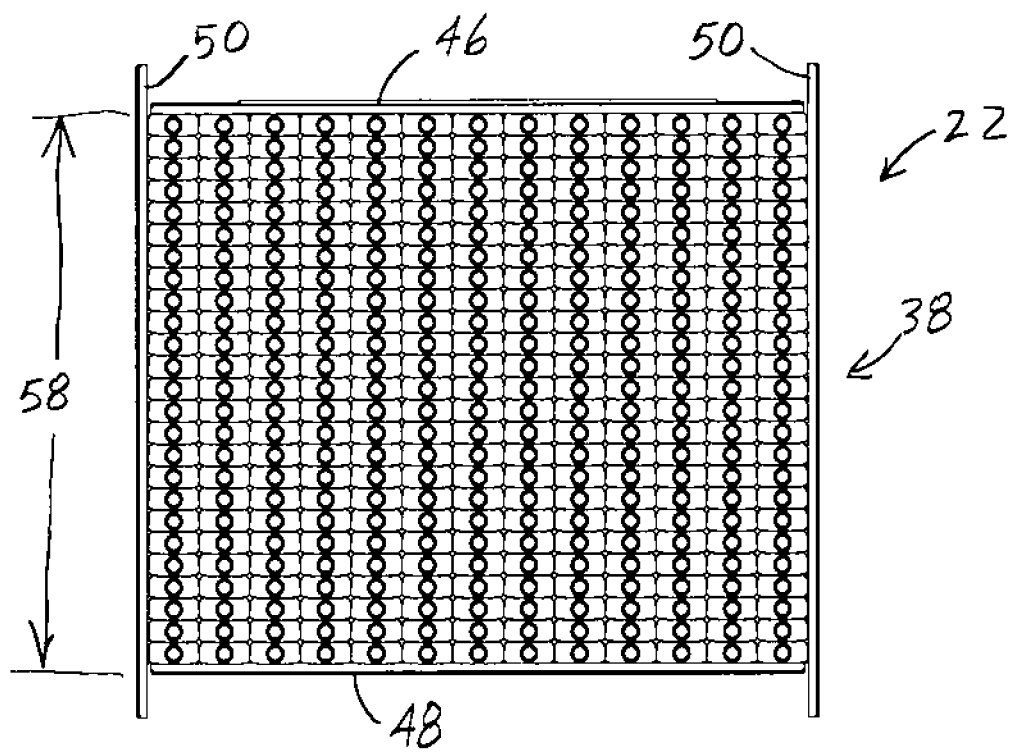
Figure 20B:
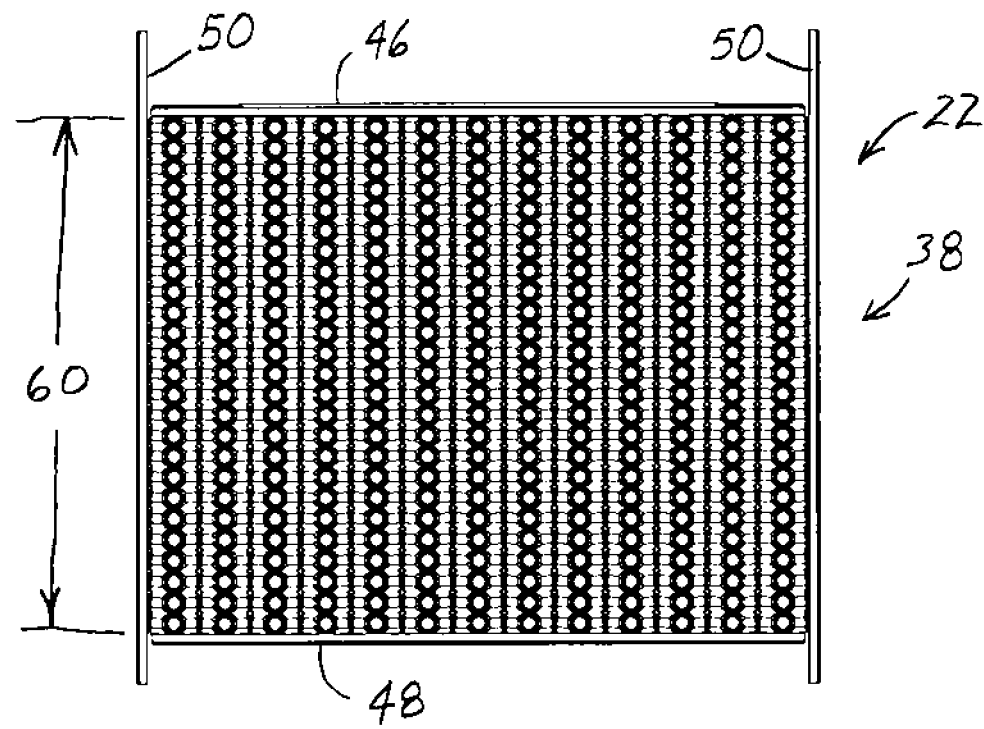

Once article array 22 has been formed, then as shown in FIG. 17, backing plate 46 and stabilizer 48 move and stabilizingly support opposed portions of the periphery of article array 22 in horizontal direction 44 away from stabilizer 52 in preparation of moving article array 22 to collection area 26 (e.g., FIG. 1). FIG. 20A is a plan view of the periphery of article array 22 continuously stabilizingly supported by the backing plate 46, stabilizer 48 and consolidation area 38, as previously discussed, having a distance 58 between backing plate 46 and stabilizer 48. FIG. 20B is a plan view of the periphery of article array 22 that is similar to FIG. 20A, except that backing plate 46 and stabilizer 48 are moved toward each other such that the distance therebetween is reduced, such as to a distance 60, thereby reducing the vertical cross section of article array 22. It may be desirable to reduce the vertical cross section of article array 22 when the article array moving device 28 utilized is an article array head, as shown in FIG. 18 for reasons such as facilitating moving the article array to a collection area 26, such as inside of a container having an opening of a fixed size. Upon being moved inside the container, the article array cross section would elastically increase to the extent possible inside of the container, providing increased stability of the article array inside of the container.

Once article array 22 has been moved, then as shown in FIG. 18, article array moving device 28, such as an article array head is vertically aligned with article array 22.

Figure 19:
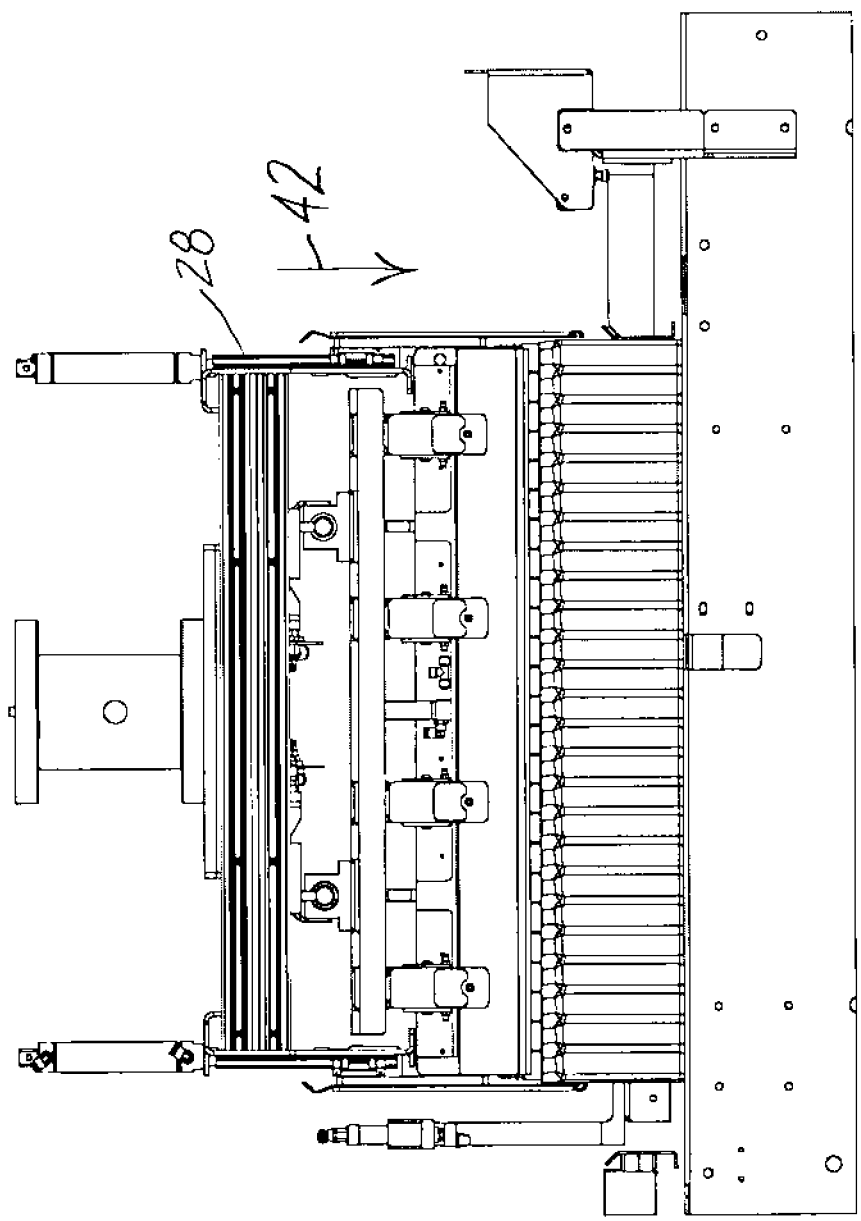
Figure 21:
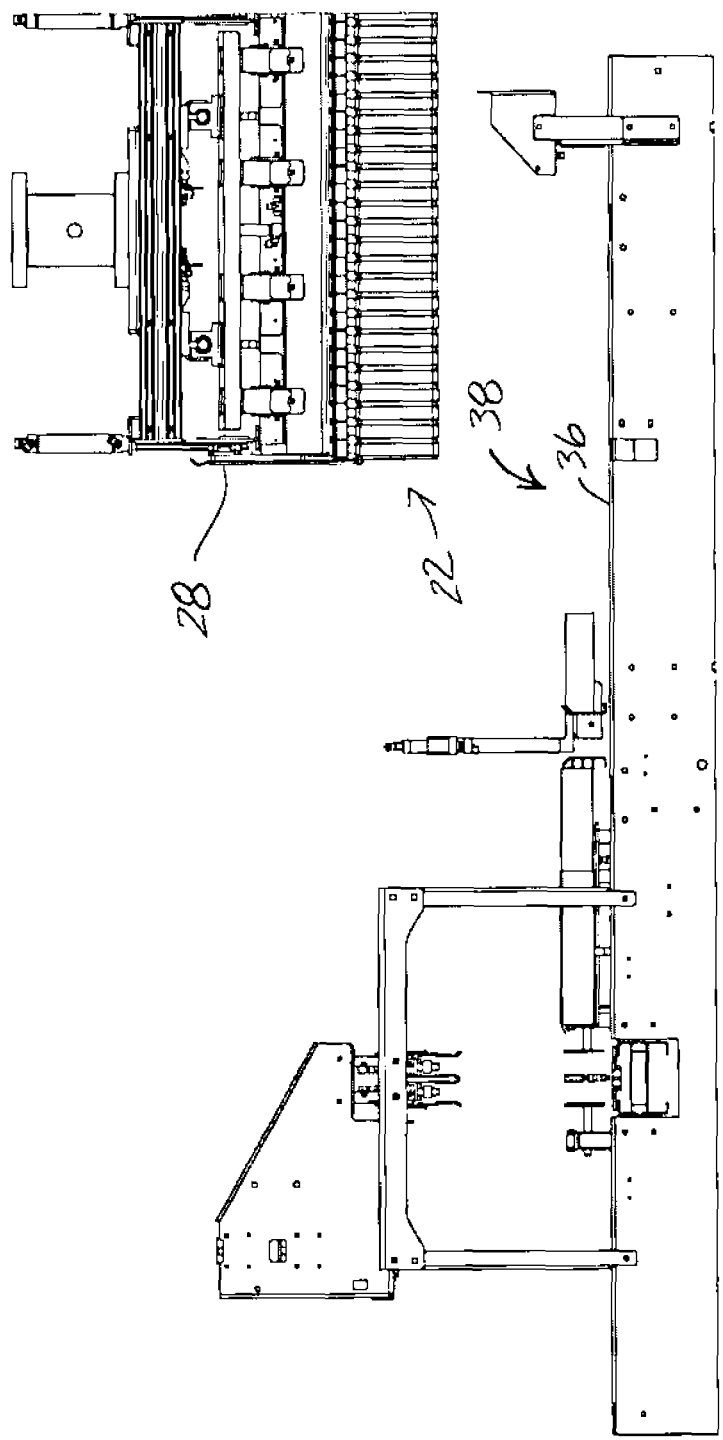

Once article array moving device is vertically aligned with article array 22, then as shown in FIG. 19, article array moving device 28 is moved in vertical direction 42 until engaging article array 22. FIG. 21 shows article array moving device 28 lifting and moving article array 22 from support surface 36 of consolidation area 38 toward a collection area 26 (FIG. 1). Once article array 22 has been moved toward collection area 26 by article array moving device 28, linear actuator 240 (FIG. 42) selectively contacts and urges stabilizer 48 into movement in horizontal direction 44 from extended position 238 toward home position 236 in preparation of receiving article rows for forming another article array.

In one embodiment, stabilizer 52 may be moved in one or more of vertical and horizontal directions such that stabilizer 52 is moved out of the path of article array 22 prior to the article array 22 reaching a collection area. For example, such as shown in FIG. 15, if stabilizer 52 were moved such that article array 22 is vertically accessible by article array moving device 28 (FIG. 18), it may be possible to eliminate further movement of the article array, as shown in FIG. 18, i.e., the backing plate 46 and stabilizer 48 moving and stabilizingly supporting opposed portions of the periphery of article array 22 in horizontal direction 44 away from stabilizer 52 in preparation of moving article array 22 to collection area 26 (e.g., FIG. 1).

Figure 22:
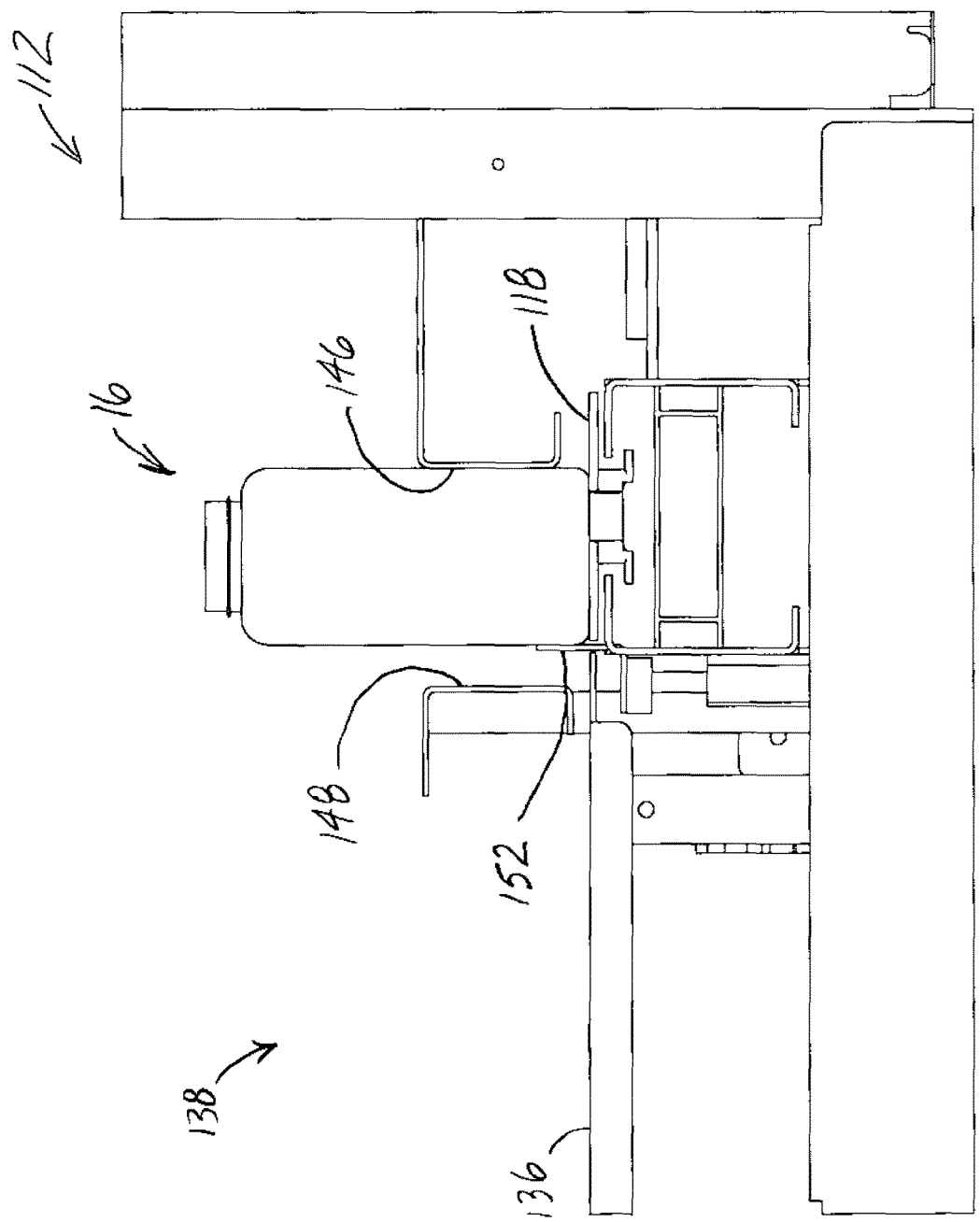
FIGS. 22-33 are sequential operational movements of the forming/moving system of the article array forming/moving system of FIG. 2.

FIGS. 22-28 sequentially show the operation of article array forming/moving system 112, such as shown in FIG. 2. It is to be understood that the exemplary sequential operation movements shown in FIGS. 22-28 may at least partially occur simultaneously or in an order different than that discussed. As shown in FIG. 22, article row 16 is received from article row delivery device 118, such as a conveyor. In one embodiment, article row delivery device 118 may provide more than one article row 16.

Figure 45:
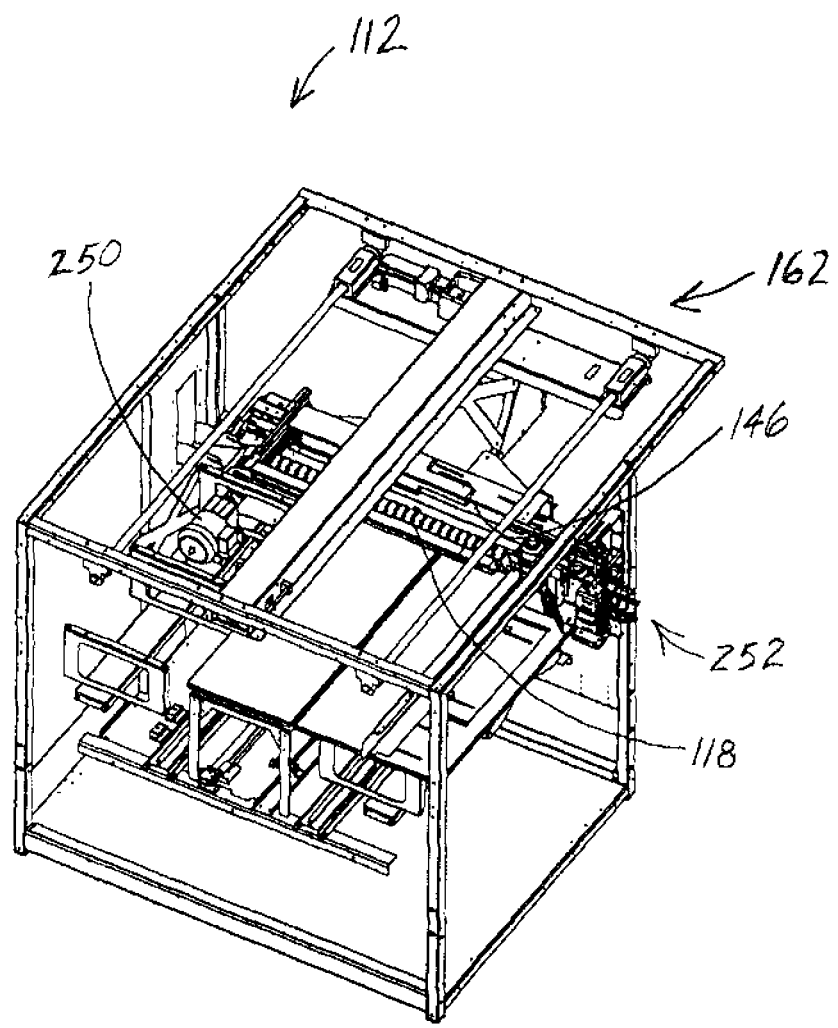
FIG. 45 is a partial cutaway view of the article array forming/moving system of FIG. 2, the article array forming/moving system being rotated 90 degrees counterclockwise about a vertical axis.
Figure 46:
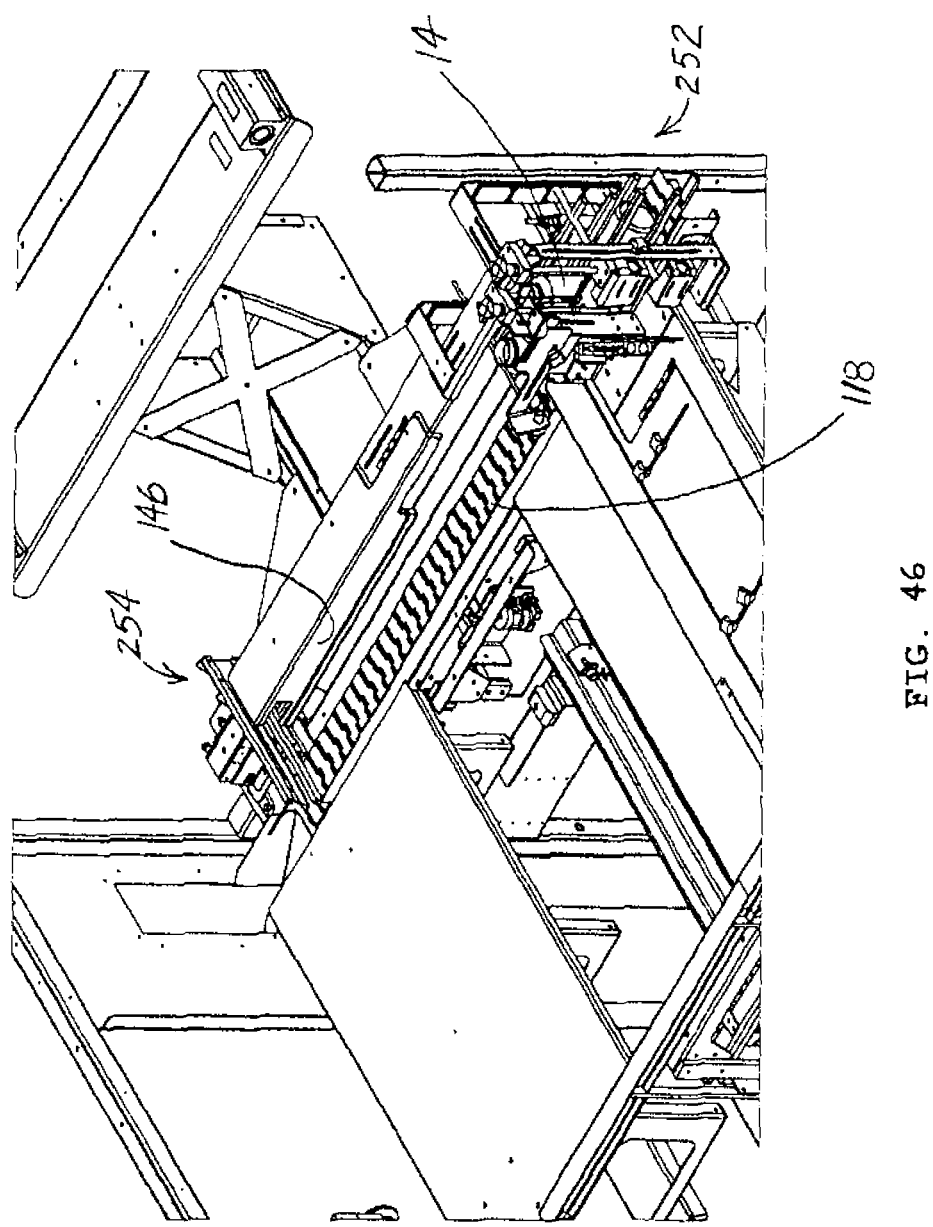
FIG. 46 is an enlarged, partial view of FIG. 45 of an exemplary sensor group.
Figure 47:
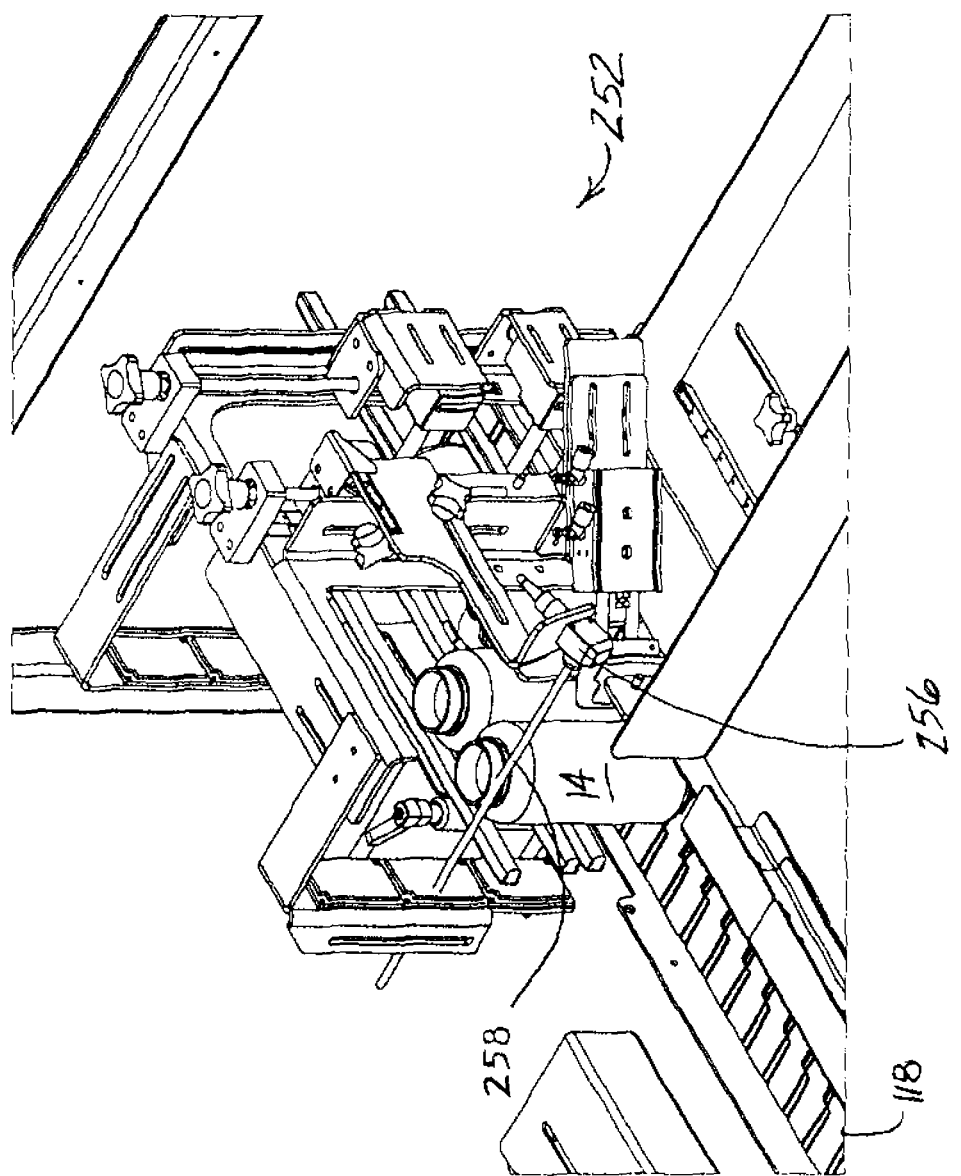
FIG. 47 is an enlarged, partial view of the sensor group of FIG. 46.

FIG. 45 is a partial cutaway view of FIG. 2 of article array forming/moving system 112 rotated 90 degrees counter-clockwise about a vertical axis, showing a motor 250 for rotatably driving delivery device 118. FIG. 46 is an enlarged, partial view of FIG. 45 showing a sensor group 252 associated with controlling articles 14 conveyed by delivery device 118. FIG. 47 is an enlarged, partial view of sensor group 252 of FIG. 46. As further shown in FIG. 47, sensor 256 directs a beam 258 transverse to the path of articles 14 conveyed along article row delivery device 118 for purposes of counting the number of articles provided by article row delivery device 118. In response to a predetermined number of articles 14 "breaking" beam 258 and corresponding to a desired number of articles 14 to form an article row 16 (FIG. 16), operation of article row delivery device 118 is halted, preventing further delivery of the articles.

Figure 48:
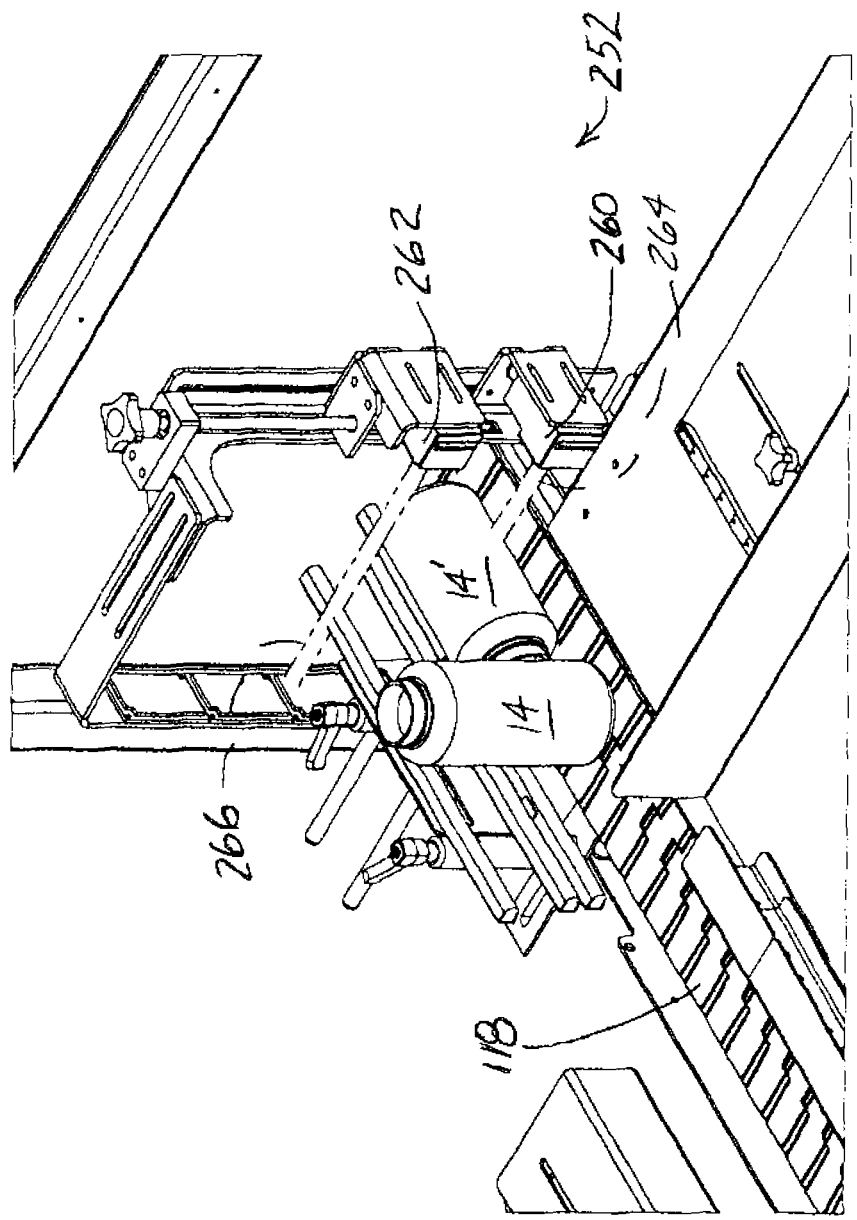
FIG. 48 is an enlarged, partial view of the sensor group of FIG. 46.
Figure 50:
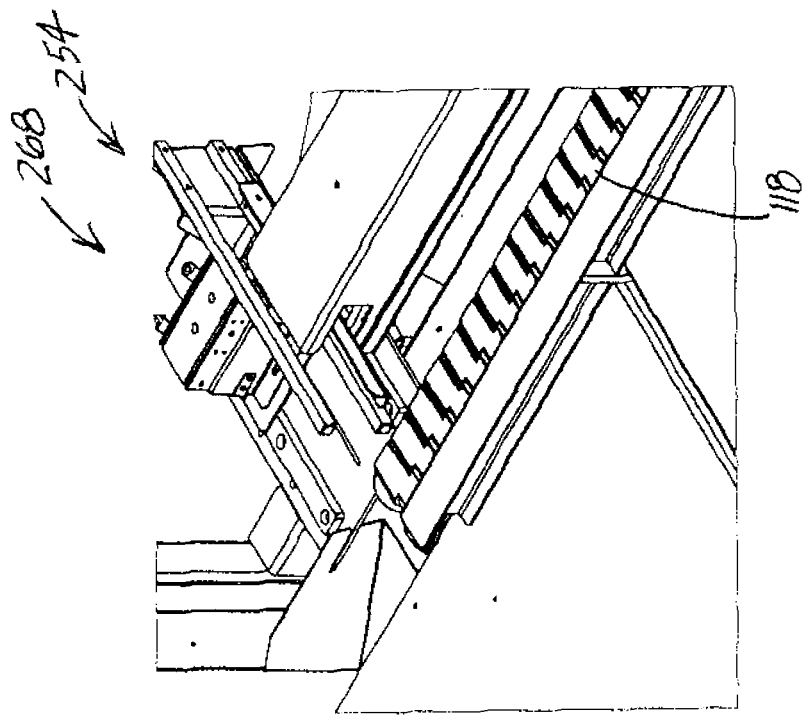
FIG. 50 is an upper perspective view of the actuating gate of FIG. 49 in an open position.
Figure 49:
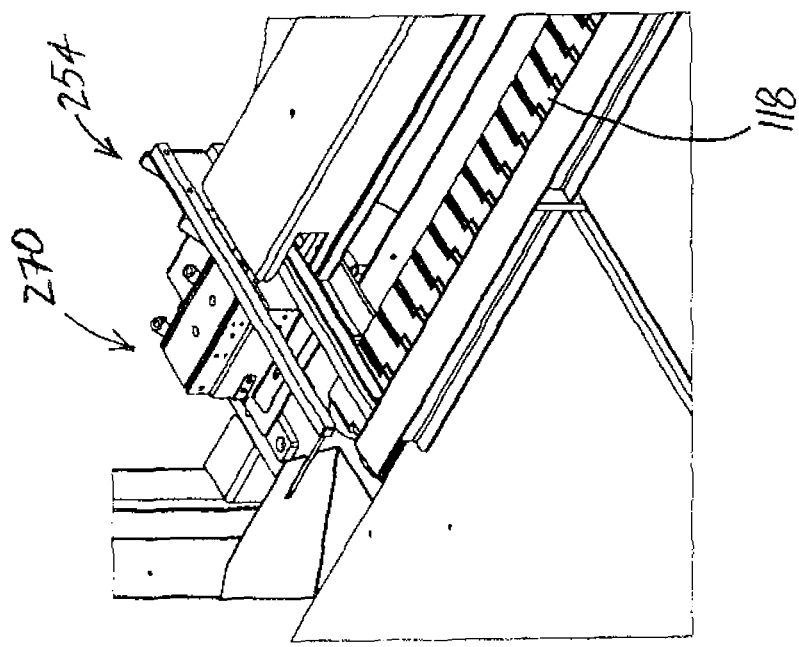
FIG. 49 is an upper perspective view of an exemplary actuating gate in a closed position.
Figure 52:
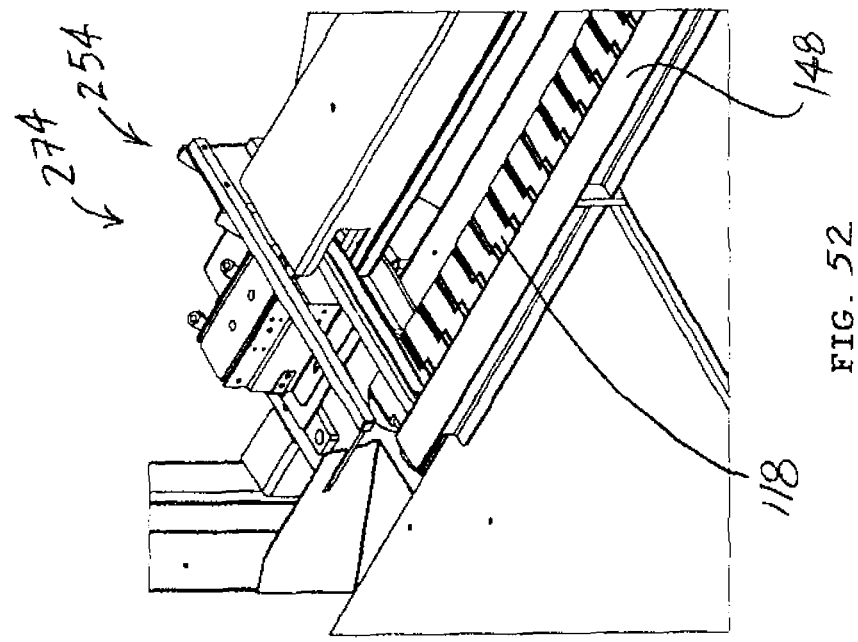
FIG. 52 is an upper perspective view of the actuating gate of FIG. 49 in a staggered position.
Figure 51:
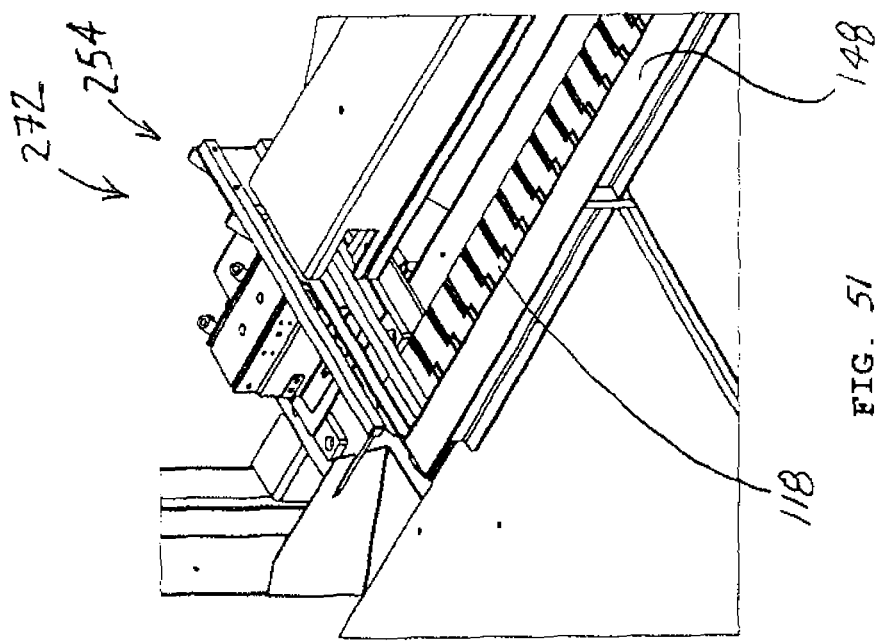
FIG. 51 is an upper perspective view of the actuating gate in a home position.

As shown in FIG. 48, which is an enlarged, partial view of sensor group 252 of FIG. 46, sensors 260, 262 direct respective beams 264, 266 transverse to the path of articles 14 conveyed along article row delivery device 118 for purposes of determining if an article 14 has become a tipped article 14'. That is, as further shown in FIG. 48, tipped article 14' breaks beam 264 of sensor 260, but does not break beam 266 of sensor 262, indicating an error condition, resulting in all of the articles 14 conveyed by row delivery device 118 being cleared from the row delivery device by activating motor 250 (FIG. 45) and actuating gate 254 (FIG. 50) positioned at a distal end of row delivery device 118 to an open position 268 (FIG. 50). As shown in FIG. 49, once the articles 14, 14' have been cleared from row delivery device 118, gate 254 is returned to a closed position 270. Optionally, as shown in FIGS. 51-52, gate 254 can be actuated between a home position 272 (FIG. 51) and a staggered or adjusted position 274 (FIG. 52) in order to form a desired staggered arrangement of article rows, e.g., alternating rows, in order to increase the packing factor of the article array.

Once article row 16 is received from article row delivery device 118, as further shown in FIG. 22, article row 16 is stabilizingly supported by backing plate 146 and stabilizer 152.

Figure 53:
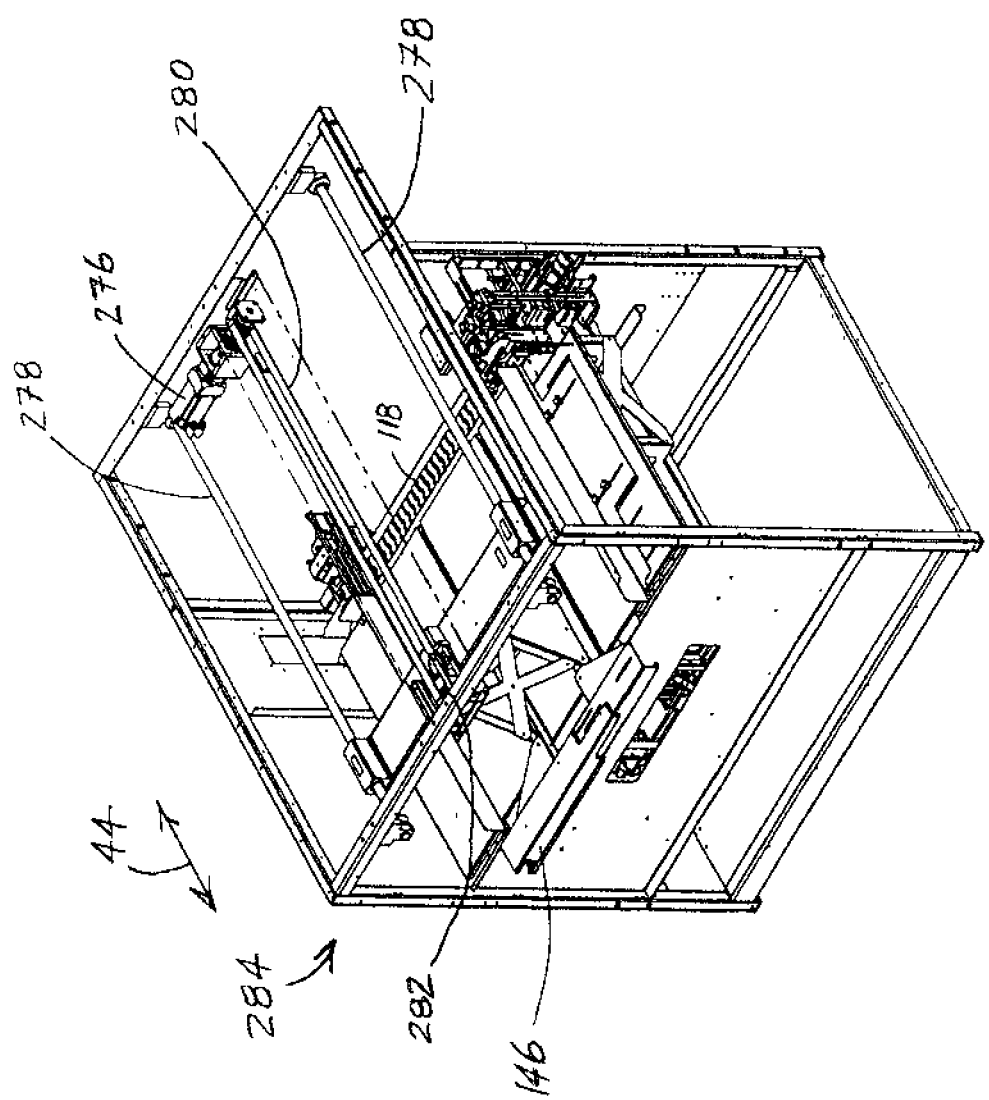
FIG. 53 is an upper perspective view of an exemplary backing plate in an extended position.

As shown in FIG. 53, backing plate 146 is urged into movement in horizontal direction 44 along guides 278 by a motor 250 which rotationally drives a drive belt 280 that is connected to backing plate 146 by a block 282. FIG. 53 shows backing plate 146 in an extended position 284, while FIG. 45 shows backing plate 146 in starting or home position 162.

As shown in FIGS. 54-55, stabilizer 152 is urged into selective movement in vertical direction 42 along guides 296 by actuator 288 between a raised position 290 (FIG. 54) and a retracted position 292 (FIG. 55), such as a pneumatic actuator as a result of selectively providing pressurized gas to fittings 294 in fluid communication with the actuator in a conventional manner.

Figure 23:
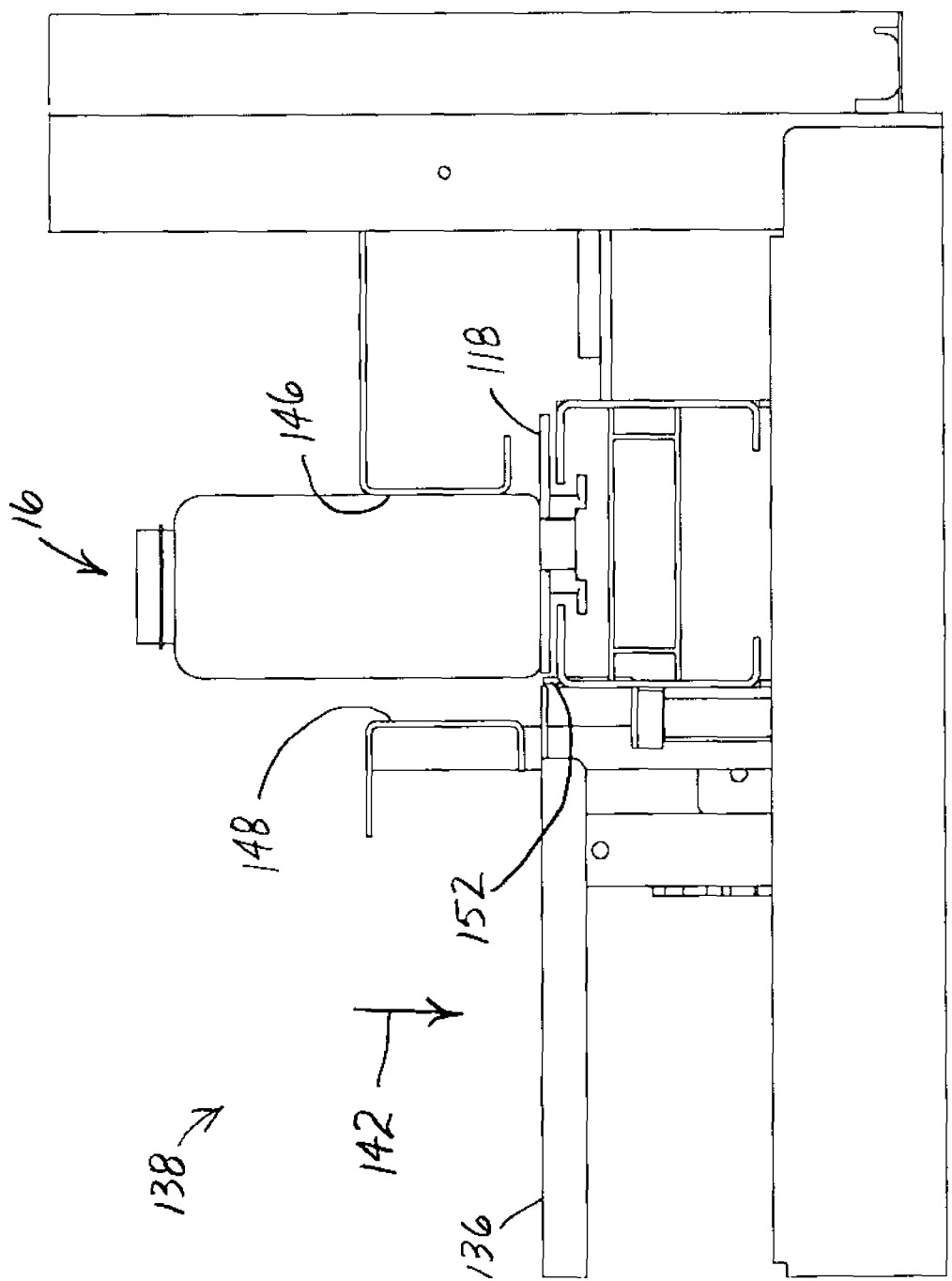

Once article row 16 is stabilizingly supported, then as shown in FIG. 23, stabilizer 152 is moved in vertical direction 142 until stabilizer 152 is in retracted position 292 (FIG. 55) that is substantially flush with the surface of article row delivery device 118 and support surface 136 of consolidation area 138. In one embodiment, stabilizer 152 may be rotated to achieve a retracted position 292 (FIG. 55) that is substantially flush relative to the surface of article row delivery device 118 and support surface 136. By virtue of the close proximity of stabilizer 152 and stabilizer 148, even with stabilizer 152 retracted, the periphery of article row 16 remains continuously stabilizingly supported by backing plate 146, stabilizer 148 and consolidation area 138. Consolidation area 138 includes support surface 136, backing plate 146, stabilizer 148, support members 150 (FIG. 29) and other components as will be discussed in further detail below.

Figure 24:
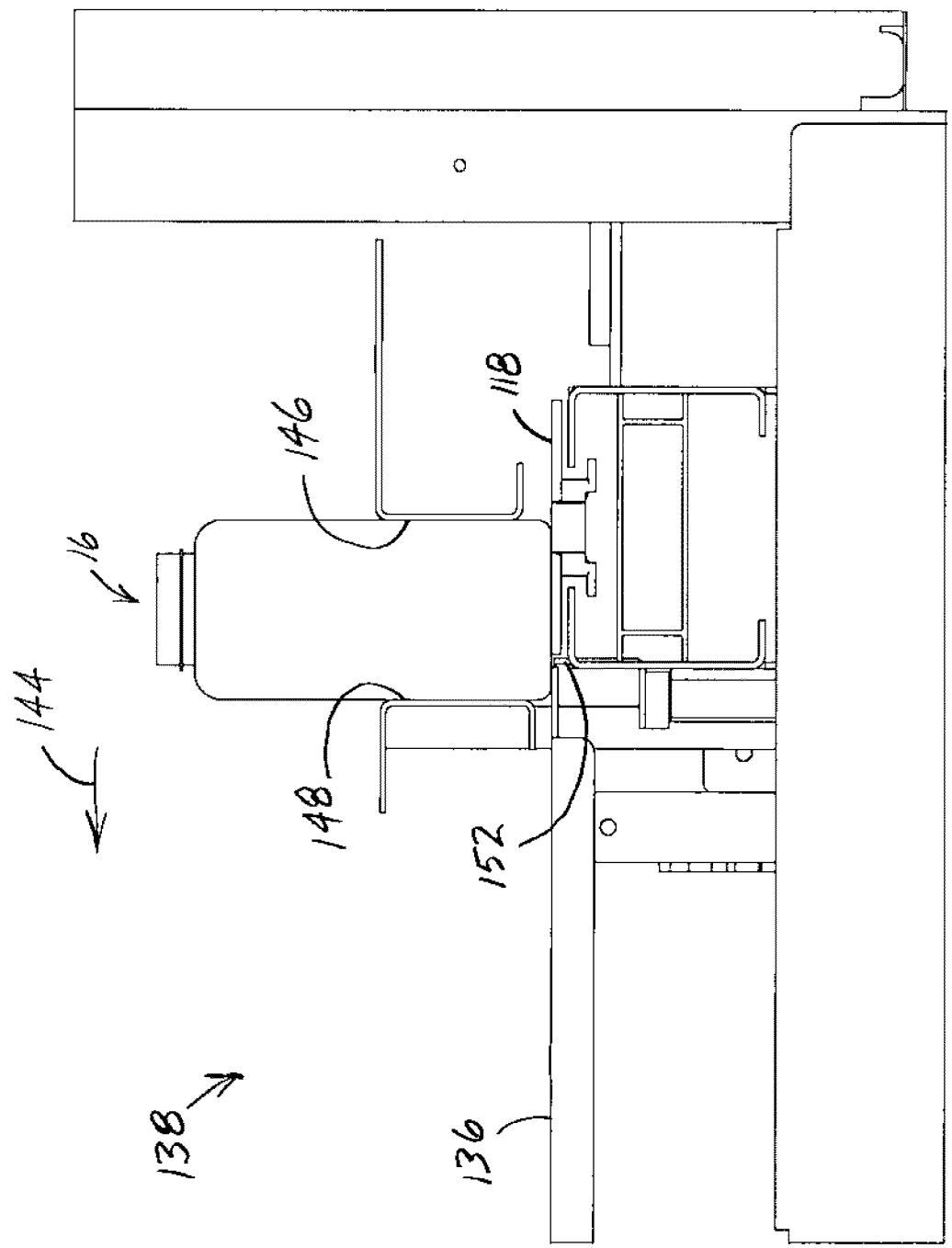
Figure 25:
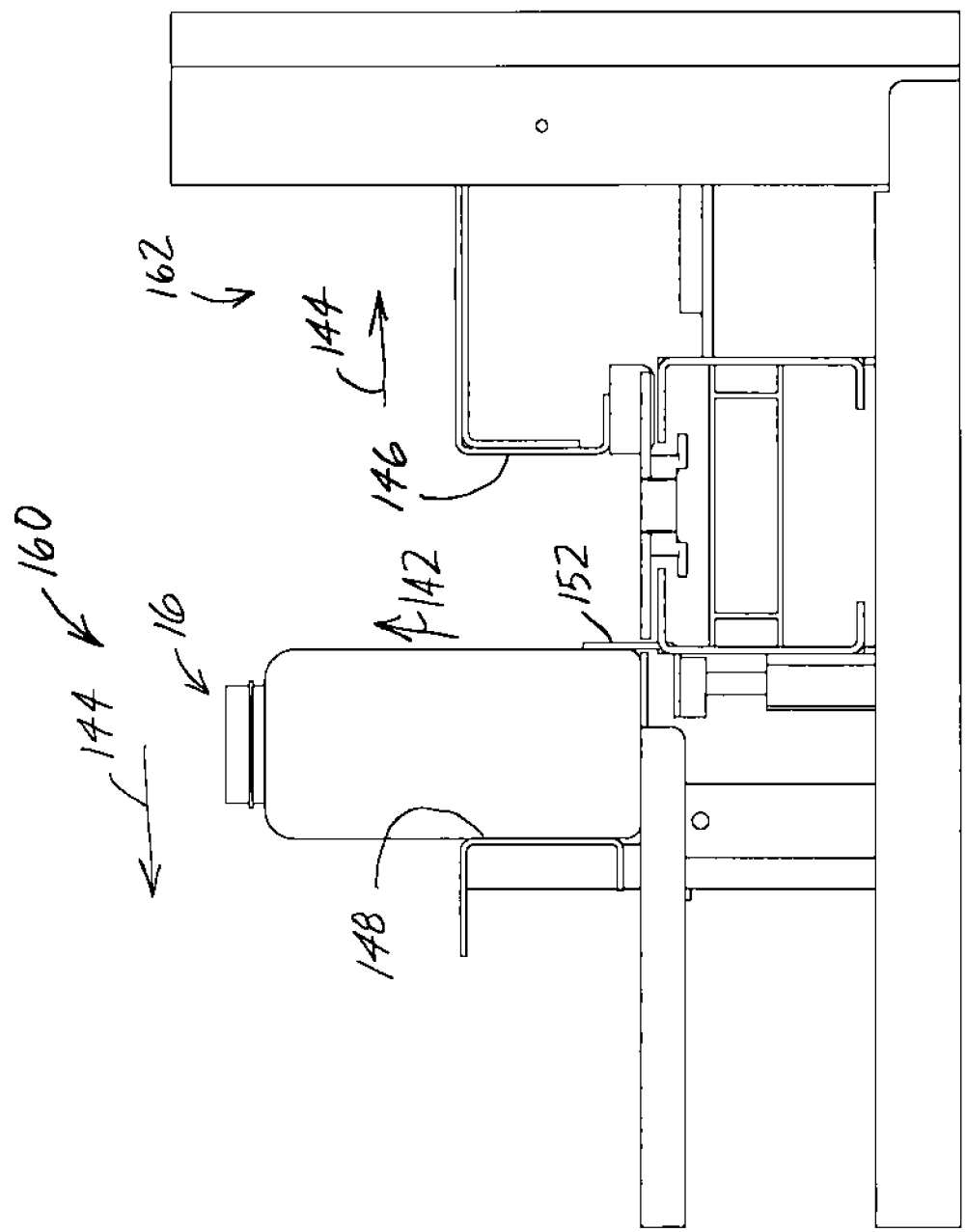

Once stabilizer 152 is in a retracted position, then as shown in FIG. 24, backing plate 146 and stabilizer 148 move and stabilizingly support opposed portions of the periphery of article row 16 in a horizontal direction 144 away from article row delivery device 118 and over retracted stabilizer 152. Article row 16 is then further moved in a horizontal direction 144 until reaching an extended predetermined position 160 (FIG. 25).

Figure 31:
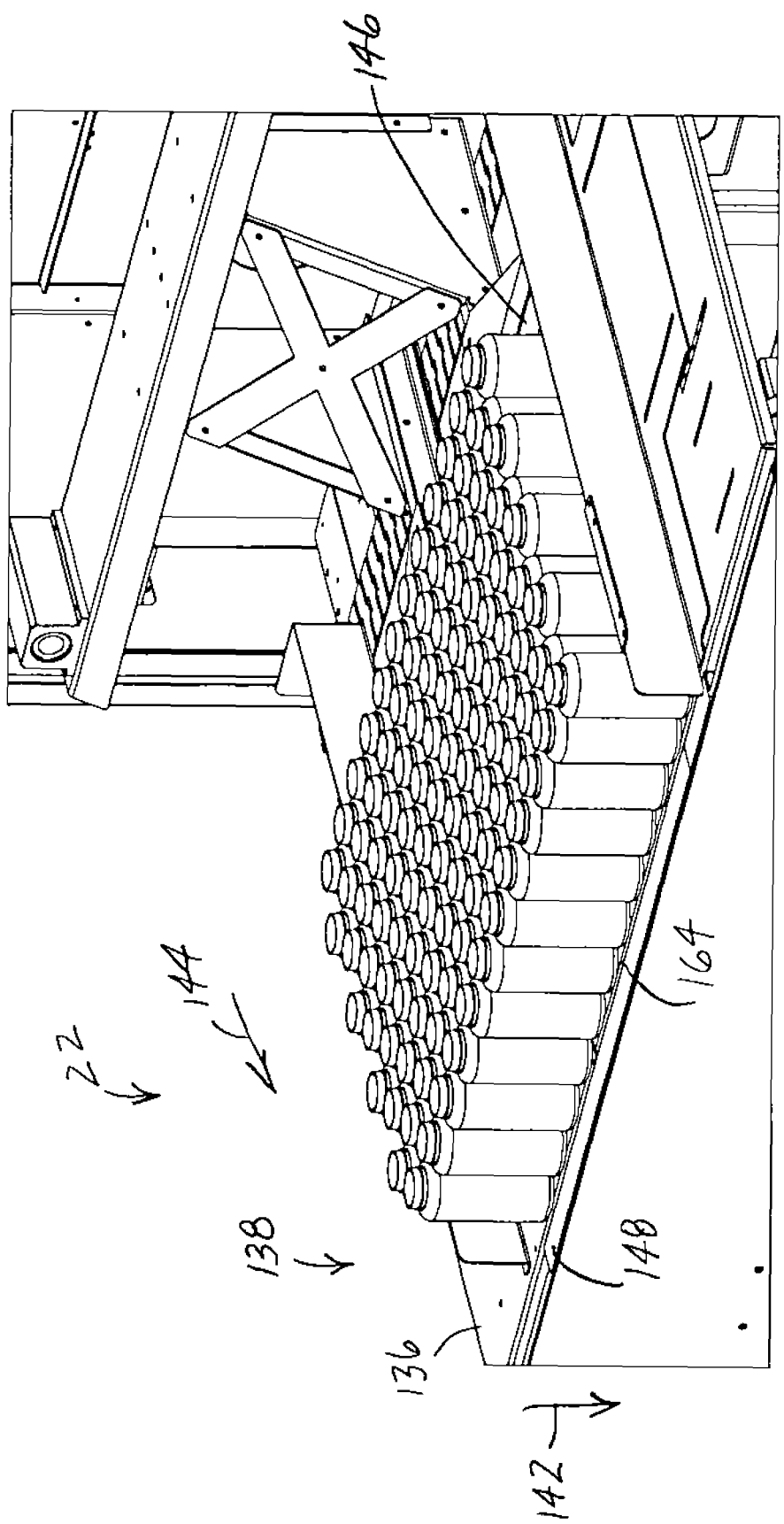
Figure 56:
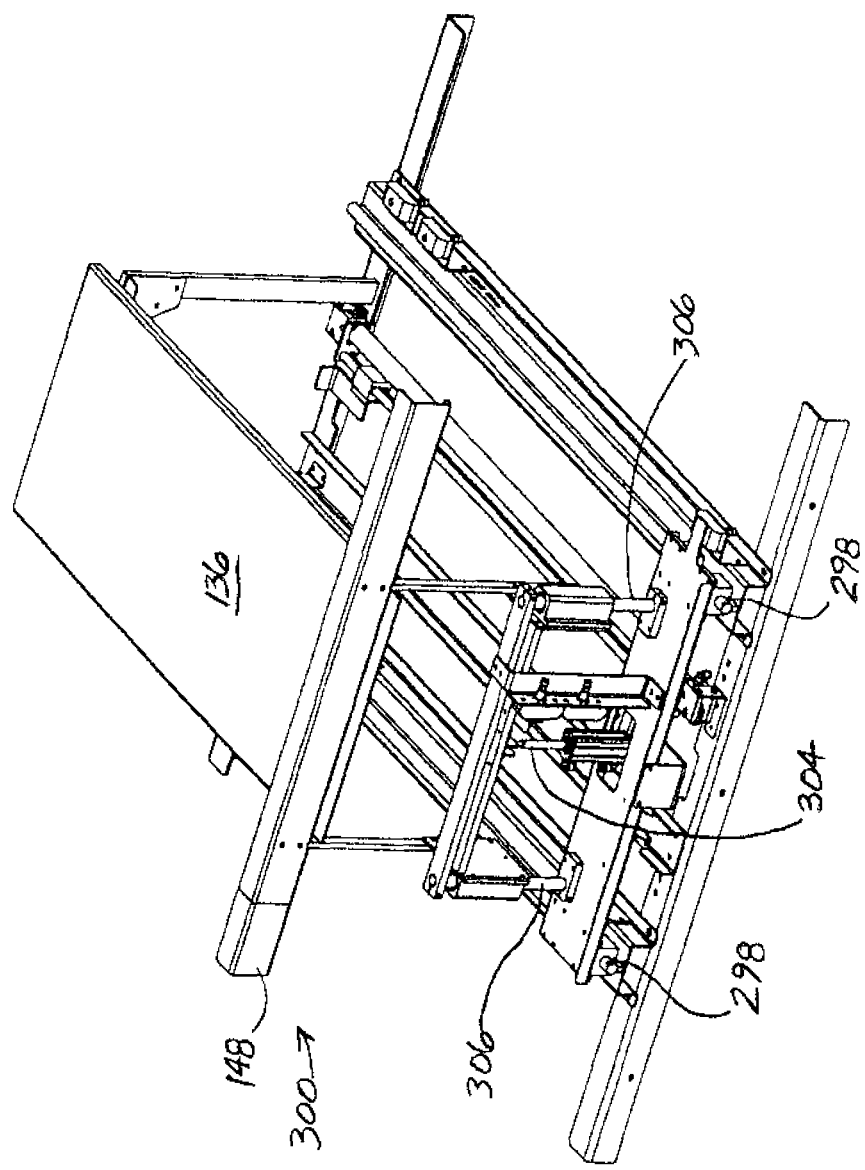
FIG. 56 is an isolated upper perspective view of an exemplary stabilizer in a home position.
Figure 57:
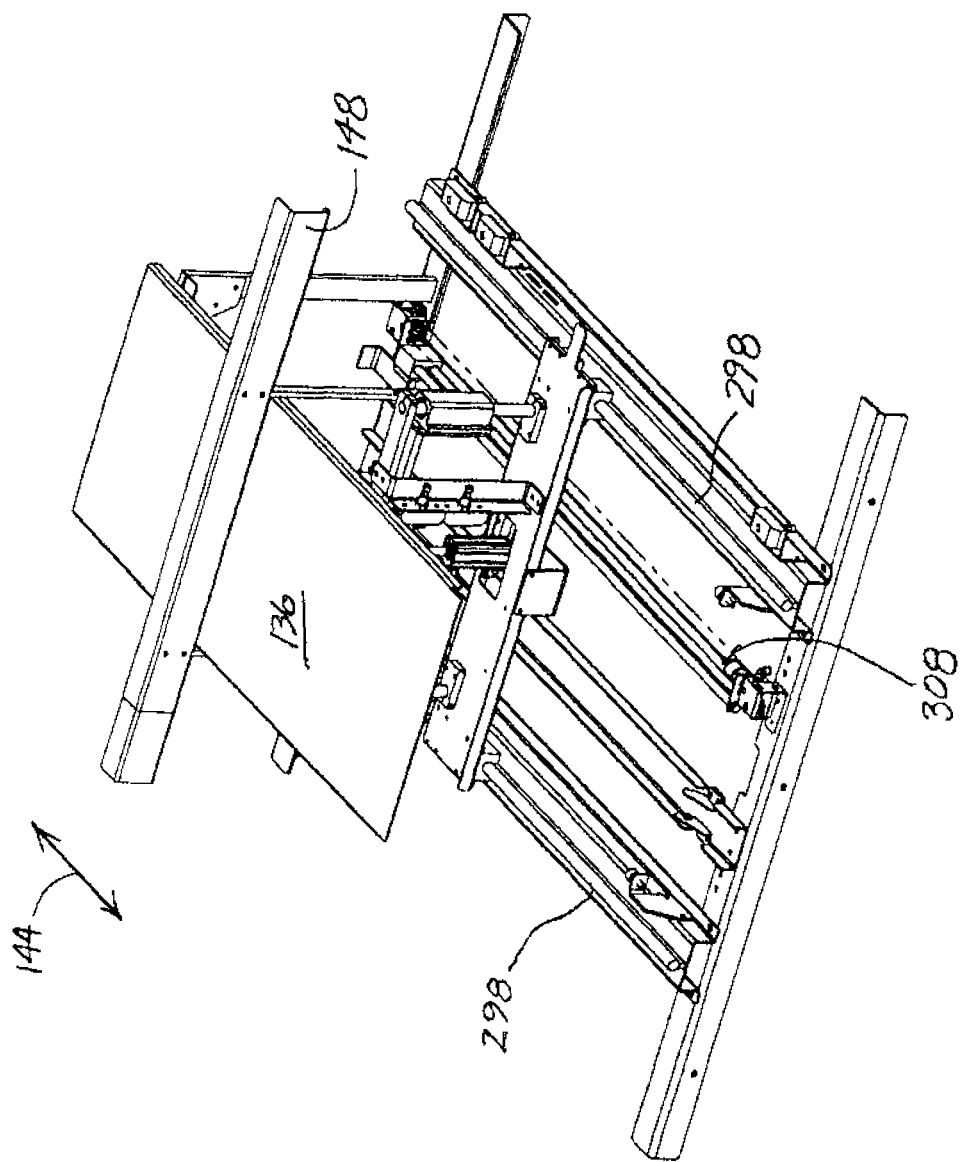
FIG. 57 is an isolated upper perspective view of the stabilizer of FIG. 56 in an intermediate position between the home position and an extended horizontal position.
Figure 58:
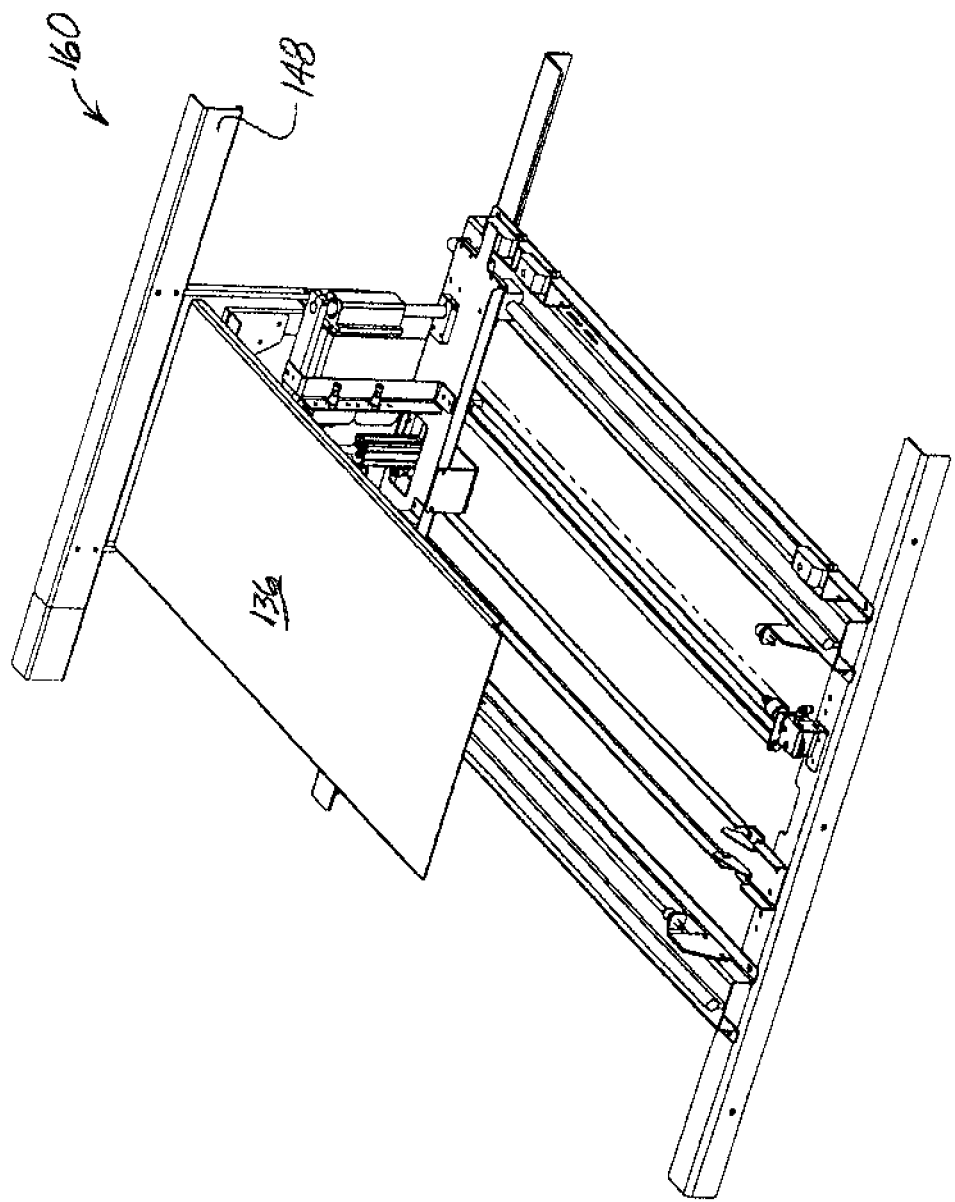
FIG. 58 is an isolated upper perspective view of the stabilizer of FIG. 56 in an extended horizontal position.

In a manner similar to stabilizer 48 (FIGS. 42-43), as shown in FIGS. 56-58, stabilizer 148 slidably moves in horizontal direction 144 along guides 298 between a home position 300 (FIG. 56) and an extended predetermined position 160 (see FIGS. 31, 58). Stabilizer 148 "floats," or is urged into movement in horizontal direction 144 as a result of backing plate 146, which is moving in horizontal direction 144, applying a horizontal force to article rows 16 (FIG. 26), which article rows 16 then applying a horizontal force to stabilizer 148.

However, between horizontal movements and applications of horizontal forces by backing plate 146 and article rows 16, stabilizer 148 maintains a fixed horizontal position due to inertia and friction between stabilizer 148 and guides 298, and continues to stabilizingly support at least a portion of the periphery of article rows 16.

Figure 59:
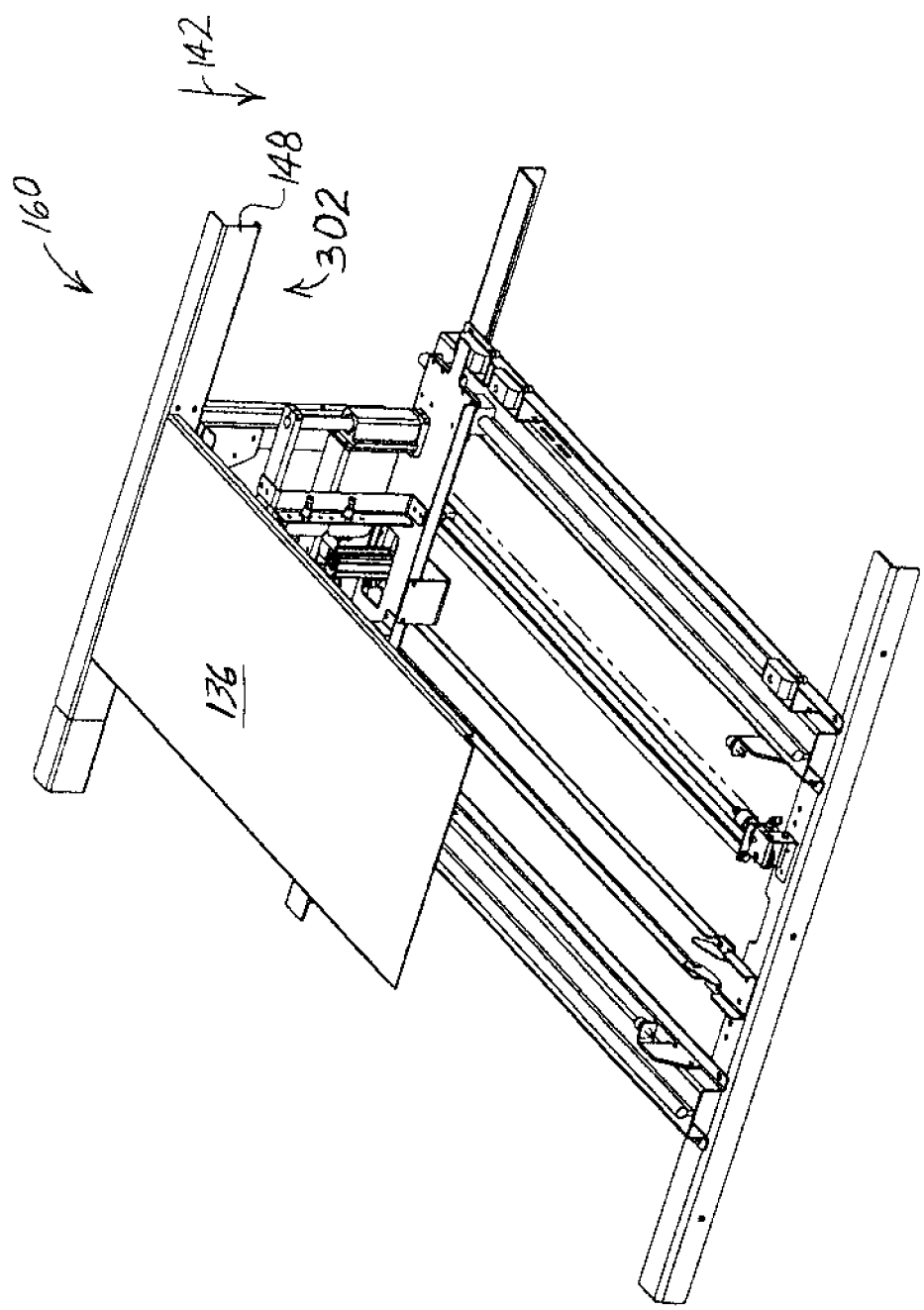
FIG. 59 is an isolated upper perspective view of the stabilizer of FIG. 58 in a vertically retracted position.

Once an article array 22 (FIG. 31) is formed and stabilizer 148 is in the extended predetermined position 160, then as shown in FIG. 59, an actuator 304 (FIG. 56) guided along guides 306 in a vertical direction 142 selectively retracts and urges stabilizer 148 into movement in vertical direction 142 such that stabilizer 148 is substantially flush with the support surface 136 in a retracted position 302 (FIG. 59).

Once article row 16 reaches extended predetermined position 160, then as shown in FIG. 25, stabilizer 152 is moved in vertical direction 142 to an extended position either prior to or substantially simultaneously with backing plate 146 moving in horizontal direction 144 away from article row 16, until backing plate 146 reaches a starting position or home position 162. In either event, stabilizer 152 provides an additional, independent stabilizing support to at least the portion of the periphery of article row 16 simultaneously stabilizingly supported by backing plate 146.

Figure 26:
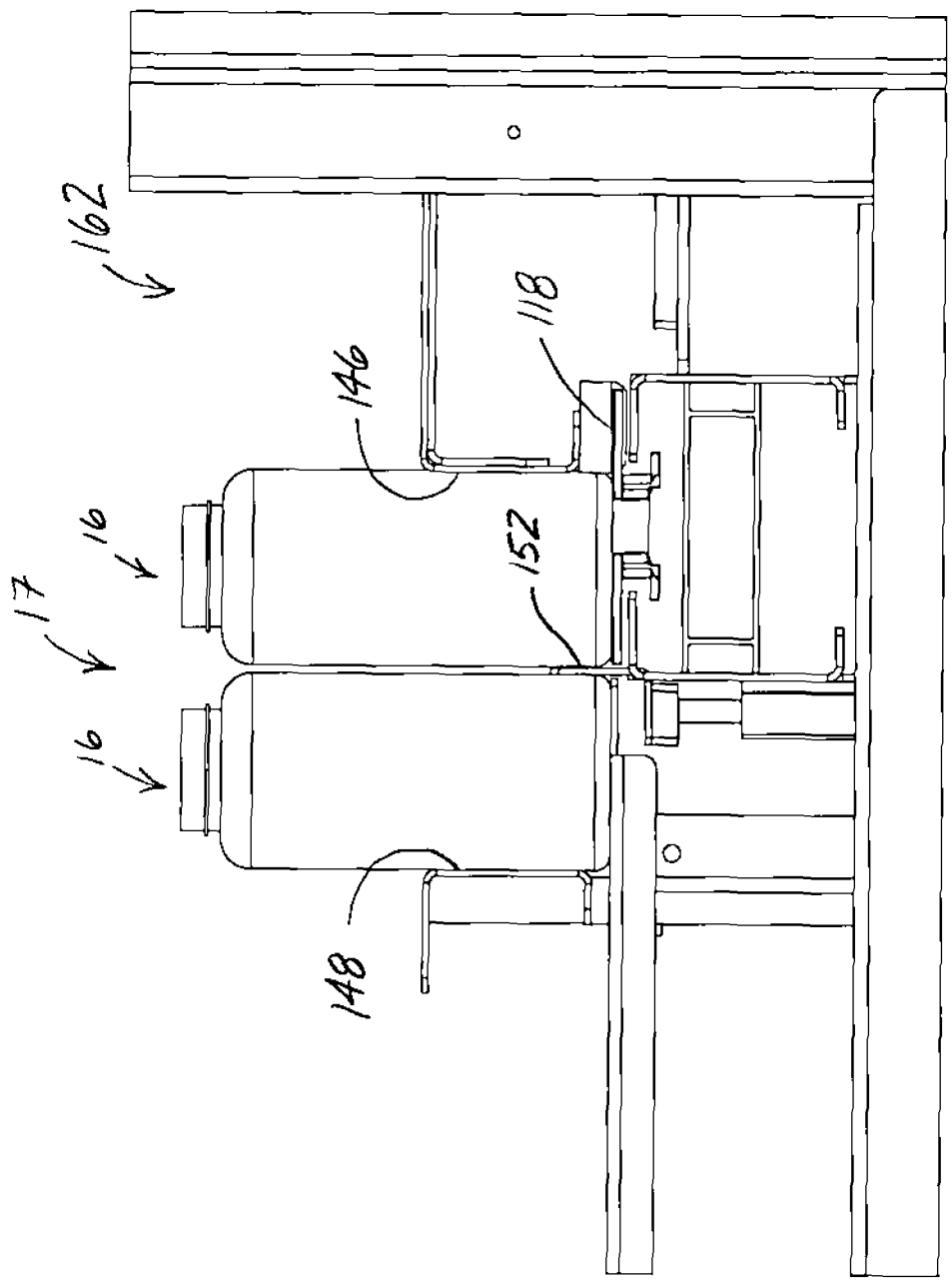

Once stabilizer 152 is in an extended position and backing plate 146 is in home position 162, then as shown in FIG. 26, an additional article row 16 is received from article row delivery device 118, the article rows 16 becoming an article row pair 17.

Figure 27:
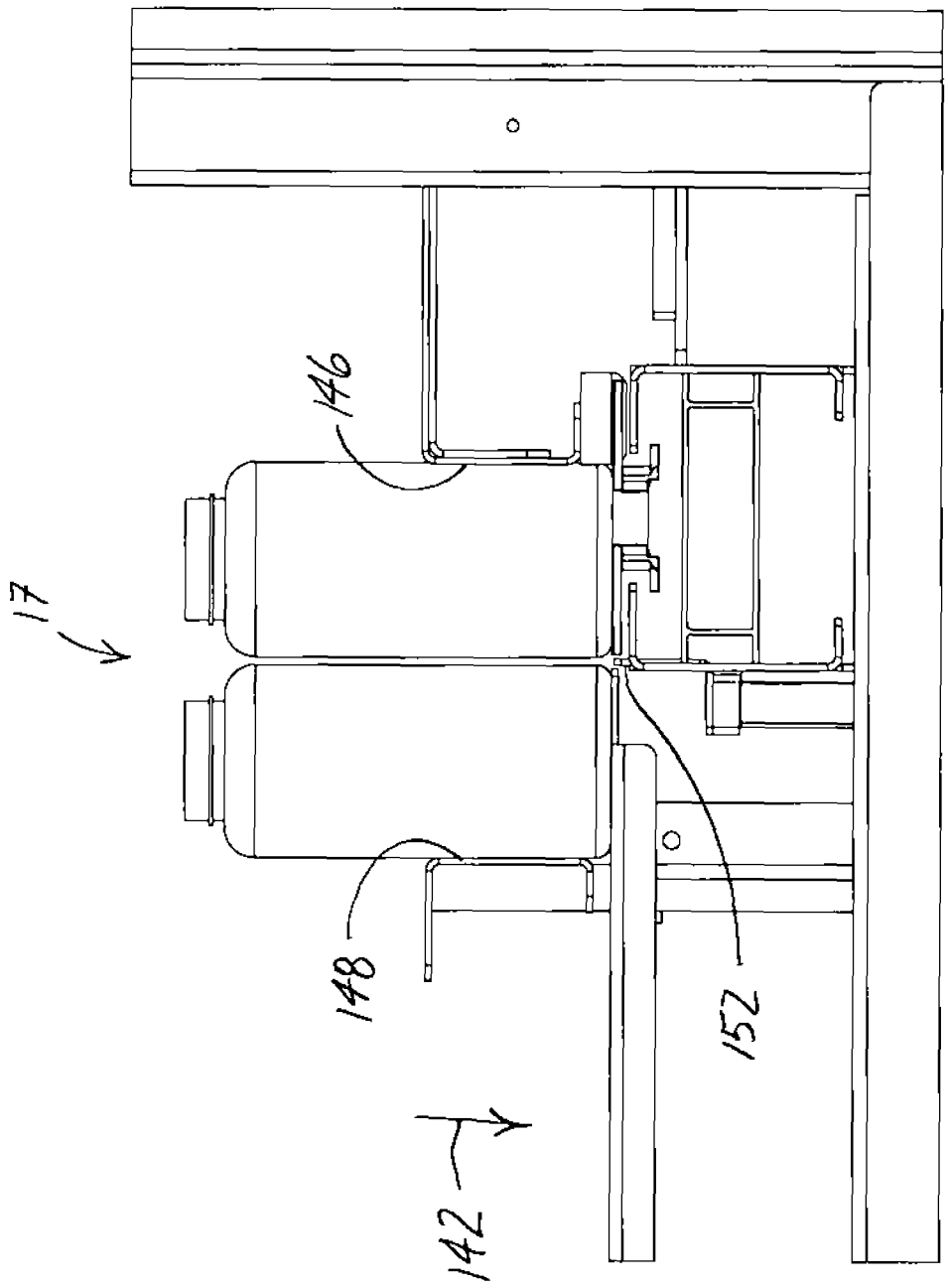

Once article row pair 17 has been formed, then as shown in FIG. 27, stabilizer 152 is moved in vertical direction 142 to its retracted position.

Figure 28:
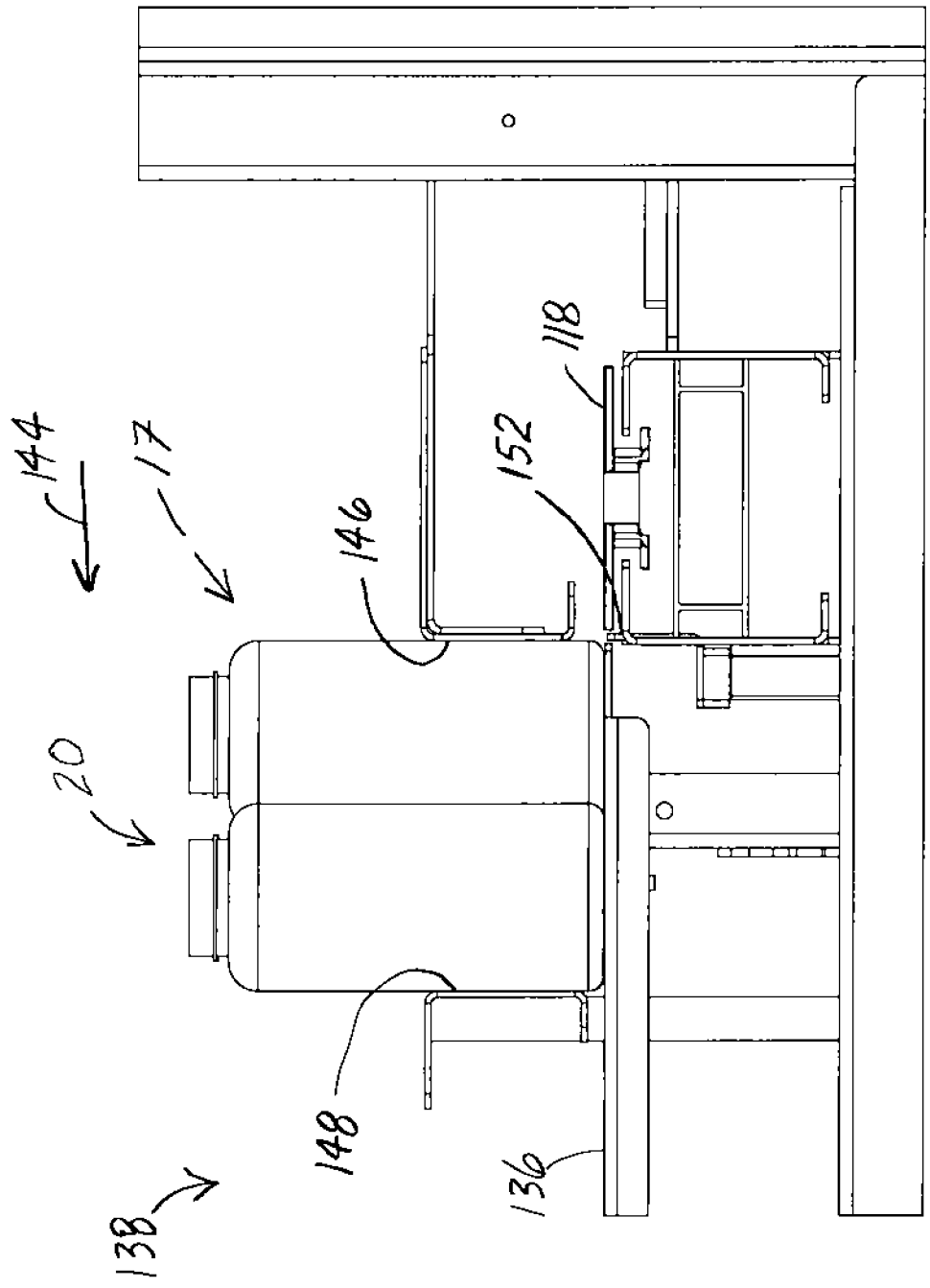

Once stabilizer 152 is retracted, then as shown in FIG. 28, backing plate 146 and stabilizer 148 move and stabilizingly support opposed portions of the periphery of article row pair 17 in a horizontal direction 144 away from article row delivery device 118 and over retracted stabilizer 152, article row pair 17 becoming partial article array 20. Depending upon the geometry of the articles, such as a circular cross section, adjacent article rows may partially overlap one another to form a more compact, stable arrangement, such as shown in FIG. 29 for article array 22.

Figure 29:
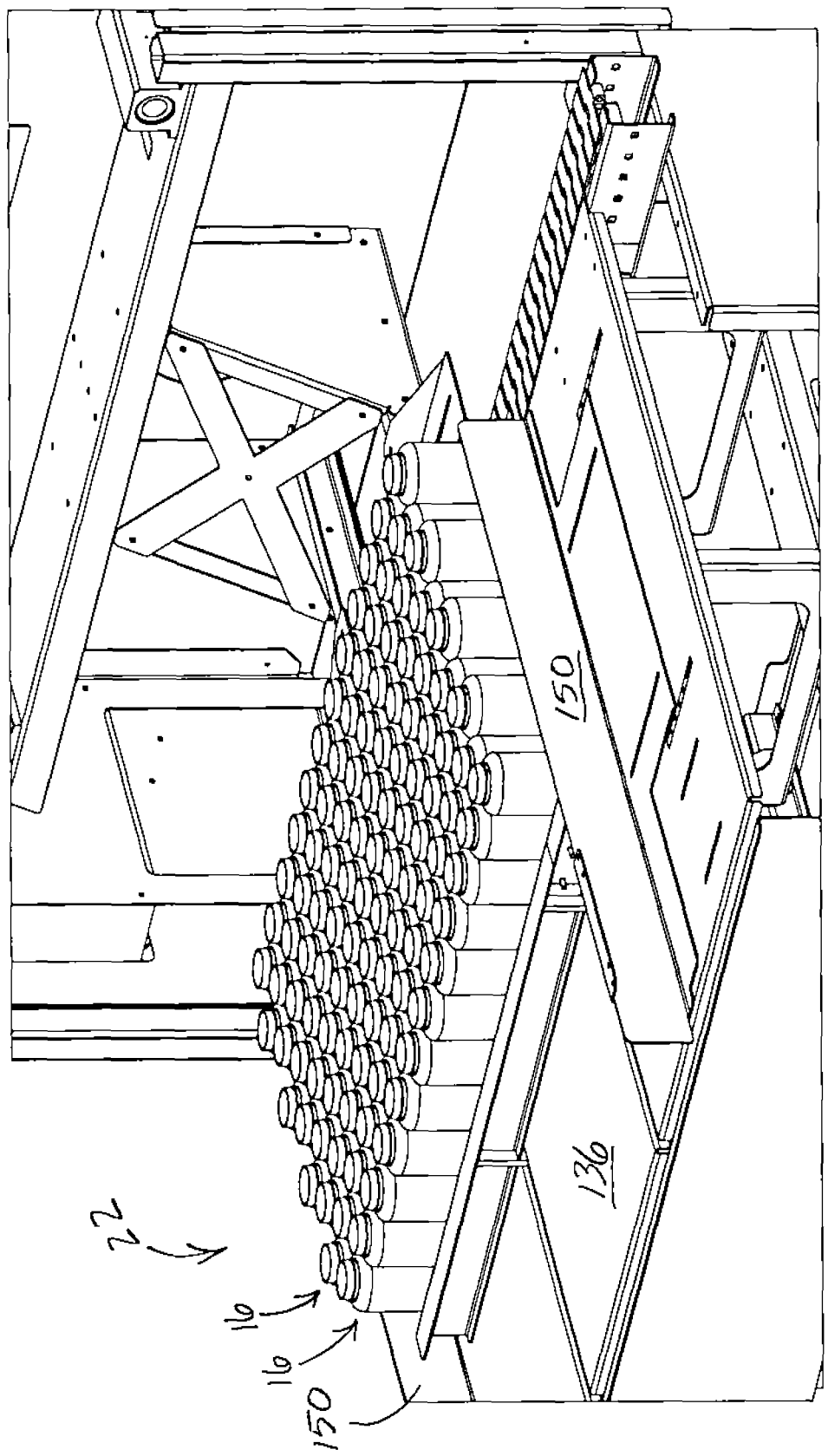

Once partial article array 20 has been formed, additional article rows 16 are added, such as previously discussed and shown in FIGS. 25-28, forming article array 22 as shown in FIG. 29.

Figure 30:
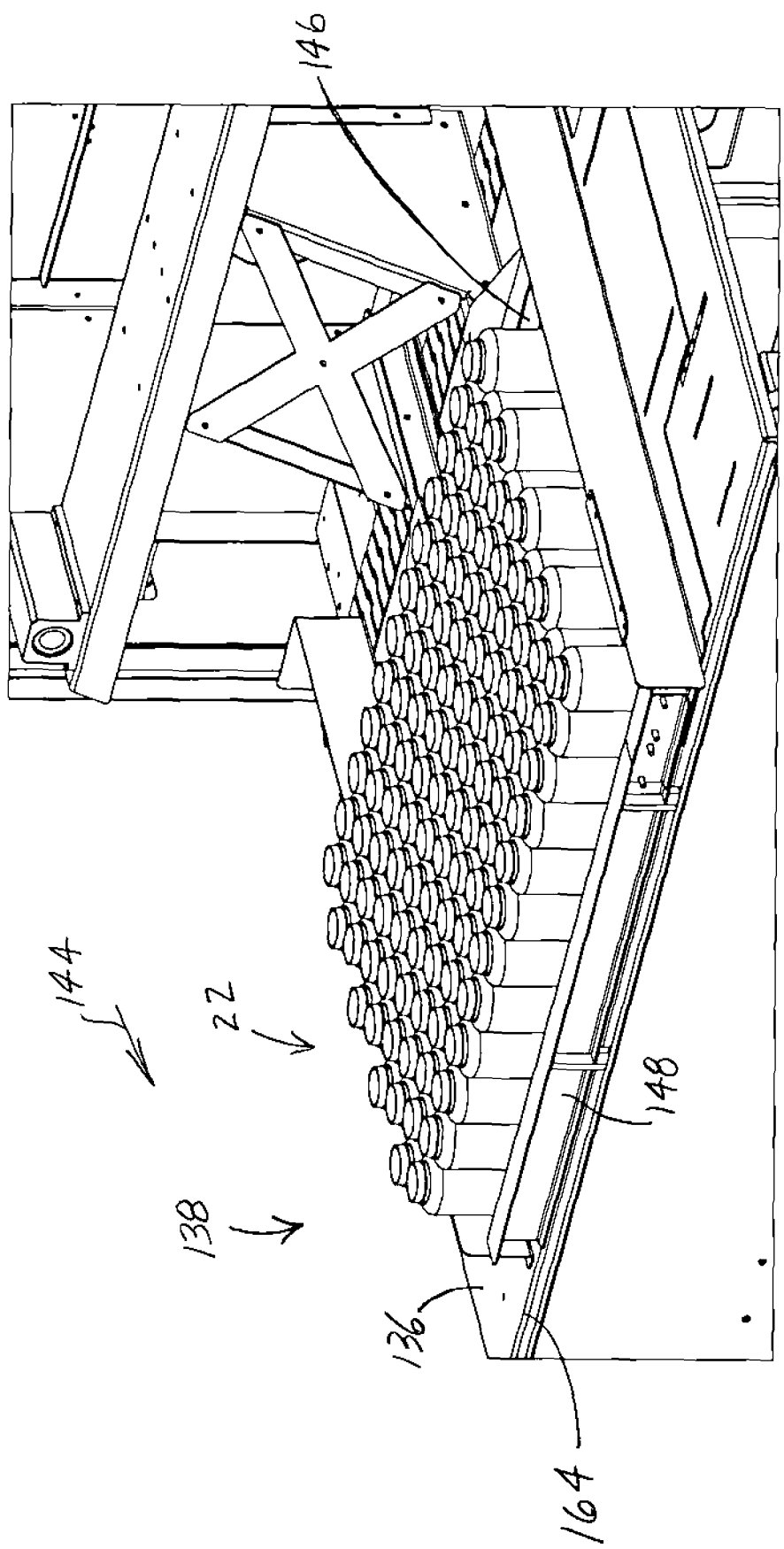

Once article array 22 has been formed, then as shown in FIG. 30, backing plate 146 and stabilizer 148 move and stabilizingly support opposed portions of the periphery of article array 22 in a horizontal direction 144 toward an end 164 of support surface 136 of consolidation area 138 in preparation of moving article array 22 from consolidation area 138 to a collection area 126, 226 (see respective FIGS. 2, 3). The periphery of article array 22 is continuously stabilizingly supported by backing plate 146, stabilizer 148, and consolidation area 138, which includes support members (FIG. 29), as previously discussed.

As shown in FIG. 31, as backing plate 146 and stabilizer 148 move and stabilizingly support opposed portions of the periphery of partial article array 20 in horizontal direction 144 toward end 164 of support surface 136 of consolidation area 138 in preparation of moving article array 22 from consolidation area 138 to a collection area 126, 226 (see respective FIGS. 32, 34), stabilizer 148 selectively retracts in a vertical direction 142, becoming substantially flush with support surface 136.

Figure 32:
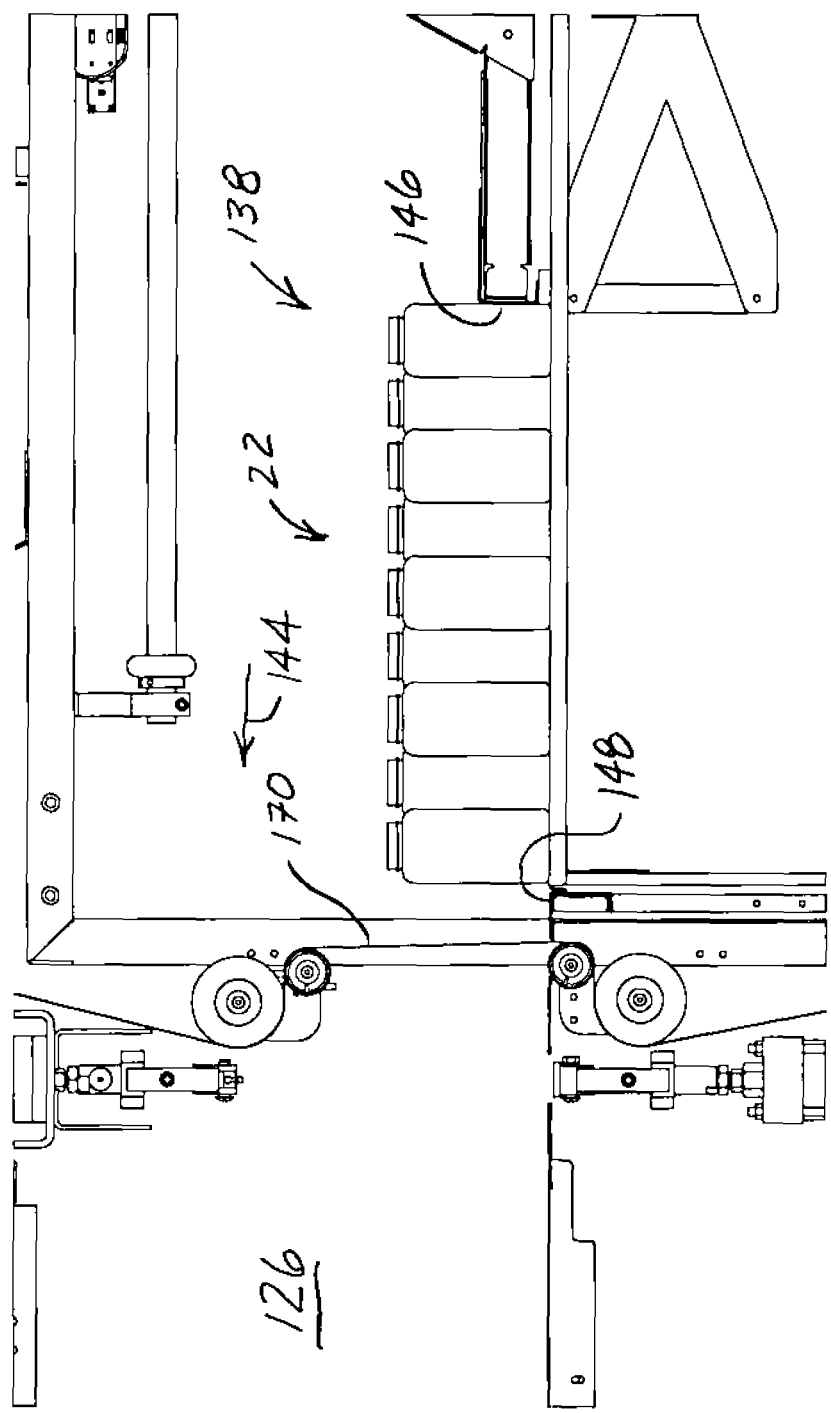
Figure 33:
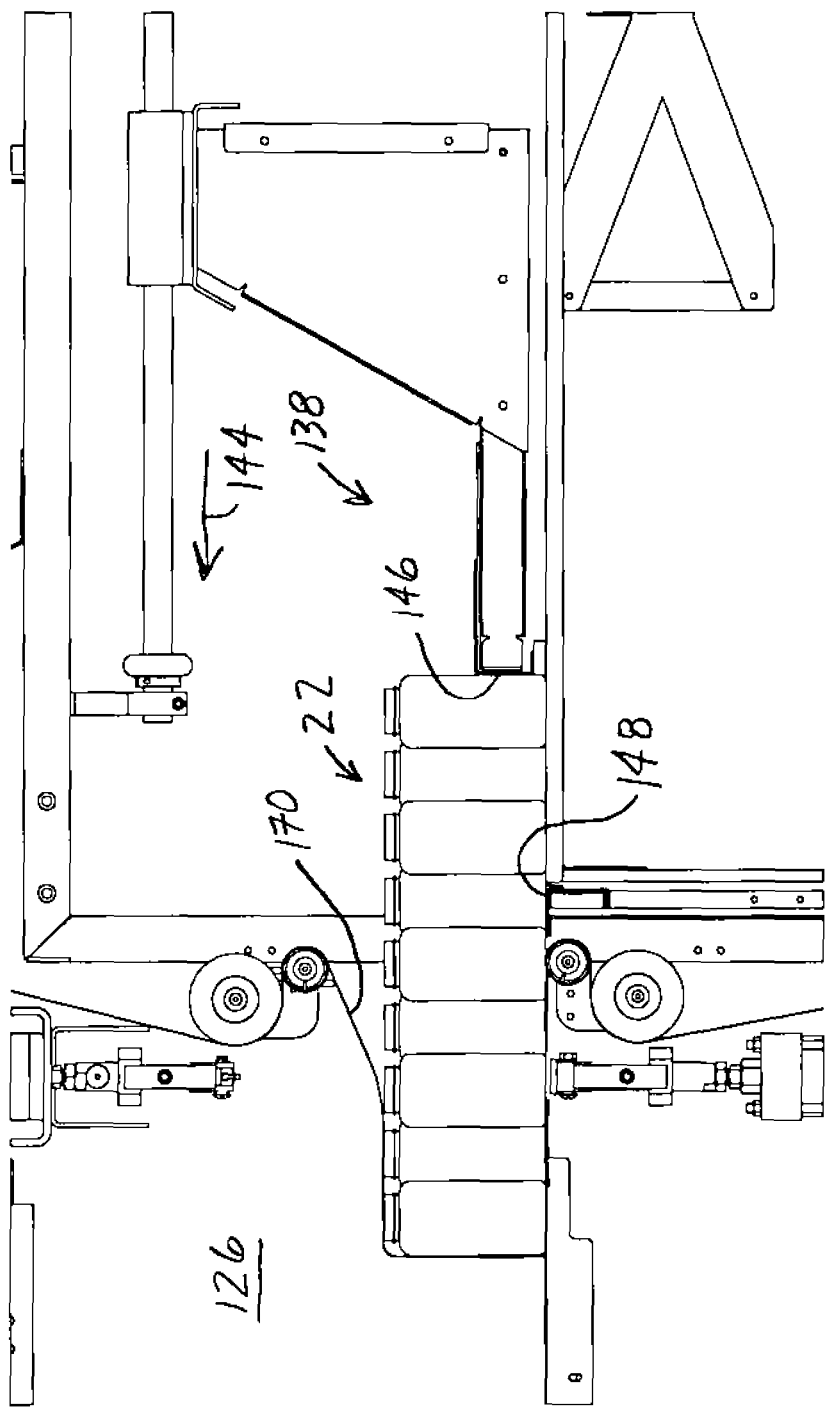

As shown in FIG. 32, which is an extended side view of FIG. 31, article array 22 is moved in horizontal direction 144 toward collection area 126, which is a bagging area. As further shown in FIG. 32, the periphery of article array 22 in close proximity to retracted stabilizer 148 is continuously stabilizingly supported as a result of its close proximity to film 170 of bagging area or collection area 126. FIG. 33 shows article array 22 further directed into collection area 126 and further surrounded by film 170, ultimately becoming a bagged article array (not shown).

FIG. 34 is similar to FIG. 33, except that article array 22 is being directed into collection area 226, such as an area including a slip sheet 172. A further difference with collection area 226 is that an additional stabilizer 174 is required to ensure article array 22 is continuously stabilizingly supported while being moved from consolidation area 138 to collection area 226.

Once article array 22 has been moved to collection area 116 (FIG. 33), 226 (FIG. 34), a linear actuator 308 (FIG. 57) selectively contacts and urges stabilizer 148 into movement in horizontal direction 144 from a predetermined extended position 160 (FIG. 59) toward home position 300 (FIG. 56) in preparation of receiving article rows for forming another article array.

Figure 35:
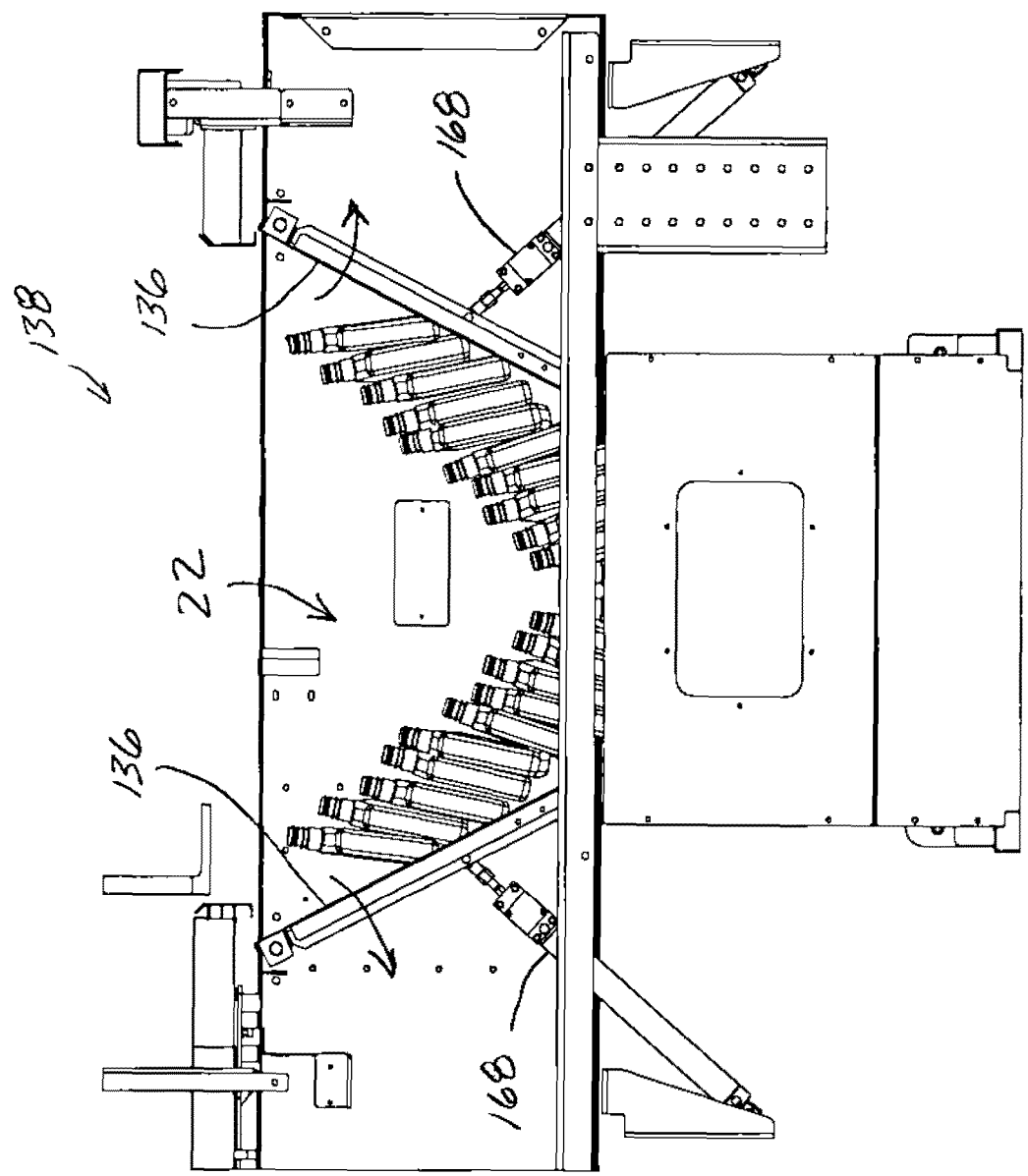
FIG. 35 is a side view of an exemplary embodiment of an article removal feature of an exemplary forming/moving system.

FIG. 35 shows an embodiment of consolidation area 138 in which portions of support surface 136 are pivotably connected to corresponding actuators 168. During normal operation, actuators 168 are maintained in an extended position, securing the portions of support surface 136 in a horizontal position for supporting an article array. However, for reasons such as partial tipping of articles of the article array 22, the presence of defective articles or for other reasons, actuators 168 are selectively urged toward a retracted position such that at least sufficient portions of support surface 136 subtend an angle with a horizontal plane sufficient to remove all articles on the portions of support surface 136 by force of gravity, thereby preventing all articles of the article array 22 from being movable to the collection area. This support surface construction resembles bombardier doors of an aircraft. In another embodiment, a single actuator may be utilized to support a support surface of unitary construction. In another embodiment, support surface 136 may include more than two portions, each having corresponding actuators.

Figure 60:
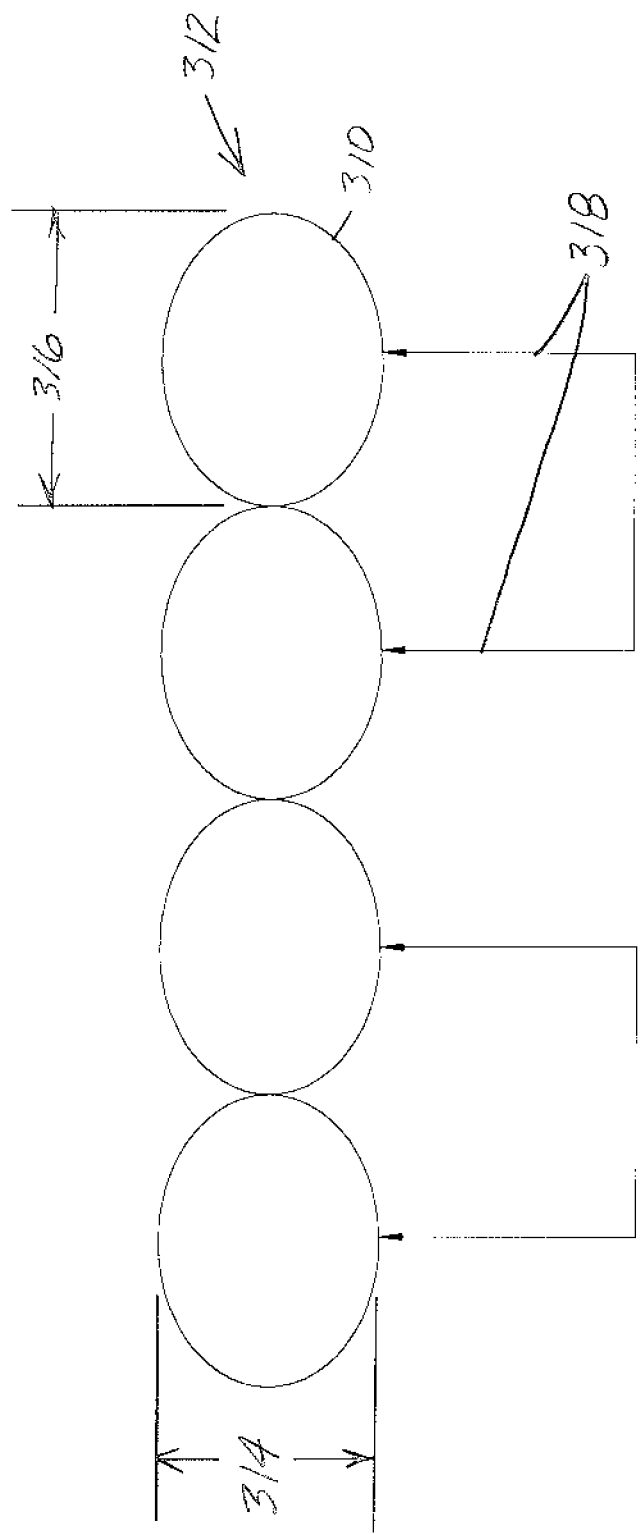
FIG. 60 is a view of a footprint of an exemplary article row of non-circular articles being pushed in a "stable direction."

As discussed above, systems for moving article arrays typically involve the formed article array being subjected to a force for moving the article array toward a collection area from a consolidation area for subsequent processing. However, there are challenges associated with moving article arrays having articles having a noncircular footprint. FIG. 60 shows an article row 312 including articles 310 having a noncircular footprint including a first width 314 and a second width 316, with second width 316 being greater than first width 314, for example, with first width 314 and second width 316 being generally perpendicular to one another. In response to articles 310 being subjected to a horizontal pushing force 318 that is parallel to the first width 314, the footprint of articles 310 maintaining their orientation relative to a vertical axis while the articles are being moved in the direction of pushing force 318. Stated another way, as is understood by one having ordinary skill in the art, the orientation of articles 310 are inherently stable while articles 310 are being pushed in a "stable direction," and as a result, the footprint of articles 310 maintain their orientation relative to a vertical axis as well as their spacing relative to one another, which promotes easier handling of articles 310.

Figure 61:
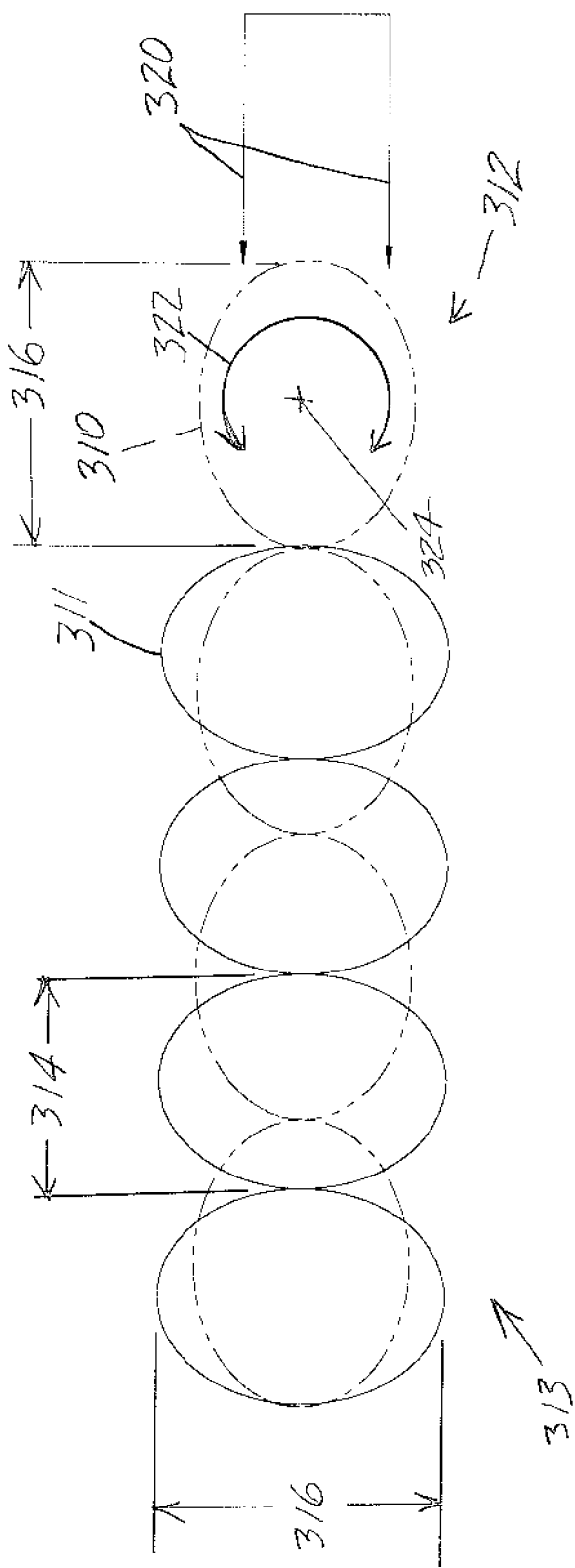
FIG. 61 is a view of a footprint of an exemplary article row of non-circular articles being pushed in an "unstable direction."

However, challenges may be presented when noncircular articles are subjected to horizontal moving forces applied in a different direction. For example, as shown in FIG. 61, in which articles 310 of article row 312 (shown in dashed line) are subjected to a horizontal pushing force 320 that is parallel to the second width 316 of article row 312, articles 310 of article row 312 will be urged into rotational movement 322 about a vertical axis 324, transforming the arrangement of articles 310 to an arrangement of articles identified as rotated articles 311 of rotated article row 313, resulting in a change of spacing between rotated articles 311, and difficulties associated with handling articles 311, including tipping of the articles. That is, rotation of articles 310, becoming rotated articles 311, occurs as a result of the orientation of articles 310 being inherently unstable in response to being pushed in "an unstable direction."

As will be discussed in further detail below, the novel system of the present invention prevents rotation of noncircular articles during movement of article rows of formed article arrays, irrespective of the direction of movement of the article rows, permitting increased processing speeds and other efficiencies not formerly possible.

For purposes herein, including brevity and clarity of showing features in the embodiments associated with FIGS. 62-68, it is to be understood that the articles and article arrays that are moved and formed in FIGS. 62-68 are similar to those previously discussed, and therefore, the articles and article arrays are not shown in FIGS. 62-68.

Figure 62:
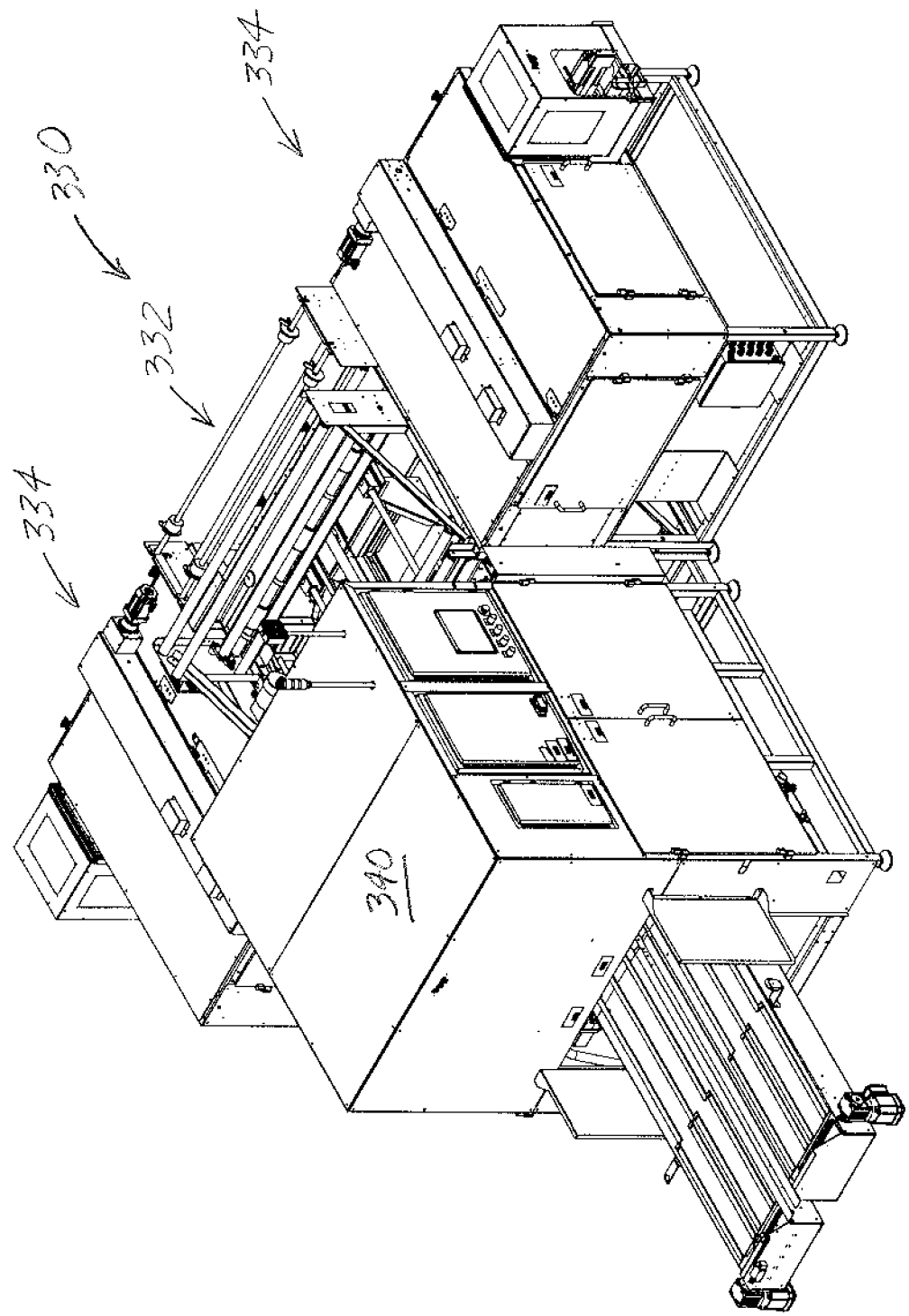
FIG. 62 is an upper perspective view of an exemplary article array forming/moving system.
Figure 63:
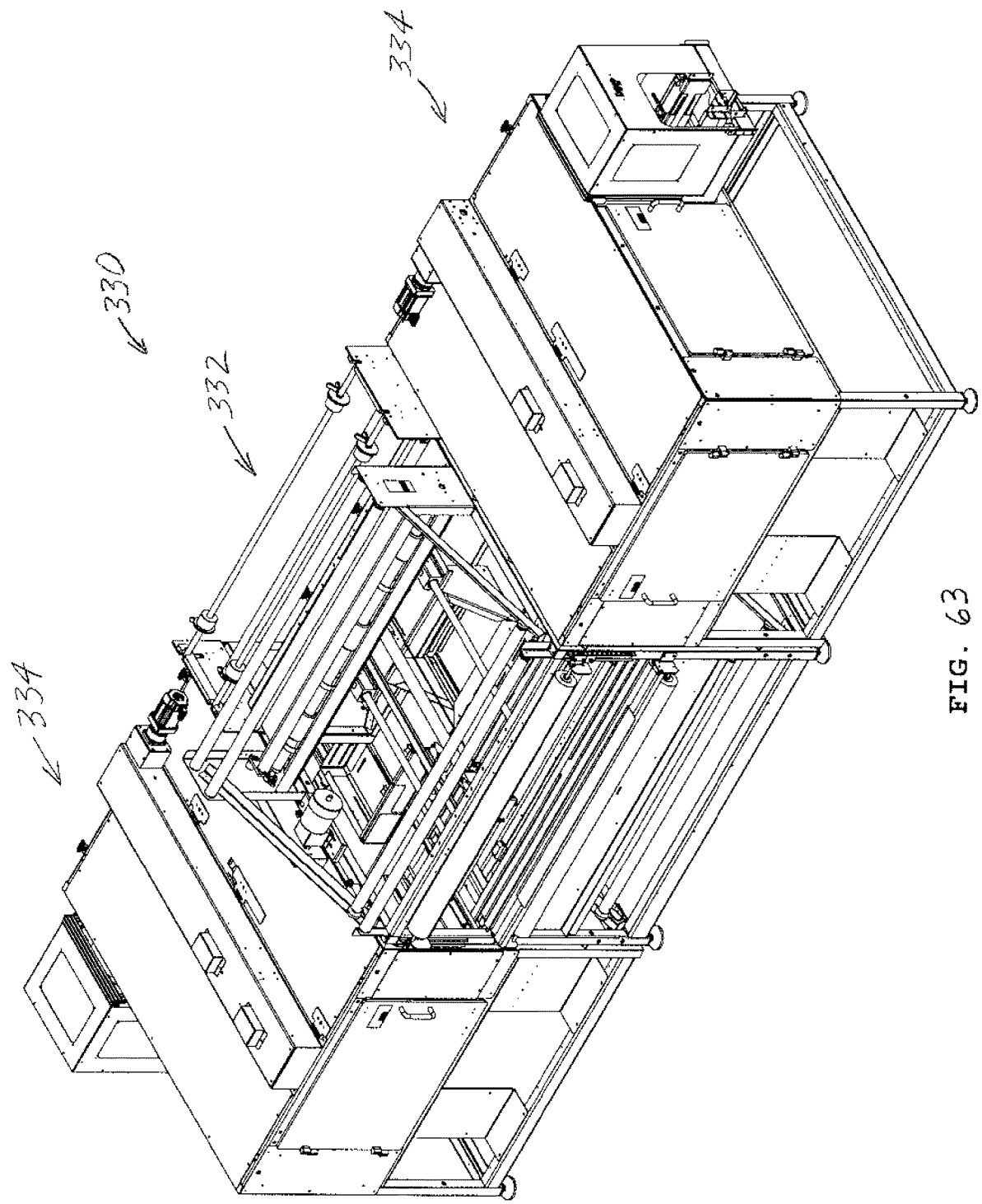
FIG. 63 is a partial cutaway view of the article array forming/moving system of FIG. 62.
Figure 64:
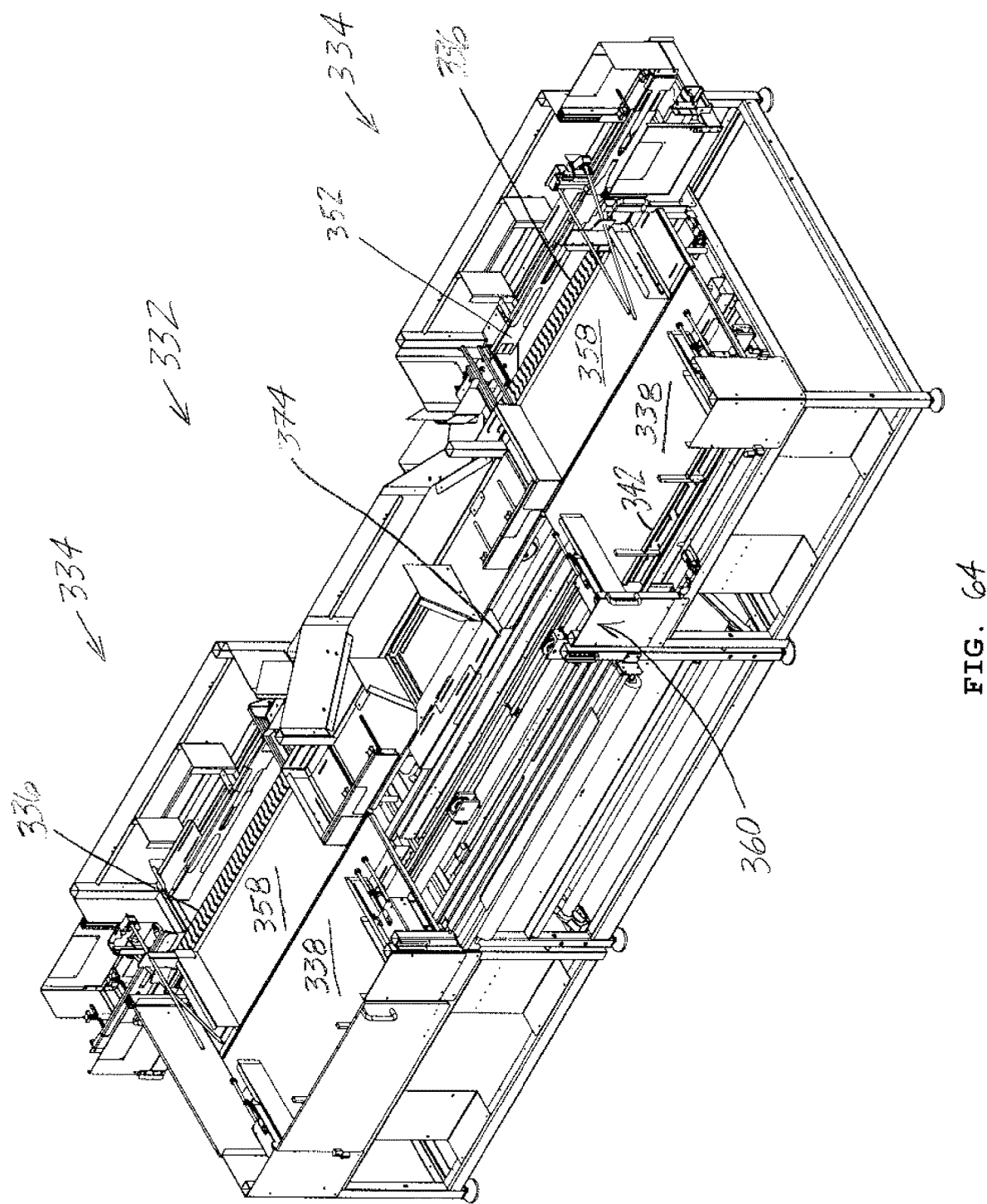
FIG. 64 is a partial cutaway view of the article array forming/moving system of FIG. 63.

FIGS. 62-64 collectively show an exemplary article array forming/moving system 330 that is similar to article array forming/moving system 12 previously discussed, with notable exceptions as shown. For example, article array forming/moving system 330 includes a consolidation area 332 separating a pair of opposed consolidation areas 334 each configured to receive articles rows (not shown) from article row delivery device 336 for forming article arrays (not shown) prior to moving the article arrays to a collection area 340, in which the article arrays are continuously stabilizingly supported at all times during their formation and movement, as previously discussed.

In addition, as shown, and as will be discussed in further detail, a transfer support surface 338 is associated with a corresponding consolidation area 334, each transfer support surface 338 being configured to receive article arrays from their respective consolidation area 334, which transfer support surface 338 moving the article arrays toward the collection area. In one embodiment, a single transfer support surface 338 is utilized. In one embodiment, more than two transfer support surfaces 338 may be utilized, e.g., if more than two article row delivery devices 336 are utilized. As shown, transfer support surface 338 includes opposed support members 372 for stabilizingly supporting a portion of the periphery of an article array in a manner similar to support members 150 (FIG. 29) as previously discussed.

Figure 65:
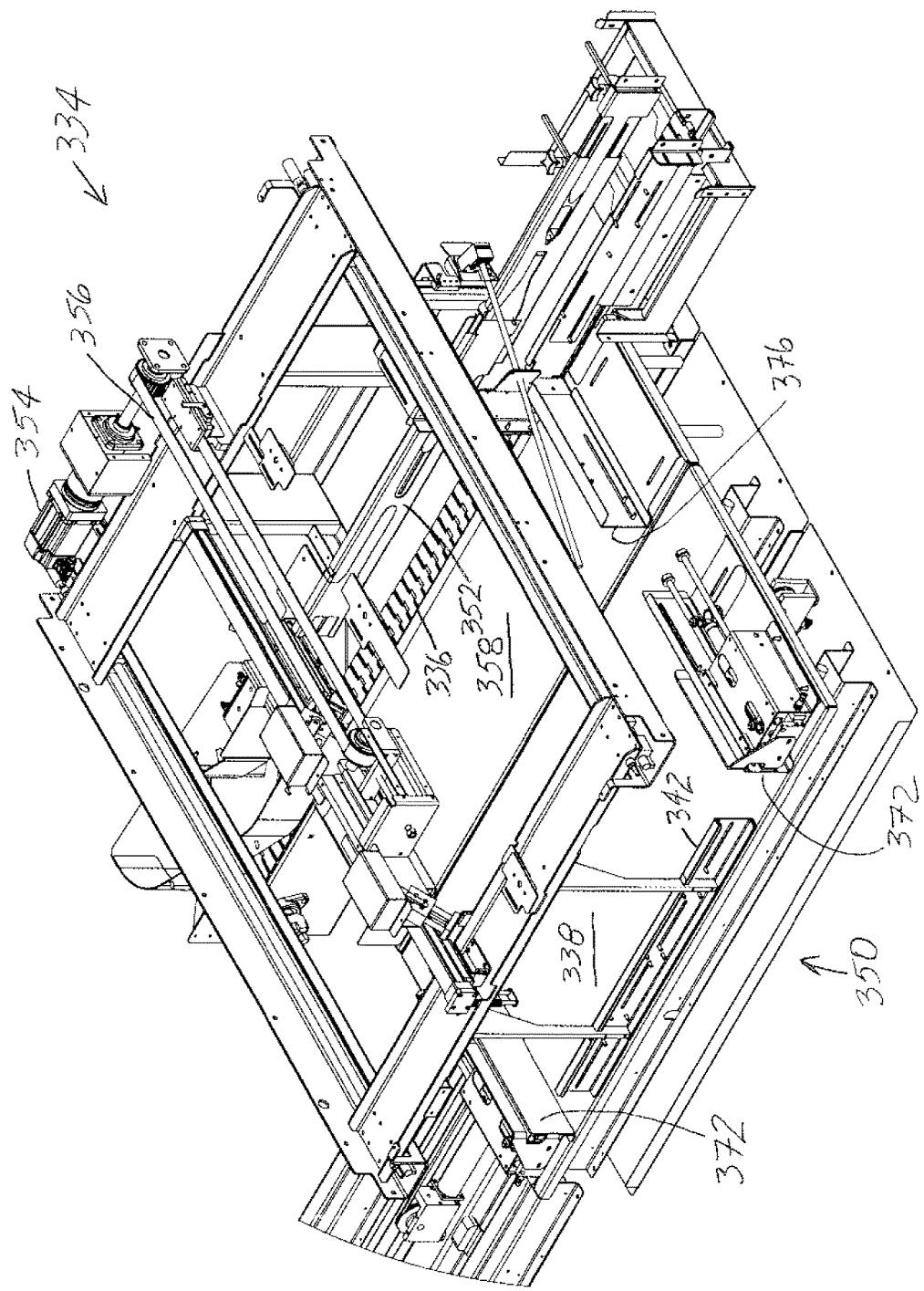
FIG. 65 is a partial cutaway of the article array forming/moving system of FIG. 63.
Figure 66:
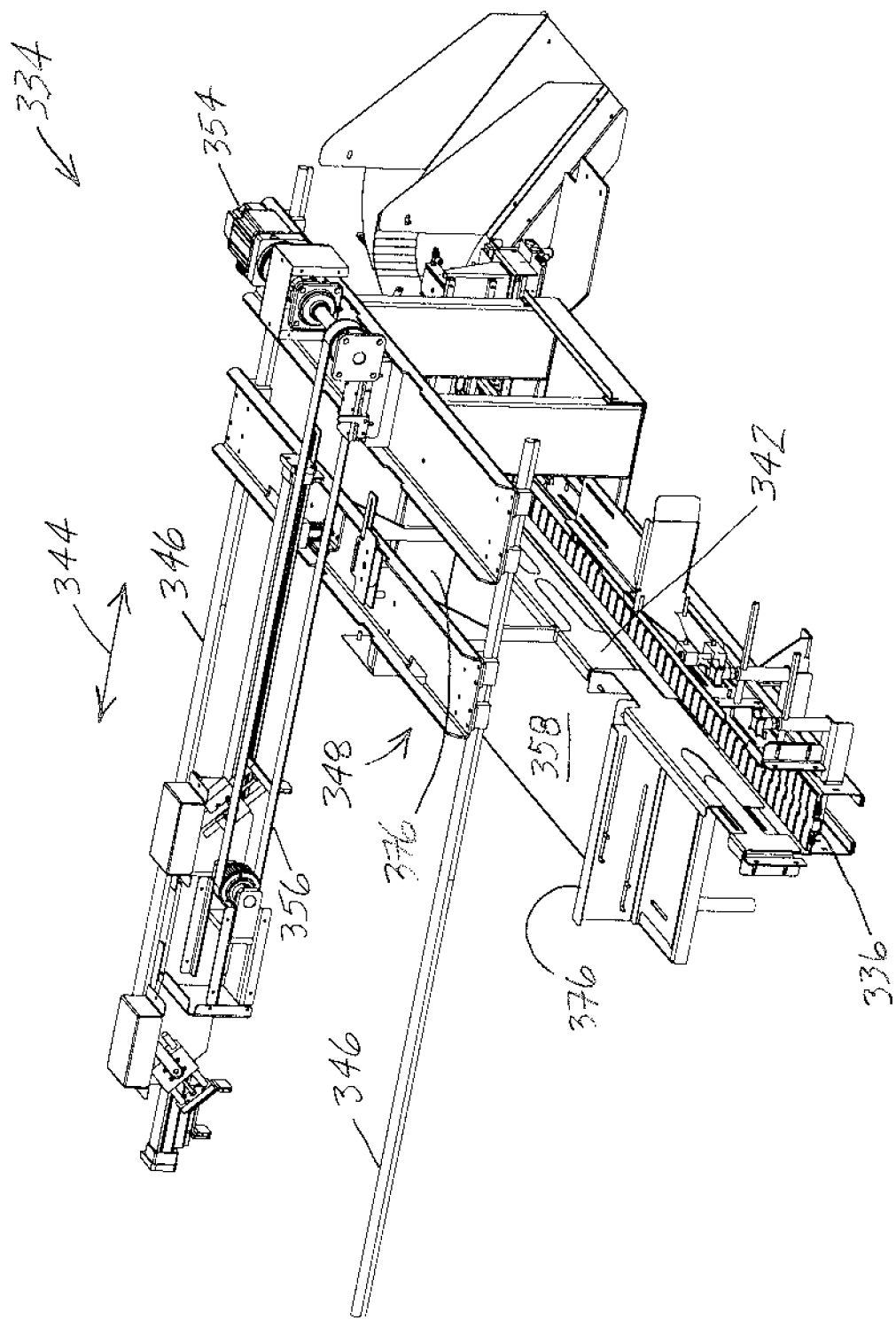
FIG. 66 is a further cutaway rotated 90 degrees about a vertical axis of the article array forming/moving system of FIG. 65.

As shown in FIGS. 65 and 66, a stabilizer 342 is now discussed. Stabilizer 342 is urged into slidable movement in a horizontal direction 344 along guides 346 between a home position 348 (FIG. 66) and an extended position 350 (FIG. 65) by a motor 354 which rotationally drives a drive belt 356 connected to stabilizer 342. During formation of an article array on a support surface 358 of consolidation area 334, stabilizer 342 and a backing plate 352 interact together to both stabilizingly support and move the forming article array along support surface 358 in movement direction 344 in a manner similar to that between stabilizer 148 and backing plate 146, as previously discussed. As shown, support surface 358 of consolidation area 334 includes opposed support members 376 (FIG. 66) for stabilizingly supporting a portion of the periphery of an article array in a manner similar to support members 150 (FIG. 29) as previously discussed. However, once an article array is formed on support surface 358 (e.g., at least partially covering support surface 358; the number of article rows forming the article array depending upon the application), stabilizer 342 and backing plate 352 continue to both stabilizingly support and move the formed article array in movement direction 344 onto transfer support surface 338.

Figure 67:
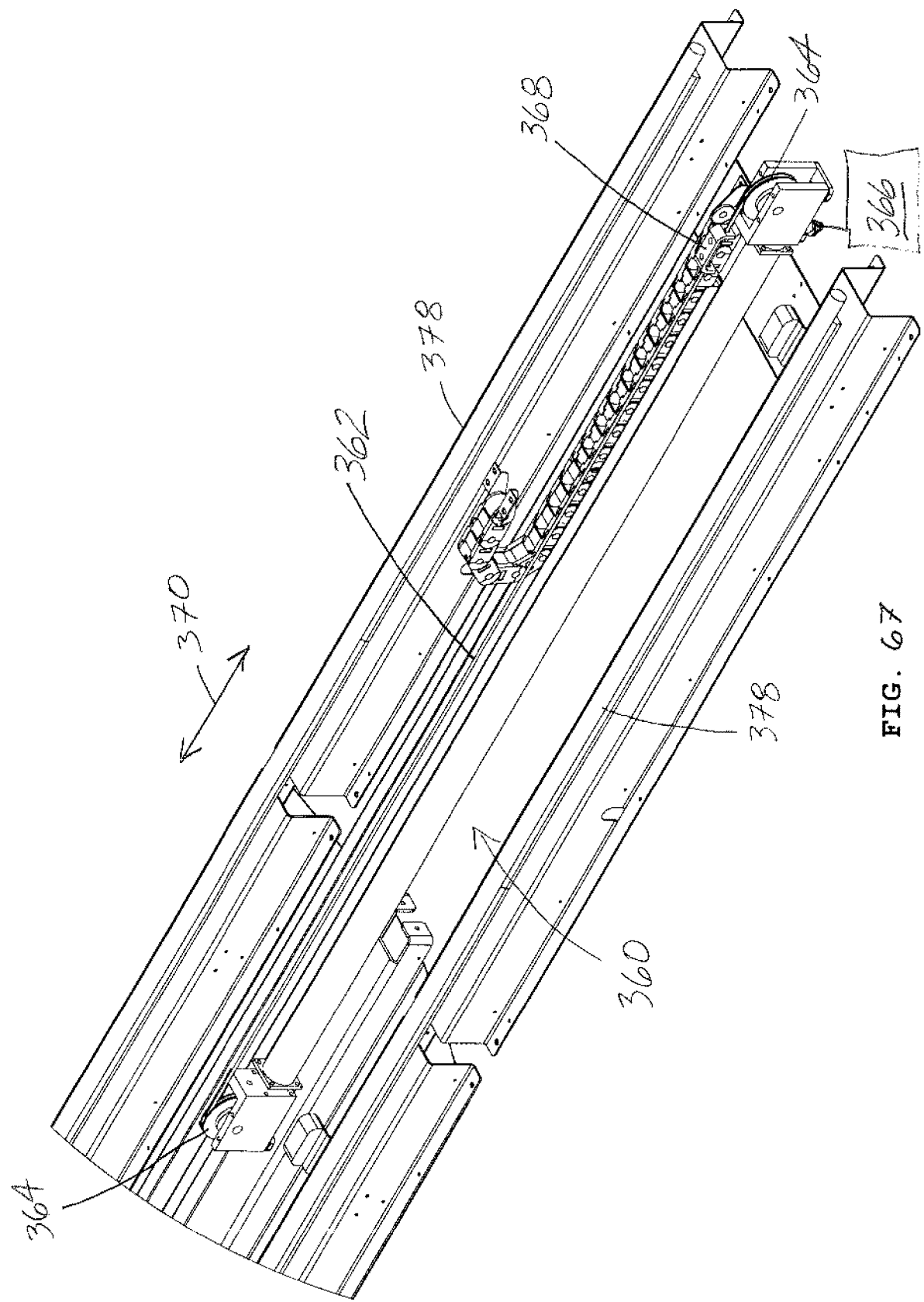
FIG. 67 is an isolated upper perspective view of an exemplary drive arrangement of a transfer support surface.

As further shown in FIG. 67, transfer support surface 338 (FIG. 64) is connected to a bracket 368 of a cable drive device 360. Cable drive device 360 includes a motor 366 for rotatably urging opposed pulleys 364 carrying a cable 362 into movement in registry with pulleys 364. Once the formed article array has been moved onto transfer support surface 338, cable drive device 360 urges transfer support surface 338 (FIG. 64) to slidably move on guides 378 in movement direction 370 that is different from movement direction 344 toward or into collection area 340 (FIG. 62) such as previously discussed. For example, when transfer support surface 338 is moved sufficiently in movement direction 370 toward collection area 340 and positioned immediately adjacent to collection area 340, with a stabilizer positioned at the entrance to collection area 340, such as stabilizer 148 (FIG. 30) as previously discussed, the article array is continuously stabilizingly supported along its periphery. Furthermore, when transfer support surface 338 is in this position, and the article array is provided or moved or pushed into the collection area by a backing plate 374 (FIG. 64) of consolidation area 332 (FIG. 64), transfer support surface 338 becomes the consolidation surface of consolidation area 332. In one embodiment, transfer support surface 338 may be moved in one or more directions.

As a result of the article array being continuously stabilizingly supported along its periphery, the articles are prevented from rotating about a vertical axis irrespective of the direction of movement of transfer support surface 338, i.e., the system of the present invention does not suffer from the orientation shift of noncircular articles associated with FIG. 61. Preventing the orientation shift of articles during formation/movement provides several advantages, including the ability to simultaneously form multiple article arrays during operation of the system. For example, a system having a single consolidation area that forms article rows into an article array and moves the article array in a single direction between the consolidation area and the collection area experiences "down time" while the completed article array is being moved from the consolidation area and toward/into the collection area. In contrast, a system of the present invention can utilize multiple consolidation areas that form corresponding article arrays in directions that are not aligned with one another, permitting each consolidation area to simultaneously form article arrays; while a first consolidation area is moving a formed article array toward/into the collection area, a second consolidation area may continue to form an article array, and vice versa, eliminating such "down time."

In one embodiment, a method for forming and moving an article array comprises receiving at least a first row of articles onto a support surface of a consolidation area 334 between a movable stabilizer 342 and a movable backing plate 352, the consolidation area 334 providing continuous stabilizing support to the periphery of the at least first row of articles, the stabilizer 342 and the backing plate 352 providing stabilizing support to opposed portions of the periphery of the at least first row of articles; the backing plate 352 and the stabilizer 342 moving and stabilizingly supporting the at least first row of articles in a direction 344, at least the backing plate 352 in contact with each article of a corresponding row of the at least first row of articles while moving the at least first row of articles in the direction 344; additionally stabilizingly supporting the portion of the periphery of the at least first row of articles stabilizingly supported by the backing plate 352, the additional stabilizing support being independent of the stabilizing support provided by the backing plate 352; moving the backing plate 352 in a direction opposite the direction 344 in preparation of receiving at least a second row of articles; receiving the at least second row of articles immediately adjacent the at least first row of articles onto the support surface 352 between the backing plate 352 and the at least first row of articles, the periphery of the at least first row of articles and the at least second row of articles being continuously stabilizingly supported, including stabilizing support provided by the stabilizer 342 and the backing plate 352, the at least first row of articles and the at least second row of articles at least partially forming a first article array; moving the at least partially formed first article array from the consolidation area 334 and onto a transfer support surface 338 positioned between the consolidation area 334 and a collection area 340, wherein moving the at least partially formed first article array includes the stabilizer 342 or a second stabilizer 148 and the backing plate 352 moving and stabilizingly supporting the first article array in the direction 344 and onto the transfer support surface 338; and moving the transfer support surface 338 in at least a direction 370 from the consolidation area 334 toward the collection area 340, the periphery of the at least partially formed first article array being continuously stabilizingly supported while being moved onto the transfer support surface 338, and while the transfer support surface 338 is being moved in the at least a direction 370.

Figure 68:
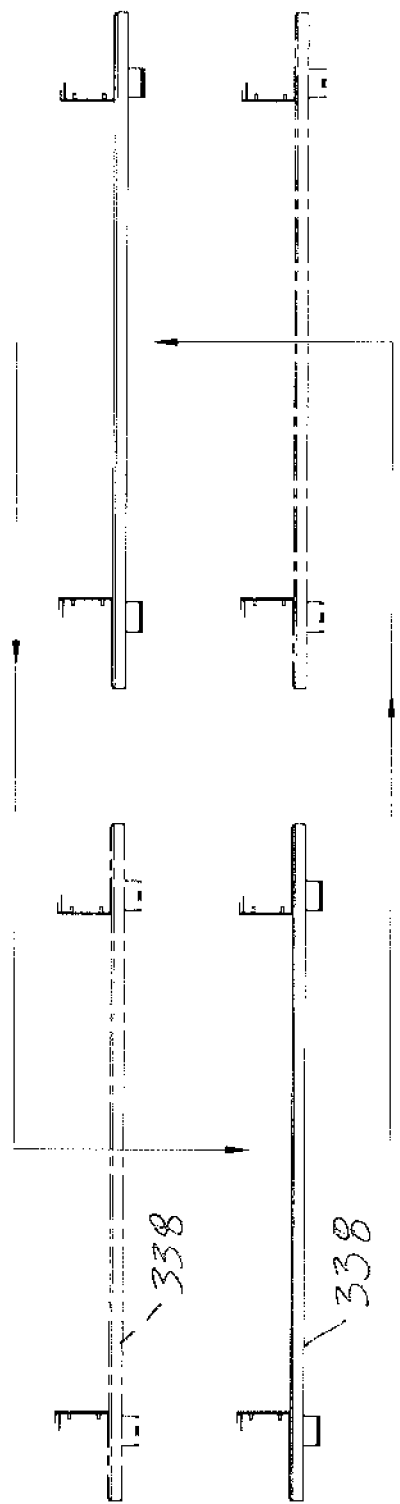
FIG. 68 is an elevation view of an exemplary transfer support surface.

In one embodiment, consolidation areas 334 are shown substantially coplanar, but the present invention is not so limited. For example, as shown in FIG. 68, article transfer support surfaces 338 are movable between different vertically positioned consolidation areas, such as consolidation areas each associated with a corresponding article row delivery device, permitting increased operational efficiencies as a result of further reduced "down time."

In one embodiment, each of consolidation area 334 adapted to receive identically sized articles from the article delivery devices. In one embodiment, each consolidation area 334 is adapted to receive a differently sized article from its corresponding article delivery device. In one embodiment, each consolidation area 334 is adapted to deliver different sized articles, such as articles having a first size, or a second size that is different from the first size.

It is to be understood that the movement of the article array forming/moving system and associated components is controlled by a computer or similar control device, including sensors operating in a known manner, and is driven by any appropriate drive mechanism known in the art.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A system for forming and moving an article array comprising:
    a first consolidation area having a first support surface for receiving and arranging rows of articles to form a first article array from a first article row delivery device adapted to simultaneously deliver at least one article row to the first consolidation area while the first consolidation area continuously stabilizingly supports a periphery of the article rows positioned on the first support surface as the article rows are arranged to form the first article array;
    wherein the first consolidation area including a first backing plate, a first first consolidation area stabilizer, and opposed first support members, the article rows positioned between the first backing plate, the first first consolidation area stabilizer, and the first support members, the first backing plate and the first first consolidation area stabilizer providing stabilizing support to opposed portions of the periphery of the article rows, and the first support members providing stabilizing support to remaining portions of the periphery of the article rows;
    upon the first first consolidation area stabilizer and the first backing plate moving and stabilizingly supporting the article rows in a first direction while forming the first article array, at least the first backing plate in contact with each article of a corresponding row of the article rows while moving the article rows in the first direction, a second first consolidation area stabilizer providing independent stabilizing support to the portion of the periphery of the article rows stabilizingly supported by the first backing plate prior to the first backing plate moving in a direction opposite the first direction, in preparation of receiving additional article rows in the first consolidation area immediately adjacent the article rows already positioned on the first support surface for forming the first article array;
    wherein upon at least partial formation of the first article array, the second first consolidation area stabilizer discontinues providing stabilizing support to the portion of the periphery of article rows formerly stabilizingly supported by the first backing plate, the portion of the periphery of the corresponding row of articles formerly stabilizingly supported by the first backing plate being stabilizingly supported by a corresponding portion of the periphery of the additional rows of articles, and a portion of the periphery of the additional row of articles being stabilizingly supported by the first backing plate;
    the first backing plate moving the at least partially formed first article array from the first consolidation area and onto a first transfer support surface positioned between the first consolidation area and a collection area;
    a first article array moving device for moving the first transfer support surface in at least a second direction from the first consolidation area toward the collection area, the periphery of the at least partially formed first article array being continuously stabilizingly supported while being moved onto the first transfer support surface, and while the first transfer support surface is being moved in the at least a second direction.

2. The system of claim 1, wherein in response to the first article row delivery device simultaneously delivering a plurality of article rows to the first consolidation area, a third first consolidation area stabilizer is positioned between each adjacent pair of article rows delivered by the first article row delivery device for stabilizingly supporting the plurality of article rows delivered thereby.

3. The system of claim 1, wherein the collection area is taken from the group comprising a container, a slip sheet, a bagging area, and a tray.

4. The system of claim 1, wherein in response to the articles having a noncircular footprint and having a first width in the first direction and a second width in the at least a second direction, the second width being greater than the first width, the articles are prevented from rotating about a vertical axis in response to the articles of the first article array being moved in the at least a second direction.

5. The system of claim 1, wherein the system further comprises
    a second consolidation area having a second support surface for receiving and arranging rows of articles to form a second article array from a second article row delivery device adapted to simultaneously deliver at least one article row to the second consolidation area while the second consolidation area continuously stabilizingly supports a periphery of the article rows positioned on the second support surface as the article rows are arranged to form the second article array;
    wherein the second consolidation area including a second backing plate, a first second consolidation area stabilizer, and opposed second support members, the article rows positioned between the second backing plate, the first second consolidation area stabilizer, and the second support members, the second backing plate and the first second consolidation area stabilizer providing stabilizing support to opposed portions of the periphery of the article rows, and the second support members providing stabilizing support to remaining portions of the periphery of the article rows;

upon the first second consolidation area stabilizer and the second backing plate moving and stabilizingly supporting the article rows in a first direction while forming the second article array, at least the second backing plate in contact with each article of a corresponding row of the article rows while moving the article rows in the first direction, a second second consolidation area stabilizer providing independent stabilizing support to the portion of the periphery of the article rows stabilizingly supported by the second backing plate prior to the second backing plate moving in a direction opposite the first direction, in preparation of receiving additional article rows in the second consolidation area immediately adjacent the article rows already positioned on the second support surface for forming the second article array;

wherein upon at least partial formation of the second article array, the second second consolidation area stabilizer discontinues providing stabilizing support to the portion of the periphery of article rows formerly stabilizingly supported by the second backing plate, the portion of the periphery of the corresponding row of articles formerly stabilizingly supported by the second backing plate being stabilizingly supported by a corresponding portion of the periphery of the additional rows of articles, and a portion of the periphery of the additional row of articles being stabilizingly supported by the second backing plate;

the second backing plate moving the at least partially formed second article array from the second consolidation area and onto one of the first transfer support surface or a second transfer support surface positioned between the second consolidation area and a collection area;

one of the first article array moving device or a second article array moving device for moving the one of the first transfer support surface or the second transfer support surface in at least a second direction from the second consolidation area toward the collection area, the periphery of the at least partially formed second article array being continuously stabilizingly supported while being moved onto the one of the first transfer support surface or a second transfer surface, and while the one of the first transfer support surface or the second transfer surface is being moved in the at least a second direction.

6. The system of claim 5, wherein the first consolidation area and the second consolidation area are coplanar.

7. The system of claim 5, wherein the first consolidation area and the second consolidation area are vertically spaced relative to one another.

8. The system of claim 5, wherein the first consolidation area and the second consolidation area are adapted to receive differently sized articles.

9. The system of claim 5, wherein each of the first article row delivery device and the second article row delivery device is adapted to deliver articles having a first size, or a second size that is different from the first size.

10. A system for forming and moving an article array comprising:

a first consolidation area having a first support surface, and a second consolidation area having a second support surface for receiving and arranging rows of articles to form a first article array from a first article array delivery device, and to form a second article array from a second article array delivery device, respectively, the first article array delivery device adapted to simultaneously deliver at least one article row to the first consolidation area while the first consolidation area continuously stabilizingly supports a periphery of the article rows positioned on the first support surface as the article rows are arranged to form the second article array, the second article array delivery device adapted to simultaneously deliver at least one article row to the second consolidation area while the second consolidation area continuously stabilizingly supports a periphery of the article rows positioned on the second support surface as the article rows are arranged to form the second article array;

wherein the first consolidation area including a first backing plate, a first first consolidation area stabilizer, and opposed first support members, the article rows positioned between the first backing plate, the first first consolidation area stabilizer, and the first support members, the first backing plate and the first first consolidation area stabilizer providing stabilizing support to opposed portions of the periphery of the article rows, and the first support members providing stabilizing support to remaining portions of the periphery of the article rows;

upon the first first consolidation area stabilizer and the first backing plate moving and stabilizingly supporting the article rows in a first direction while forming the first article array, at least the first backing plate in contact with each article of a corresponding row of the article rows while moving the article rows in the first direction, a second first consolidation area stabilizer providing independent stabilizing support to the portion of the periphery of the article rows stabilizingly supported by the first backing plate prior to the first backing plate moving in a direction opposite the first direction, in preparation of receiving additional rows in the first consolidation area immediately adjacent the article rows already positioned on the first support surface for forming the first article array;

wherein upon at least partial formation of the first article array, the second first consolidation area stabilizer discontinues providing stabilizing support to the portion of the periphery of article rows formerly stabilizingly supported by the first backing plate, the portion of the periphery of the corresponding row of articles formerly stabilizingly supported by the first backing plate being stabilizingly supported by a corresponding portion of the periphery of the additional rows of articles, and a portion of the periphery of the additional row of articles being stabilizingly supported by the first backing plate;

the first backing plate moving the at least partially formed first article array from the first consolidation area and onto a first transfer support surface positioned between the first consolidation area and a collection area;

a first article array moving device for moving the first transfer support surface in at least a second direction from the first consolidation area toward the collection area, the periphery of the at least partially formed first article array being continuously stabilizingly supported while being moved onto the first transfer support surface, and while the first transfer support surface is being moved in the at least a second direction;

wherein the second consolidation area including a second backing plate, a first second consolidation area stabilizer, and opposed second support members, the article rows positioned between the second backing plate, the first second consolidation area stabilizer, and the second support members, the second backing plate and the first second consolidation area stabilizer providing stabilizing support to opposed portions of the periphery of the article rows, and the second support members providing stabilizing support to remaining portions of the periphery of the article rows;

upon the first second consolidation area stabilizer and the second backing plate moving and stabilizingly supporting the article rows in a first direction while forming the second article array, at least the second backing plate in contact with each article of a corresponding row of the article rows while moving the article rows in the first direction, a second second consolidation area stabilizer providing independent stabilizing support to the portion of the periphery of the article rows stabilizingly supported by the second backing plate prior to the second backing plate moving in a direction opposite the first direction, in preparation of receiving additional article rows in the second consolidation area immediately adjacent the article rows already positioned on the second support surface for forming the second article array;

wherein upon at least partial formation of the second article array, the second second consolidation area stabilizer discontinues providing stabilizing support to the portion of the periphery of article rows formerly stabilizingly supported by the second backing plate, the portion of the periphery of the corresponding row of articles formerly stabilizingly supported by the second backing plate being stabilizingly supported by a corresponding portion of the periphery of the additional rows of articles, and a portion of the periphery of the additional row of articles being stabilizingly supported by the second backing plate;

the second backing plate moving the at least partial second article array from the second consolidation area and onto one of the first transfer support surface or a second transfer support surface positioned between the second consolidation area and a collection area;

one of the first article array moving device or a second article array moving device for moving the one of the first transfer support surface or the second transfer support surface in at least a second direction from the second consolidation area toward the collection area, the periphery of the at least partial second article array being continuously stabilizingly supported while being moved onto the one of the first transfer support surface or a second transfer surface, and while the one of the first transfer support surface or the second transfer surface is being moved in the at least a second direction.

11. The system of claim 10, wherein in response to the first article row delivery device and the second article row delivery device simultaneously delivering a plurality of article rows to the first consolidation area and the second consolidation area, respectively, a third first consolidation area stabilizer is positioned between each adjacent pair of article rows delivered by the first article row delivery device and the second article row delivery device for stabilizingly supporting the plurality of article rows delivered thereby.

12. The system of claim 10, wherein the collection area is taken from the group comprising a container, a slip sheet, a bagging area, and a tray.

13. The system of claim 10, wherein in response to the articles having a noncircular footprint and having a first width in the first direction and a second width in the at least a second direction, the second width being greater than the first width, the articles are prevented from rotating about a vertical axis in response to the articles of the first article array and the second article array being moved in the at least a second direction.

14. The system of claim 10, wherein the first consolidation area and the second consolidation area are coplanar.

15. The system of claim 10, wherein the first consolidation area and the second consolidation area are vertically spaced relative to one another.

16. The system of claim 10, wherein the first consolidation area and the second consolidation area are adapted to receive differently sized articles.

17. The system of claim 10, wherein each of the first article row delivery device and the second article row delivery device is adapted to deliver articles having a first size, or a second size that is different from the first size.

18. A method for forming and moving an article array comprising:

receiving at least a first row of articles onto a first support surface of a first consolidation area between a movable first stabilizer and a movable first backing plate, the first consolidation area providing continuous stabilizing support to the periphery of the at least first row of articles, the first stabilizer and the first backing plate providing stabilizing support to opposed portions of the periphery of the at least first row of articles;

the first backing plate and the first stabilizer moving and stabilizingly supporting the at least first row of articles in a first direction, at least the first backing plate in contact with each article of a corresponding row of the at least first row of articles while moving the at least first row of articles in the first direction;

additionally stabilizingly supporting the portion of the periphery of the at least first row of articles stabilizingly supported by the first backing plate, the additional stabilizing support being independent of the stabilizing support provided by the first backing plate;

moving the first backing plate in a direction opposite the first direction in preparation of receiving at least a second row of articles;

receiving the at least second row of articles immediately adjacent the at least first row of articles onto the first support surface between the first backing plate and the at least first row of articles, the periphery of the at least first row of articles and the at least second row of articles being continuously stabilizingly supported, including stabilizing support provided by the first stabilizer and the first backing plate, the at least first row of articles and the at least second row of articles at least partially forming a first article array;

moving the at least partially formed first article array from the first consolidation area and onto a first transfer support surface positioned between the first consolidation area and a collection area, wherein moving the at least partially formed first article array includes the first stabilizer or a second stabilizer and the first backing plate moving and stabilizingly supporting the first article array in the first direction and onto the first transfer support surface; and moving the first transfer support surface in at least a second direction from the first consolidation area toward the collection area, the periphery of the at least partially formed first article array being continuously stabilizingly supported while being moved onto the first transfer support surface, and while the first transfer support surface is being moved in the at least a second direction.

19. The method of claim 18, wherein in response to the articles having a noncircular footprint and having a first width in the first direction and a second width in the at least a second direction, the second width being greater than the first width, the articles are prevented from rotating about a vertical axis in response to the articles of the first article array and the second article array being moved in the at least a second direction.

20. The method of claim 18 further comprises providing a second consolidation area having a second support surface for receiving and arranging rows of articles to form at least a partial second article array continuously stabilizingly supported between a second stabilizer and a movable second backing plate in a manner the at least partially formed first article array is formed in claim 18, the at least partially formed second article array adapted to be capable of being formed simultaneously as the at least partially formed first article array is formed.

\* \* \* \* \*